(12) United States Patent
Kumar et al.

(10) Patent No.: US 10,739,742 B2
(45) Date of Patent: Aug. 11, 2020

(54) BUILDING ENERGY SYSTEM WITH STOCHASTIC MODEL PREDICTIVE CONTROL

(71) Applicant: Johnson Controls Technology Company, Auburn Hills, MI (US)

(72) Inventors: Ranjeet Kumar, Madison, WI (US); Michael J. Wenzel, Grafton, WI (US); Matthew J. Ellis, Milwaukee, WI (US); Mohammad N. Elbsat, Milwaukee, WI (US); Kirk H. Drees, Cedarburg, WI (US); Victor Manuel Zavala Tejeda, Madison, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 99 days.

(21) Appl. No.: 15/963,891

(22) Filed: Apr. 26, 2018

(65) Prior Publication Data

US 2018/0314220 A1 Nov. 1, 2018

Related U.S. Application Data

(60) Provisional application No. 62/491,108, filed on Apr. 27, 2017.

(51) Int. Cl.
*G05B 19/042* (2006.01)
*G06Q 30/02* (2012.01)
*G05B 15/02* (2006.01)

(52) U.S. Cl.
CPC ........... *G05B 19/042* (2013.01); *G05B 15/02* (2013.01); *G06Q 30/0283* (2013.01);
(Continued)

(58) Field of Classification Search
CPC .............. G05B 15/02; G05B 19/042; G05B 2219/25387; G05B 2219/2639; G05B 2219/2642; G06Q 30/0283
See application file for complete search history.

(56) References Cited

U.S. PATENT DOCUMENTS 8,903,554 B2  12/2014  Stagner
2003/0036820 A1 *  2/2003  Yellepeddy ............ G05B 15/02
                                                              700/291
(Continued)

OTHER PUBLICATIONS

International Search Report and Written Opinion on International Patent Application No. PCT/US2018/029635 dated Aug. 13, 2018. 13 pages.

(Continued)

*Primary Examiner* — Kidest Bahta
(74) *Attorney, Agent, or Firm* — Foley & Lardner LLP

(57) ABSTRACT

A building energy system includes equipment and an asset allocator configured to determine an optimal allocation of energy loads across the equipment over a prediction horizon. The asset allocator generates several potential scenarios and generates an individual cost function for each potential scenario. Each potential scenario includes a predicted load required by the building and predicted prices for input resources. Each individual cost function includes a cost of purchasing the input resources from utility suppliers. The asset allocator generates a resource balance constraint and solves an optimization problem to determine the optimal allocation of the energy loads across the equipment. Solving the optimization problem includes optimizing an overall cost function that includes a weighted sum of individual cost functions for each potential scenario subject to the resource balance constraint for each potential scenario. The asset allocator controls the equipment to achieve the optimal allocation of energy loads.

20 Claims, 32 Drawing Sheets

(52) U.S. Cl.
CPC .............. *G05B 2219/25387* (2013.01); *G05B 2219/2639* (2013.01); *G05B 2219/2642* (2013.01)

(56) References Cited

U.S. PATENT DOCUMENTS

| | | | |
|---|---|---|---|
| 2007/0055392 A1* | 3/2007 | D'Amato | G05B 13/048 700/44 |
| 2011/0040550 A1* | 2/2011 | Graber | G06Q 10/06 703/18 |
| 2012/0221158 A1* | 8/2012 | Krok | H02J 3/00 700/291 |
| 2013/0190940 A1* | 7/2013 | Sloop | G05B 13/02 700/291 |
| 2013/0345889 A1 | 12/2013 | Osogami et al. | |
| 2015/0253027 A1 | 9/2015 | Lu et al. | |
| 2015/0316902 A1 | 11/2015 | Wenzel et al. | |
| 2015/0316907 A1 | 11/2015 | Elbsat et al. | |
| 2016/0254664 A1* | 9/2016 | Huang | H02J 1/00 307/52 |
| 2016/0305678 A1 | 10/2016 | Pavlovski et al. | |
| 2016/0377306 A1 | 12/2016 | Drees et al. | |
| 2017/0102162 A1 | 4/2017 | Drees et al. | |
| 2017/0102433 A1 | 4/2017 | Wenzel et al. | |
| 2017/0102434 A1 | 4/2017 | Wenzel et al. | |
| 2017/0102675 A1 | 4/2017 | Drees | |
| 2017/0103483 A1 | 4/2017 | Drees et al. | |
| 2017/0104332 A1 | 4/2017 | Wenzel et al. | |
| 2017/0104336 A1 | 4/2017 | Elbsat et al. | |
| 2017/0104337 A1 | 4/2017 | Drees | |
| 2017/0104342 A1 | 4/2017 | Elbsat et al. | |
| 2017/0104343 A1 | 4/2017 | Elbsat et al. | |
| 2017/0104344 A1 | 4/2017 | Wenzel et al. | |
| 2017/0104345 A1 | 4/2017 | Wenzel et al. | |
| 2017/0104346 A1 | 4/2017 | Wenzel et al. | |
| 2017/0104449 A1 | 4/2017 | Drees | |

OTHER PUBLICATIONS

Arthur J Helmicki, Clas A Jacobson, and Carl N Nett. Control Oriented System Identification: a Worstcase/deterministic Approach in H1. IEEE Transactions on Automatic control, 36(10):1163-1176, 1991. 13 pages.

Diederik Kingma and Jimmy Ba. Adam: A Method for Stochastic Optimization. In International Conference on Learning Representations (ICLR), 2015, 15 pages.

George Ep Box, Gwilym M Jenkins, Gregory C Reinsel, and Greta M Ljung. Time Series Analysis: Forecasting and Control. John Wiley & Sons, 2015, chapters 4-7 and 13-15. 183 pages.

Jie Chen and Guoxiang Gu. Control-oriented System Identification: an H1 Approach, vol. 19. Wiley-Interscience, 2000, chapters 3 & 8, 38 pages.

Jingjuan Dove Feng, Frank Chuang, Francesco Borrelli, and Fred Bauman. Model Predictive Control of Radiant Slab Systems with Evaporative Cooling Sources. Energy and Buildings, 87:199-210, 2015. 11 pages.

K. J. Astrom. Optimal Control of Markov Decision Processes with Incomplete State Estimation. J. Math. Anal. Appl., 10:174-205, 1965.31 pages.

Kelman and F. Borrelli. Bilinear Model Predictive Control of a HVAC System Using Sequential Quadratic Programming. In Proceedings of the 2011 IFAC World Congress, 2011, 6 pages.

Lennart Ljung and Torsten Soderstrom. Theory and practice of recursive identification, vol. 5. JSTOR, 1983, chapters 2, 3 & 7, 80 pages.

Lennart Ljung, editor. System Identification: Theory for the User (2nd Edition). Prentice Hall, Upper Saddle River, New Jersey, 1999, chapters 5 and 7, 40 pages.

Moritz Hardt, Tengyu Ma, and Benjamin Recht. Gradient Descent Learns Linear Dynamical Systems. arXiv preprint arXiv:1609. 05191, 2016, 44 pages.

Nevena et al. Data center cooling using model-predictive control, 10 pages.

Sergio Bittanti, Marco C Campi, et al. Adaptive Control of Linear Time Invariant Systems: The "Bet on the Best" Principle. Communications in Information & Systems, 6(4):299-320, 2006. 21 pages.

Yudong Ma, Anthony Kelman, Allan Daly, and Francesco Borrelli. Predictive Control for Energy Efficient Buildings with Thermal Storage: Modeling, Stimulation, and Experiments. IEEE Control Systems, 32(1):44-64, 2012. 20 pages.

Yudong Ma, Francesco Borrelli, Brandon Hencey, Brian Coffey, Sorin Bengea, and Philip Haves. Model Predictive Control for the Operation of Building Cooling Systems. IEEE Transactions on Control Systems Technology, 20(3):796-803, 2012.7 pages.

Ledoit and Wolf, A well-conditioned estimator for large-dimensional covariance matrices, Journal of Multivariate Analysis, vol. 88, No. 2, pp. 365-411, 2004.

* cited by examiner

Table I: Expected Costs for MPC Schemes
TC = Total Cost, DC = Demand Charge, FR = Frequency Regulation, E = Energy

| Horizon | 7-day | | | | | |
|---|---|---|---|---|---|---|
| $\sigma_t$ | 1 | M/N | 1 | M/N | 1 | M/N |
| Cost Item ($/month) | Perfect Information | | Stochastic | | Deterministic | |
| TC | 121,995.4 | 121,752.3 | 123,718.1 | 123,541.2 | 124,857.4 | 124,905.9 |
| DC | 137,305.8 | 137,032.8 | 137,344.8 | 137,864.7 | 139,492.1 | 139,630.5 |
| FR | -14,827.0 | -14,797.3 | -13,123.8 | -13,837.5 | -14,123.3 | -14,214.5 |
| E | -483.4 | -483.2 | -502.9 | -486.0 | -511.4 | -510.1 |
| Horizon | 7-day | | | | | |
| $\sigma_t$ | 1 | M/N | 1 | M/N | 1 | M/N |
| Cost Item ($/month) | Perfect Information | | Stochastic | | Deterministic | |
| TC | 121,755.5 | 122,484.3 | 124,202.0 | 123,911.4 | 125,046.1 | 124,899.7 |
| DC | 137,032.8 | 137,760.7 | 137,319.5 | 138,806.0 | 139,424.0 | 139,936.4 |
| FR | -14,794.5 | -14,793.8 | -12,602.8 | -14,409.1 | -13,854.9 | -14,544.2 |
| E | -482.7 | -482.5 | -514.6 | -485.5 | -522.9 | -492.4 |
| Horizon | 7-day | | | | | |
| $\sigma_t$ | 1 | M/N | 1 | M/N | 1 | M/N |
| TC | 121,950.3 | 121,704.2 | 124,7484.3 | 124,337.8 | 124,752.5 | 124,776.2 |
| DC | 138,214.5 | 137,859.5 | 139,713.3 | 137,257.1 | 139,963.9 | 139,058.1 |
| FR | -15,823.3 | -15,721.1 | -14,751.5 | -12,405.5 | -14,728.9 | -13,754.2 |
| E | -441.2 | -434.2 | -477.6 | -513.8 | -482.5 | -527.6 |

FIG. 21

Table II: Value of Stochastic Solution (VSS) and Value of Perfect Information (VPI)

| | | 7-day | | 7-day | | 7-day | |
|---|---|---|---|---|---|---|---|
| $\sigma_t$ | | 1 | M/N | 1 | M/N | 1 | M/N |
| VSS | ($/month) | 1,139.3 | 1,364.7 | 844.1 | 988.3 | 268.3 | 438.4 |
| | (Approx. $/year) | 13,631.8 | 16,376.4 | 10,129.2 | 11,859.6 | 3,219.6 | 5,260.8 |
| VPI | ($/month) | 1,722.6 | 1,788.9 | 2,155.8 | 2,446.4 | 2,533.9 | 2,633.6 |
| | (Approx. $/year) | 20,671.7 | 29,357.1 | 21,466.8 | 25,869.8 | 30,407.0 | 31,603.2 |

FIG. 22

Table III: Value of Battery Under Different MPC Schemes

| | Without Battery | With Battery | | | |
|---|---|---|---|---|---|
| | | Perfect Information MPC | Stochastic MPC | Deterministic MPC | Value of Stochastic MPC |
| Expected Total Cost ($/month) | 137,100 | 121,752 | 123,540 | 124,905 | 13,560 |
| Expected Savings ($/month) | - | 15,348 | 13,560 | 12,195 | 1,365 |

FIG. 23

BUILDING ENERGY SYSTEM WITH STOCHASTIC MODEL PREDICTIVE CONTROL

CROSS-REFERENCE TO RELATED APPLICATION

This application claims the benefit and priority of U.S. Provisional Patent Application No. 62/491,108 filed Apr. 27, 2017, the entire disclosure of which is incorporated by reference herein.

BACKGROUND

The present disclosure relates generally to a model predictive control (MPC) system for a building. The present disclosure relates more particularly to a stochastic MPC system for resource allocation for building equipment. For example, some embodiments of the present disclosure relate to a stochastic MPC system that determines optimal participation commitments for stationary battery systems in ISO frequency regulation markets while simultaneously mitigating demand charges for a modulated load.

SUMMARY

One implementation of the present disclosure is a building energy system configured to serve energy loads of a building or campus. The system includes equipment configured to consume input resources from one or more utility suppliers to produce output resources provided to the campus and an asset allocator configured to determine an optimal allocation of energy loads across equipment over a prediction horizon. The asset allocator generates several potential scenarios and generates an individual cost function for each potential scenario. Each potential scenario includes a predicted load required by the building and predicted prices for the input resources for each of a plurality of time steps. Each individual cost function includes a cost of purchasing the input resources from the utility suppliers. The asset allocator generates one or more constraints that constrain how energy loads are allocated. Solving the optimization problem includes optimizing an overall cost function that includes a weighted sum of individual cost functions for each potential scenario subject to the resource balance constraint for each potential scenario. Each individual cost function is weighted based on a probability of the potential scenario for which the individual cost function is generated. The asset allocator is further configured to control the equipment to achieve the optimal allocation of energy loads.

In some embodiments, the optimization problem includes an allocation of energy loads for each scenario subject to a constraint that the allocation of energy loads for a first element of the prediction horizon is the same for each potential scenario.

In some embodiments, generating several potential scenarios includes predicting one or more inputs to the optimization problem at each time step of the prediction horizon, identifying an uncertainty range of the predicted inputs, generating a first potential scenario by selecting a first set of input values within the uncertainty range, and generating one or more additional potential scenarios by selecting one or more additional sets of input values within the uncertainty range. The one or more inputs include one or more of an electrical energy consumption of the building or campus, a chilled water load of the building or campus, a hot water load of the building or campus, a price rate for one or more of the input resources, a market rate of an incentive program, or weather.

In some embodiments, the building energy system is a central energy plant and the equipment include at least one of chillers, boilers, hot water generators, battery systems, or co-generation.

In some embodiments, one or more of the individual cost functions include incentives for participation in supplier-provided programs. In some embodiments, the supplier-provided programs include at least one of frequency response or economic load demand response.

In some embodiments, the cost of purchasing the input resources includes one or more demand charges.

In some embodiments, each weight in the weighted sum of individual cost functions depends on a probability of one potential scenario of the several potential scenarios and is applied to the individual cost function generated for the potential scenario.

In some embodiments, the one or more constraints include a resource balance constraint that requires balance between a total amount of each resource supplied or moved out of storage and a total amount of each resource consumed or moved into storage solves an optimization problem to determine the optimal allocation of the energy loads across the equipment the equipment include one or more resource storage devices such that the resources can be made or purchased when a cost of purchasing or making the resources is low and stored to be used when the cost of purchasing or making the resources is relatively higher.

Another implementation of the present disclosure is a method for optimizing cost of a building energy system. The method includes operating equipment to consume input resources from one or more utility suppliers and produce output resources provided to a building or campus and generating several potential scenarios over a prediction horizon. Each potential scenario includes a predicted load required by the building and predicted prices for the input resources for each of a plurality of time steps. The method includes generating an individual cost function for each potential scenario. Each individual cost function includes a cost of purchasing the input resources from the utility suppliers. The method includes generating one or more constraints that constrain how energy loads are allocated. Solving the optimization problem includes optimizing an overall cost function that includes a weighted sum of individual cost functions for each potential scenario subject to the resource balance constraint for each potential scenario. The method includes controlling the equipment to achieve the optimal allocation of energy loads.

In some embodiments, the optimization problem includes an allocation of energy loads for each scenario subject to a constraint that the allocation of energy loads for a first element of the prediction horizon is the same for each potential scenario.

In some embodiments, generating several potential scenarios includes predicting one or more inputs to the optimization problem at each time step of the prediction horizon, identifying an uncertainty range of the predicted inputs, generating a first potential scenario by selecting a first set of input values within the uncertainty range, and generating one or more additional potential scenarios by selecting one or more additional sets of input values within the uncertainty range. The one or more inputs include one or more of an electrical energy consumption of the building or campus, a chilled water load of the building or campus, a hot water load of the building or campus, a price rate for one or more of the input resources, a market rate of an incentive program, or weather.

In some embodiments, the building energy system is a central energy plant and the equipment include at least one of chillers, boilers, hot water generators, battery systems, or co-generation.

In some embodiments, one or more of the individual cost functions include incentives for participation in supplier-provided programs. In some embodiments, the supplier-provided programs include at least one of frequency response or economic load demand response.

In some embodiments, the cost of purchasing the input resources includes one or more demand charges.

In some embodiments, each weight in the weighted sum of individual cost functions depends on a probability of one potential scenario of the several potential scenarios and is applied to the individual cost function generated for the potential scenario.

In some embodiments, the one or more constrains include a resource balance constraint that requires balance between a total amount of each resource supplied or moved out of storage and a total amount of each resource consumed or moved into storage and solving an optimization problem to determine the optimal allocation of the energy loads across the equipment. The equipment include one or more resource storage devices such that the resources can be made or purchased when a cost of purchasing or making the resources is low and stored to be used when the cost of purchasing or making the resources is relatively higher.

Another implementation of the present disclosure is a method for predicting an operating cost of a building or campus. The method includes generating several potential scenarios over a prediction horizon. Each potential scenario includes a predicted load required by the building and predicted prices for input resources for each of a plurality of time steps. The method includes generating an individual cost function for each potential scenario. Each individual cost function includes a cost of purchasing the input resources from utility suppliers. The method includes generating one or more constraints that constrain how energy loads are allocated. The method also includes optimizing an overall cost function that comprises a weighted sum of individual cost functions for each potential scenario subject to the one or more constraints for each potential scenario to determine an optimal energy allocation for each of the plurality of time steps in an optimization period. The optimization period may include a portion of a planning period. The method also includes include shifting the optimization period forward in time by a block size including a predetermined number of time steps, iteratively repeating the optimizing and shifting steps until the cost function has been optimized for each time step that occurs during the planning period, and predicting the cost of operating the building or campus over the planning period based on the optimal energy allocation for each time step that occurs during the planning period.

In some embodiments, generating several potential scenarios includes predicting one or more inputs to the optimization problem for the building or campus at each time step of the prediction horizon, identifying an uncertainty range of the predicted inputs, generating a first potential scenario by selecting a first set of input values within the uncertainty range, and generating one or more additional potential scenarios by selecting one or more additional sets of input values within the uncertainty range. The one or more inputs include one or more of an electrical energy consumption of the building or campus, a chilled water load of the building or campus, a hot water load of the building or campus, a price rate for one or more of the input resources, a market rate of an incentive program, or weather.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIG. 21 is a table of expected costs for stochastic, deterministic, and perfect information MPC schemes, according to an exemplary embodiment.

FIG. 22 is a table illustrating the value of the stochastic solution (VSS) and value of the perfect information (VPI) MPC schemes, according to an exemplary embodiment.

FIG. 23 is a table illustrating the value of a battery under stochastic, deterministic, and perfect information MPC schemes, according to an exemplary embodiment.

DETAILED DESCRIPTION

Figure 1:
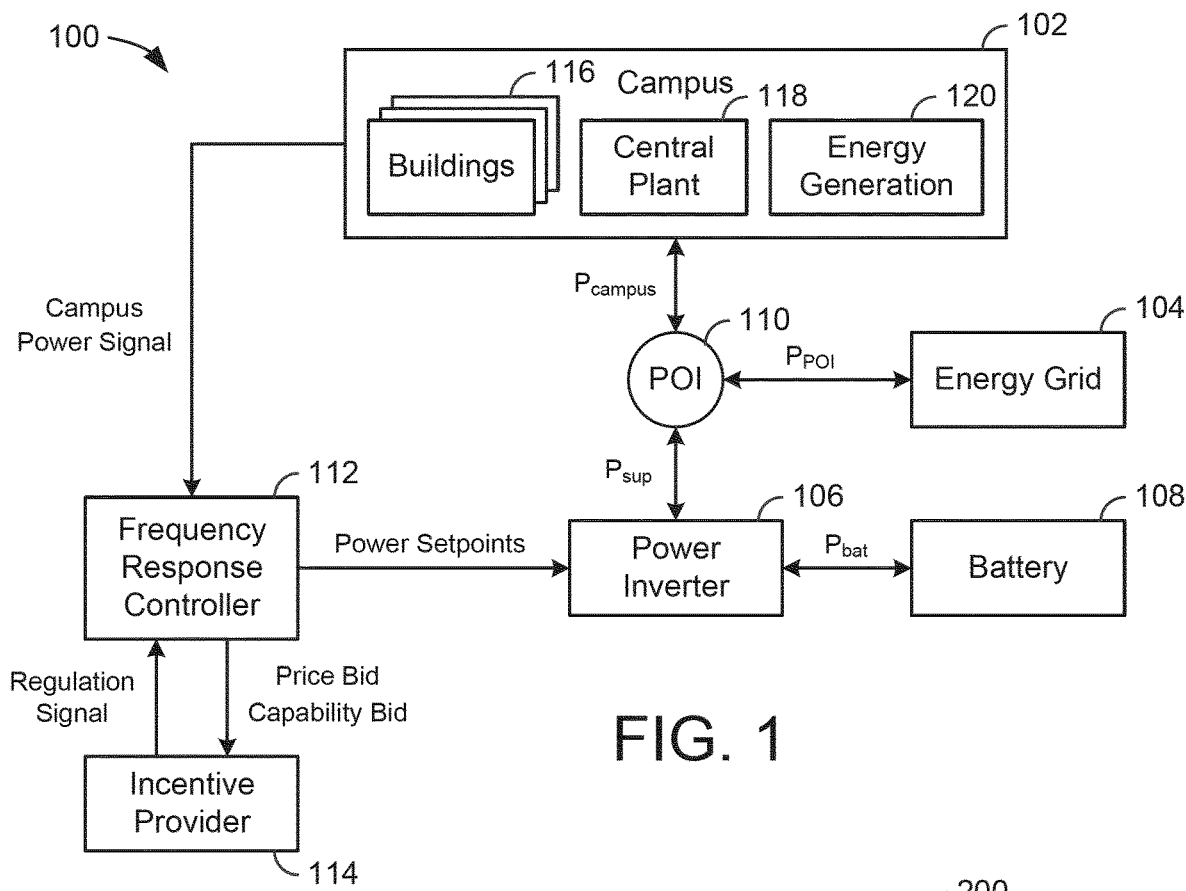
FIG. 1 is a block diagram of a frequency response optimization system, according to an exemplary embodiment.

Referring generally to the FIGURES, a building energy cost optimization system with stochastic model predictive control and components thereof are shown according to various exemplary embodiments. In various embodiments, the energy storage system can include some or all of the components of frequency response optimization system 100, photovoltaic energy system 300, energy storage system 500, energy storage controller 506, and/or planning tool 702. In some embodiments described herein, a stochastic MPC framework is used to determine optimal participation strategies in frequency regulation markets for stationary batteries while mitigating demand charges of an attached load.

Frequency Response Optimization

Referring now to FIG. 1, a frequency response optimization system 100 is shown, according to an exemplary embodiment. System 100 is shown to include a campus 102 and an energy grid 104. Campus 102 may include one or more buildings 116 that receive power from energy grid 104. Buildings 116 may include equipment or devices that consume electricity during operation. For example, buildings 116 may include HVAC equipment, lighting equipment, security equipment, communications equipment, vending machines, computers, electronics, elevators, or other types of building equipment.

In some embodiments, buildings 116 are served by a building management system (BMS). A BMS is, in general, a system of devices configured to control, monitor, and manage equipment in or around a building or building area. A BMS can include, for example, a HVAC system, a security system, a lighting system, a fire alerting system, and/or any other system that is capable of managing building functions or devices. An exemplary building management system which may be used to monitor and control buildings 116 is described in U.S. patent application Ser. No. 14/717,593 filed May 20, 2015, the entire disclosure of which is incorporated by reference herein.

In some embodiments, campus 102 includes a central plant 118. Central plant 118 may include one or more subplants that consume resources from utilities (e.g., water, natural gas, electricity, etc.) to satisfy the loads of buildings 116. For example, central plant 118 may include a heater subplant, a heat recovery chiller subplant, a chiller subplant, a cooling tower subplant, a hot thermal energy storage (TES) subplant, and a cold thermal energy storage (TES) subplant, a steam subplant, and/or any other type of subplant configured to serve buildings 116. The subplants may be configured to convert input resources (e.g., electricity, water, natural gas, etc.) into output resources (e.g., cold water, hot water, chilled air, heated air, etc.) that are provided to buildings 116. An exemplary central plant which may be used to satisfy the loads of buildings 116 is described U.S. patent application Ser. No. 14/634,609 filed Feb. 27, 2015, the entire disclosure of which is incorporated by reference herein.

In some embodiments, campus 102 includes energy generation 120. Energy generation 120 may be configured to generate energy that can be used by buildings 116, used by central plant 118, and/or provided to energy grid 104. In some embodiments, energy generation 120 generates electricity. For example, energy generation 120 may include an electric power plant, a photovoltaic energy field, or other types of systems or devices that generate electricity. The electricity generated by energy generation 120 can be used internally by campus 102 (e.g., by buildings 116 and/or central plant 118) to decrease the amount of electric power that campus 102 receives from outside sources such as energy grid 104 or battery 108. If the amount of electricity generated by energy generation 120 exceeds the electric power demand of campus 102, the excess electric power can be provided to energy grid 104 or stored in battery 108. The power output of campus 102 is shown in FIG. 1 as $P_{campus}$. $P_{campus}$ may be positive if campus 102 is outputting electric power or negative if campus 102 is receiving electric power.

Still referring to FIG. 1, system 100 is shown to include a power inverter 106 and a battery 108. Power inverter 106 may be configured to convert electric power between direct current (DC) and alternating current (AC). For example, battery 108 may be configured to store and output DC power, whereas energy grid 104 and campus 102 may be configured to consume and generate AC power. Power inverter 106 may be used to convert DC power from battery 108 into a sinusoidal AC output synchronized to the grid frequency of energy grid 104. Power inverter 106 may also be used to convert AC power from campus 102 or energy grid 104 into DC power that can be stored in battery 108. The power output of battery 108 is shown as $P_{bat}$. $P_{bat}$ may be positive if battery 108 is providing power to power inverter 106 or negative if battery 108 is receiving power from power inverter 106.

In some embodiments, power inverter 106 receives a DC power output from battery 108 and converts the DC power output to an AC power output. The AC power output can be used to satisfy the energy load of campus 102 and/or can be provided to energy grid 104. Power inverter 106 may synchronize the frequency of the AC power output with that of energy grid 104 (e.g., 50 Hz or 60 Hz) using a local oscillator and may limit the voltage of the AC power output to no higher than the grid voltage. In some embodiments, power inverter 106 is a resonant inverter that includes or uses LC circuits to remove the harmonics from a simple square wave in order to achieve a sine wave matching the frequency of energy grid 104. In various embodiments, power inverter 106 may operate using high-frequency transformers, low-frequency transformers, or without transformers. Low-frequency transformers may convert the DC output from battery 108 directly to the AC output provided to energy grid 104. High-frequency transformers may employ a multi-step process that involves converting the DC output to high-frequency AC, then back to DC, and then finally to the AC output provided to energy grid 104.

System 100 is shown to include a point of interconnection (POI) 110. POI 110 is the point at which campus 102, energy grid 104, and power inverter 106 are electrically connected. The power supplied to POI 110 from power inverter 106 is shown as $P_{sup}$. $P_{sup}$ may be defined as $P_{bat}+P_{loss}$, where $P_{batt}$ is the battery power and $P_{loss}$ is the power loss in the battery system (e.g., losses in power inverter 106 and/or battery 108). $P_{bat}$ and $P_{sup}$ may be positive if power inverter 106 is providing power to POI 110 or negative if power inverter 106 is receiving power from POI 110. $P_{campus}$ and $P_{sup}$ combine at POI 110 to form $P_{POI}$. $P_{POI}$ may be defined as the power provided to energy grid 104 from POI 110. $P_{POI}$ may be positive if POI 110 is providing power to energy grid 104 or negative if POI 110 is receiving power from energy grid 104.

Still referring to FIG. 1, system 100 is shown to include a frequency response controller 112. Controller 112 may be configured to generate and provide power setpoints to power inverter 106. Power inverter 106 may use the power setpoints to control the amount of power $P_{sup}$ provided to POI 110 or drawn from POI 110. For example, power inverter 106 may be configured to draw power from POI 110 and store the power in battery 108 in response to receiving a negative power setpoint from controller 112. Conversely, power inverter 106 may be configured to draw power from battery 108 and provide the power to POI 110 in response to receiving a positive power setpoint from controller 112. The magnitude of the power setpoint may define the amount of power $P_{sup}$ provided to or from power inverter 106. Controller 112 may be configured to generate and provide power setpoints that optimize the value of operating system 100 over a time horizon.

In some embodiments, frequency response controller 112 uses power inverter 106 and battery 108 to perform frequency regulation for energy grid 104. Frequency regulation is the process of maintaining the stability of the grid frequency (e.g., 60 Hz in the United States). The grid frequency may remain stable and balanced as long as the total electric supply and demand of energy grid 104 are balanced. Any deviation from that balance may result in a deviation of the grid frequency from its desirable value. For example, an increase in demand may cause the grid frequency to decrease, whereas an increase in supply may cause the grid frequency to increase. Frequency response controller 112 may be configured to offset a fluctuation in the grid frequency by causing power inverter 106 to supply energy from battery 108 to energy grid 104 (e.g., to offset a decrease in grid frequency) or store energy from energy grid 104 in battery 108 (e.g., to offset an increase in grid frequency).

In some embodiments, frequency response controller 112 uses power inverter 106 and battery 108 to perform load shifting for campus 102. For example, controller 112 may cause power inverter 106 to store energy in battery 108 when energy prices are low and retrieve energy from battery 108 when energy prices are high in order to reduce the cost of electricity required to power campus 102. Load shifting may also allow system 100 reduce the demand charge incurred. Demand charge is an additional charge imposed by some utility providers based on the maximum power consumption during an applicable demand charge period. For example, a demand charge rate may be specified in terms of dollars per unit of power (e.g., $/kW) and may be multiplied by the peak power usage (e.g., kW) during a demand charge period to calculate the demand charge. Load shifting may allow system 100 to smooth momentary spikes in the electric demand of campus 102 by drawing energy from battery 108 in order to reduce peak power draw from energy grid 104, thereby decreasing the demand charge incurred.

Still referring to FIG. 1, system 100 is shown to include an incentive provider 114. Incentive provider 114 may be a utility (e.g., an electric utility), a regional transmission organization (RTO), an independent system operator (ISO), or any other entity that provides incentives for performing frequency regulation. For example, incentive provider 114 may provide system 100 with monetary incentives for participating in a frequency response program. In order to participate in the frequency response program, system 100 may maintain a reserve capacity of stored energy (e.g., in battery 108) that can be provided to energy grid 104. System 100 may also maintain the capacity to draw energy from energy grid 104 and store the energy in battery 108. Reserving both of these capacities may be accomplished by managing the state-of-charge of battery 108.

Frequency response controller 112 may provide incentive provider 114 with a price bid and a capability bid. The price bid may include a price per unit power (e.g., $/MW) for reserving or storing power that allows system 100 to participate in a frequency response program offered by incentive provider 114. The price per unit power bid by frequency response controller 112 is referred to herein as the "capability price." The price bid may also include a price for actual performance, referred to herein as the "performance price." The capability bid may define an amount of power (e.g., MW) that system 100 will reserve or store in battery 108 to perform frequency response, referred to herein as the "capability bid."

Incentive provider 114 may provide frequency response controller 112 with a capability clearing price $CP_{cap}$, a performance clearing price $CP_{perf}$, and a regulation award $Reg_{award}$, which correspond to the capability price, the performance price, and the capability bid, respectively. In some embodiments, $CP_{cap}$, $CP_{perf}$, and $Reg_{award}$ are the same as the corresponding bids placed by controller 112. In other embodiments, $CP_{cap}$, $CP_{perf}$, and $Reg_{award}$ may not be the same as the bids placed by controller 112. For example, $CP_{cap}$, $CP_{perf}$, and $Reg_{award}$ may be generated by incentive provider 114 based on bids received from multiple participants in the frequency response program. Controller 112 may use $CP_{cap}$, $CP_{perf}$, and $Reg_{award}$ to perform frequency regulation.

Frequency response controller 112 is shown receiving a regulation signal from incentive provider 114. The regulation signal may specify a portion of the regulation award $Reg_{award}$ that frequency response controller 112 is to add or remove from energy grid 104. In some embodiments, the regulation signal is a normalized signal (e.g., between −1 and 1) specifying a proportion of $Reg_{award}$. Positive values of the regulation signal may indicate an amount of power to add to energy grid 104, whereas negative values of the regulation signal may indicate an amount of power to remove from energy grid 104.

Frequency response controller 112 may respond to the regulation signal by generating an optimal power setpoint for power inverter 106. The optimal power setpoint may take into account both the potential revenue from participating in the frequency response program and the costs of participation. Costs of participation may include, for example, a monetized cost of battery degradation as well as the energy and demand charges that will be incurred. The optimization may be performed using sequential quadratic programming, dynamic programming, or any other optimization technique.

In some embodiments, controller 112 uses a battery life model to quantify and monetize battery degradation as a function of the power setpoints provided to power inverter 106. Advantageously, the battery life model allows controller 112 to perform an optimization that weighs the revenue generation potential of participating in the frequency response program against the cost of battery degradation and other costs of participation (e.g., less battery power available for campus 102, increased electricity costs, etc.). An exemplary regulation signal and power response are described in greater detail with reference to FIG. 2.

Figure 2:
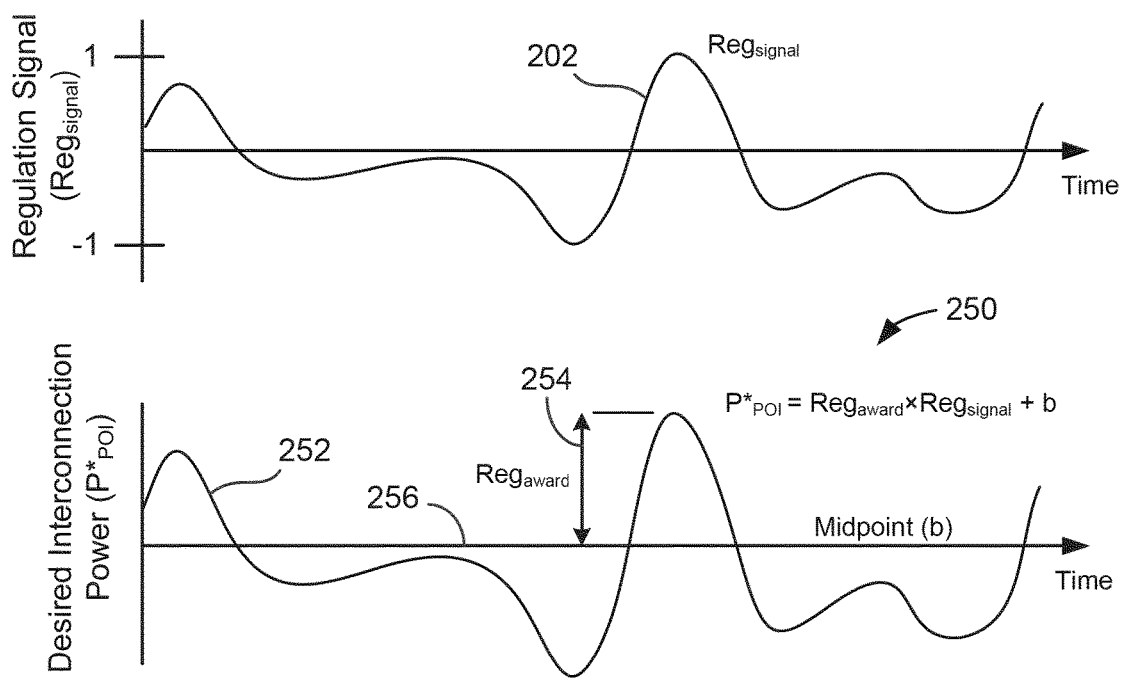
FIG. 2 is a graph of a regulation signal which may be provided to the system of FIG. 1 and a frequency response signal which may be generated by the system of FIG. 1, according to an exemplary embodiment.

Referring now to FIG. 2, a pair of frequency response graphs 200 and 250 are shown, according to an exemplary embodiment. Graph 200 illustrates a regulation signal $Reg_{signal}$ 202 as a function of time. $Reg_{signal}$ 202 is shown as a normalized signal ranging from −1 to 1 (i.e., $-1 \leq Reg_{signal} \leq 1$). $Reg_{signal}$ 202 may be generated by incentive provider 114 and provided to frequency response controller 112. $Reg_{signal}$ 202 may define a proportion of the regulation award $Reg_{award}$ 254 that controller 112 is to add or remove from energy grid 104, relative to a baseline value referred to as the midpoint b 256. For example, if the value of $Reg_{award}$ 254 is 10 MW, a regulation signal value of 0.5 (i.e., $Reg_{signal}=0.5$) may indicate that system 100 is requested to add 5 MW of power at POI 110 relative to midpoint b (e.g., $P^*_{POI}=10$ MW×0.5+b), whereas a regulation signal value of −0.3 may indicate that system 100 is requested to remove 3 MW of power from POI 110 relative to midpoint b (e.g., $P^*_{POI}=10$ MW×−0.3+b).

Graph 250 illustrates the desired interconnection power $P^*_{POI}$ 252 as a function of time. $P^*_{POI}$ 252 may be calculated by frequency response controller 112 based on $Reg_{signal}$ 202, $Reg_{award}$ 254, and a midpoint b 256. For example, controller 112 may calculate $P^*_{POI}$ 252 using the following equation:

$$P^*_{POI}=Reg_{award} \times Reg_{signal}+b$$

where $P^*_{POI}$ represents the desired power at POI 110 (e.g., $P^*_{POI}=P_{sup}+P_{campus}$) and b is the midpoint. Midpoint b may be defined (e.g., set or optimized) by controller 112 and may represent the midpoint of regulation around which the load is modified in response to $Reg_{signal}$ 202. Optimal adjustment of midpoint b may allow controller 112 to actively participate in the frequency response market while also taking into account the energy and demand charge that will be incurred.

In order to participate in the frequency response market, controller 112 may perform several tasks. Controller 112 may generate a price bid (e.g., $/MW) that includes the capability price and the performance price. In some embodiments, controller 112 sends the price bid to incentive provider 114 at approximately 15:30 each day and the price bid remains in effect for the entirety of the next day. Prior to beginning a frequency response period, controller 112 may generate the capability bid (e.g., MW) and send the capability bid to incentive provider 114. In some embodiments, controller 112 generates and sends the capability bid to incentive provider 114 approximately 1.5 hours before a frequency response period begins. In an exemplary embodiment, each frequency response period has a duration of one hour; however, it is contemplated that frequency response periods may have any duration.

At the start of each frequency response period, controller 112 may generate the midpoint b around which controller 112 plans to perform frequency regulation. In some embodiments, controller 112 generates a midpoint b that will maintain battery 108 at a constant state-of-charge (SOC) (i.e. a midpoint that will result in battery 108 having the same SOC at the beginning and end of the frequency response period). In other embodiments, controller 112 generates midpoint b using an optimization procedure that allows the SOC of battery 108 to have different values at the beginning and end of the frequency response period. For example, controller 112 may use the SOC of battery 108 as a constrained variable that depends on midpoint b in order to optimize a value function that takes into account frequency response revenue, energy costs, and the cost of battery degradation. Exemplary techniques for calculating and/or optimizing midpoint b under both the constant SOC scenario and the variable SOC scenario are described in detail in U.S. patent application Ser. No. 15/247,883 filed Aug. 25, 2016, U.S. patent application Ser. No. 15/247,885 filed Aug. 25, 2016, and U.S. patent application Ser. No. 15/247,886 filed Aug. 25, 2016. The entire disclosure of each of these patent applications is incorporated by reference herein.

During each frequency response period, controller 112 may periodically generate a power setpoint for power inverter 106. For example, controller 112 may generate a power setpoint for each time step in the frequency response period. In some embodiments, controller 112 generates the power setpoints using the equation:

$$P^*_{POI}=Reg_{award} \times Reg_{signal}+b$$

where $P^*_{POI}=P_{sup}+P_{campus}$. Positive values of $P^*_{POI}$ indicate energy flow from POI 110 to energy grid 104. Positive values of $P_{sup}$ and $P_{campus}$ indicate energy flow to POI 110 from power inverter 106 and campus 102, respectively.

In other embodiments, controller 112 generates the power setpoints using the equation:

$$P^*_{POI} = \text{Reg}_{award} \times \text{Res}_{FR} + b$$

where $\text{Res}_{FR}$ is an optimal frequency response generated by optimizing a value function. Controller 112 may subtract $P_{campus}$ from $P^*_{POI}$ to generate the power setpoint for power inverter 106 (i.e., $P_{sup} = P^*_{POI} - P_{campus}$). The power setpoint for power inverter 106 indicates the amount of power that power inverter 106 is to add to POI 110 (if the power setpoint is positive) or remove from POI 110 (if the power setpoint is negative). Exemplary techniques which can be used by controller 112 to calculate power inverter setpoints are described in detail in U.S. patent application Ser. No. 15/247,793 filed Aug. 25, 2016, U.S. patent application Ser. No. 15/247,784 filed Aug. 25, 2016, and U.S. patent application Ser. No. 15/247,777 filed Aug. 25, 2016. The entire disclosure of each of these patent applications is incorporated by reference herein.

Photovoltaic Energy System with Frequency Regulation and Ramp Rate Control

Figure 3:
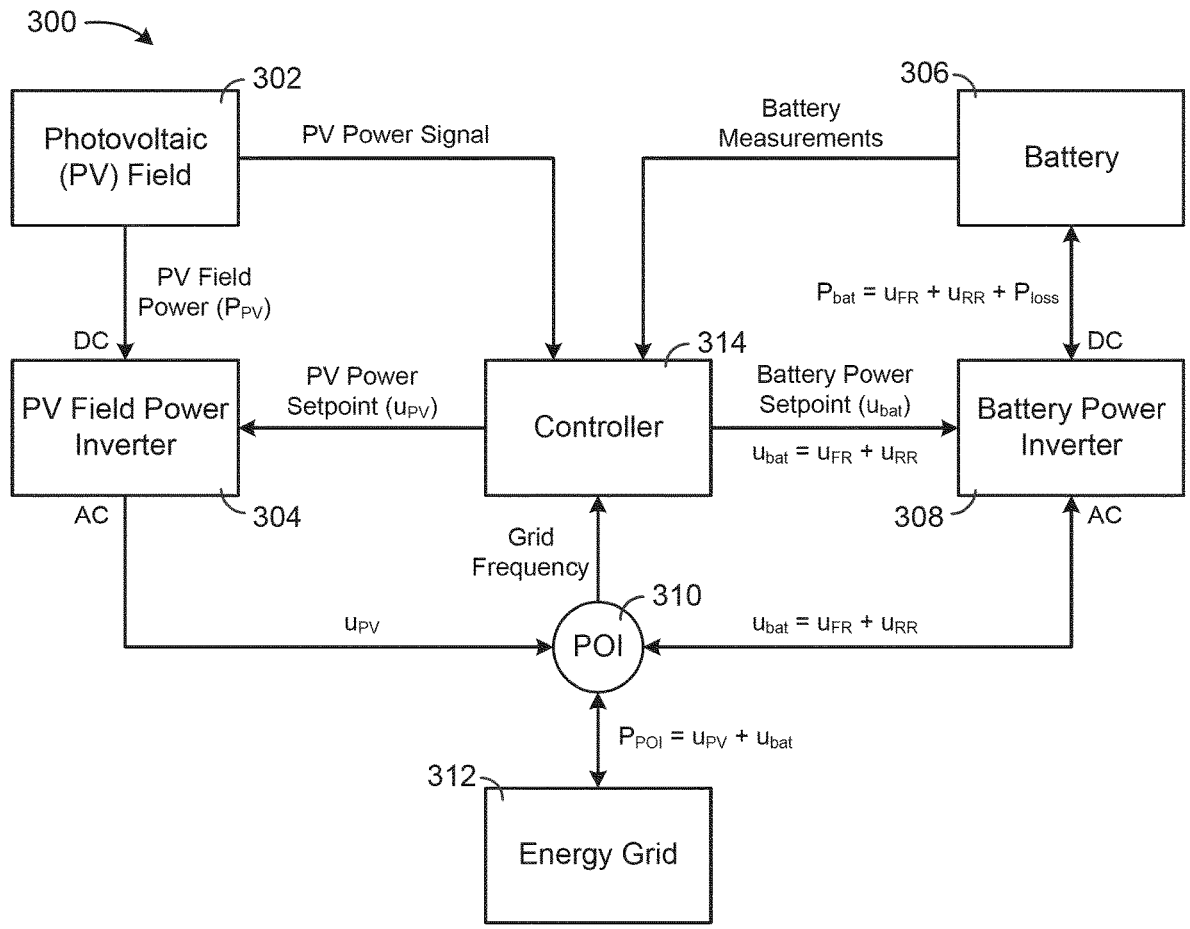
FIG. 3 is a block diagram of a photovoltaic energy system configured to simultaneously perform both ramp rate control and frequency regulation while maintaining the state-of-charge of a battery within a desired range, according to an exemplary embodiment.
Figure 4:
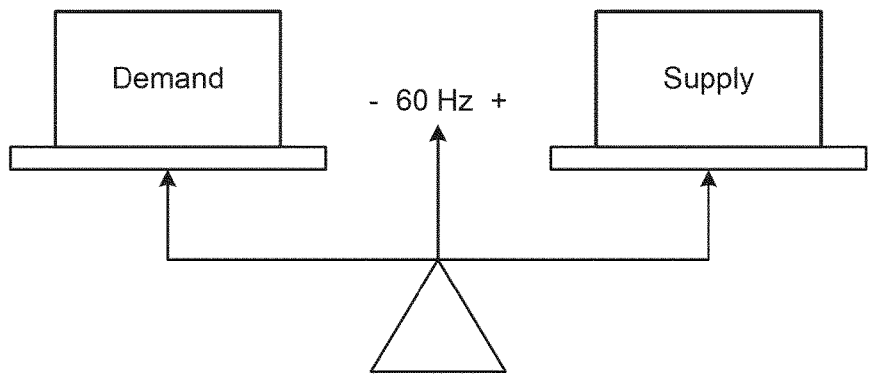
FIG. 4 is a drawing illustrating the electric supply to an energy grid and electric demand from the energy grid which must be balanced in order to maintain the grid frequency, according to an exemplary embodiment.

Referring now to FIGS. 3-4, a photovoltaic energy system 300 that uses battery storage to simultaneously perform both ramp rate control and frequency regulation is shown, according to an exemplary embodiment. Ramp rate control is the process of offsetting ramp rates (i.e., increases or decreases in the power output of an energy system such as a photovoltaic energy system) that fall outside of compliance limits determined by the electric power authority overseeing the energy grid. Ramp rate control typically requires the use of an energy source that allows for offsetting ramp rates by either supplying additional power to the grid or consuming more power from the grid. In some instances, a facility is penalized for failing to comply with ramp rate requirements.

Frequency regulation is the process of maintaining the stability of the grid frequency (e.g., 60 Hz in the United States). As shown in FIG. 4, the grid frequency may remain balanced at 60 Hz as long as there is a balance between the demand from the energy grid and the supply to the energy grid. An increase in demand yields a decrease in grid frequency, whereas an increase in supply yields an increase in grid frequency. During a fluctuation of the grid frequency, system 300 may offset the fluctuation by either drawing more energy from the energy grid (e.g., if the grid frequency is too high) or by providing energy to the energy grid (e.g., if the grid frequency is too low). Advantageously, system 300 may use battery storage in combination with photovoltaic power to perform frequency regulation while simultaneously complying with ramp rate requirements and maintaining the state-of-charge of the battery storage within a predetermined desirable range.

Referring particularly to FIG. 3, system 300 is shown to include a photovoltaic (PV) field 302, a PV field power inverter 304, a battery 306, a battery power inverter 308, a point of interconnection (POI) 310, and an energy grid 312. PV field 302 may include a collection of photovoltaic cells. The photovoltaic cells are configured to convert solar energy (i.e., sunlight) into electricity using a photovoltaic material such as monocrystalline silicon, polycrystalline silicon, amorphous silicon, cadmium telluride, copper indium gallium selenide/sulfide, or other materials that exhibit the photovoltaic effect. In some embodiments, the photovoltaic cells are contained within packaged assemblies that form solar panels. Each solar panel may include a plurality of linked photovoltaic cells. The solar panels may combine to form a photovoltaic array.

PV field 302 may have any of a variety of sizes and/or locations. In some embodiments, PV field 302 is part of a large-scale photovoltaic power station (e.g., a solar park or farm) capable of providing an energy supply to a large number of consumers. When implemented as part of a large-scale system, PV field 302 may cover multiple hectares and may have power outputs of tens or hundreds of megawatts. In other embodiments, PV field 302 may cover a smaller area and may have a relatively lesser power output (e.g., between one and ten megawatts, less than one megawatt, etc.). For example, PV field 302 may be part of a rooftop-mounted system capable of providing enough electricity to power a single home or building. It is contemplated that PV field 302 may have any size, scale, and/or power output, as may be desirable in different implementations.

PV field 302 may generate a direct current (DC) output that depends on the intensity and/or directness of the sunlight to which the solar panels are exposed. The directness of the sunlight may depend on the angle of incidence of the sunlight relative to the surfaces of the solar panels. The intensity of the sunlight may be affected by a variety of environmental factors such as the time of day (e.g., sunrises and sunsets) and weather variables such as clouds that cast shadows upon PV field 302. When PV field 302 is partially or completely covered by shadow, the power output of PV field 302 (i.e., PV field power $P_{PV}$) may drop as a result of the decrease in solar intensity.

In some embodiments, PV field 302 is configured to maximize solar energy collection. For example, PV field 302 may include a solar tracker (e.g., a GPS tracker, a sunlight sensor, etc.) that adjusts the angle of the solar panels so that the solar panels are aimed directly at the sun throughout the day. The solar tracker may allow the solar panels to receive direct sunlight for a greater portion of the day and may increase the total amount of power produced by PV field 302. In some embodiments, PV field 302 includes a collection of mirrors, lenses, or solar concentrators configured to direct and/or concentrate sunlight on the solar panels. The energy generated by PV field 302 may be stored in battery 306 or provided to energy grid 312.

Still referring to FIG. 3, system 300 is shown to include a PV field power inverter 304. Power inverter 304 may be configured to convert the DC output of PV field 302 $P_{PV}$ into an alternating current (AC) output that can be fed into energy grid 312 or used by a local (e.g., off-grid) electrical network. For example, power inverter 304 may be a solar inverter or grid-tie inverter configured to convert the DC output from PV field 302 into a sinusoidal AC output synchronized to the grid frequency of energy grid 312. In some embodiments, power inverter 304 receives a cumulative DC output from PV field 302. For example, power inverter 304 may be a string inverter or a central inverter. In other embodiments, power inverter 304 may include a collection of micro-inverters connected to each solar panel or solar cell. PV field power inverter 304 may convert the DC power output $P_{PV}$ into an AC power output $u_{PV}$ and provide the AC power output $u_{PV}$ to POI 310.

Power inverter 304 may receive the DC power output $P_{PV}$ from PV field 302 and convert the DC power output to an AC power output that can be fed into energy grid 312. Power inverter 304 may synchronize the frequency of the AC power output with that of energy grid 312 (e.g., 50 Hz or 60 Hz) using a local oscillator and may limit the voltage of the AC power output to no higher than the grid voltage. In some embodiments, power inverter 304 is a resonant inverter that includes or uses LC circuits to remove the harmonics from a simple square wave in order to achieve a sine wave matching the frequency of energy grid 312. In various embodiments, power inverter 304 may operate using high-frequency transformers, low-frequency transformers, or without transformers. Low-frequency transformers may convert the DC output from PV field 302 directly to the AC output provided to energy grid 312. High-frequency transformers may employ a multi-step process that involves converting the DC output to high-frequency AC, then back to DC, and then finally to the AC output provided to energy grid 312.

Power inverter 304 may be configured to perform maximum power point tracking and/or anti-islanding. Maximum power point tracking may allow power inverter 304 to produce the maximum possible AC power from PV field 302. For example, power inverter 304 may sample the DC power output from PV field 302 and apply a variable resistance to find the optimum maximum power point. Anti-islanding is a protection mechanism that immediately shuts down power inverter 304 (i.e., preventing power inverter 304 from generating AC power) when the connection to an electricity-consuming load no longer exists. In some embodiments, PV field power inverter 304 performs ramp rate control by limiting the power generated by PV field 302.

Still referring to FIG. 3, system 300 is shown to include a battery power inverter 308. Battery power inverter 308 may be configured to draw a DC power $P_{bat}$ from battery 306, convert the DC power $P_{bat}$ into an AC power $u_{bat}$, and provide the AC power $u_{bat}$ to POI 310. Battery power inverter 308 may also be configured to draw the AC power $u_{bat}$ from POI 310, convert the AC power $u_{bat}$ into a DC battery power $P_{bat}$, and store the DC battery power $P_{bat}$ in battery 306. The DC battery power $P_{bat}$ may be positive if battery 306 is providing power to battery power inverter 308 (i.e., if battery 306 is discharging) or negative if battery 306 is receiving power from battery power inverter 308 (i.e., if battery 306 is charging). Similarly, the AC battery power $u_{bat}$ may be positive if battery power inverter 308 is providing power to POI 310 or negative if battery power inverter 308 is receiving power from POI 310.

The AC battery power $u_{bat}$ is shown to include an amount of power used for frequency regulation (i.e., $u_{FR}$) and an amount of power used for ramp rate control (i.e., $u_{RR}$) which together form the AC battery power (i.e., $u_{bat}=u_{FR}+u_{RR}$). The DC battery power $P_{bat}$ is shown to include both $u_{FR}$ and $u_{RR}$ as well as an additional term $P_{loss}$ representing power losses in battery 306 and/or battery power inverter 308 (i.e., $P_{bat}=u_{FR}+u_{RR}+P_{loss}$). The PV field power $u_{PV}$ and the battery power $u_{bat}$ combine at POI 110 to form $P_{POI}$ (i.e., $P_{POI}=u_{PV}+u_{bat}$), which represents the amount of power provided to energy grid 312. $P_{POI}$ may be positive if POI 310 is providing power to energy grid 312 or negative if POI 310 is receiving power from energy grid 312.

Still referring to FIG. 3, system 300 is shown to include a controller 314. Controller 314 may be configured to generate a PV power setpoint $u_{PV}$ for PV field power inverter 304 and a battery power setpoint $u_{bat}$ for battery power inverter 308. Throughout this disclosure, the variable $u_{PV}$ is used to refer to both the PV power setpoint generated by controller 314 and the AC power output of PV field power inverter 304 since both quantities have the same value. Similarly, the variable $u_{bat}$ is used to refer to both the battery power setpoint generated by controller 314 and the AC power output/input of battery power inverter 308 since both quantities have the same value.

PV field power inverter 304 uses the PV power setpoint $u_{PV}$ to control an amount of the PV field power $P_{PV}$ to provide to POI 110. The magnitude of $u_{PV}$ may be the same as the magnitude of $P_{PV}$ or less than the magnitude of $P_{PV}$. For example, $u_{PV}$ may be the same as $P_{PV}$ if controller 314 determines that PV field power inverter 304 is to provide all of the photovoltaic power $P_{PV}$ to POI 310. However, $u_{PV}$ may be less than $P_{PV}$ if controller 314 determines that PV field power inverter 304 is to provide less than all of the photovoltaic power $P_{PV}$ to POI 310. For example, controller 314 may determine that it is desirable for PV field power inverter 304 to provide less than all of the photovoltaic power $P_{PV}$ to POI 310 to prevent the ramp rate from being exceeded and/or to prevent the power at POI 310 from exceeding a power limit.

Battery power inverter 308 uses the battery power setpoint $u_{bat}$ to control an amount of power charged or discharged by battery 306. The battery power setpoint $u_{bat}$ may be positive if controller 314 determines that battery power inverter 308 is to draw power from battery 306 or negative if controller 314 determines that battery power inverter 308 is to store power in battery 306. The magnitude of $u_{bat}$ controls the rate at which energy is charged or discharged by battery 306.

Controller 314 may generate $u_{PV}$ and $u_{bat}$ based on a variety of different variables including, for example, a power signal from PV field 302 (e.g., current and previous values for $P_{PV}$), the current state-of-charge (SOC) of battery 306, a maximum battery power limit, a maximum power limit at POI 310, the ramp rate limit, the grid frequency of energy grid 312, and/or other variables that can be used by controller 314 to perform ramp rate control and/or frequency regulation. Advantageously, controller 314 generates values for $u_{PV}$ and $u_{bat}$ that maintain the ramp rate of the PV power within the ramp rate compliance limit while participating in the regulation of grid frequency and maintaining the SOC of battery 306 within a predetermined desirable range.

An exemplary controller which can be used as controller 314 and exemplary processes which may be performed by controller 314 to generate the PV power setpoint $u_{PV}$ and the battery power setpoint $u_{bat}$ are described in detail in U.S. patent application Ser. No. 15/247,869 filed Aug. 25, 2016, U.S. patent application Ser. No. 15/247,844 filed Aug. 25, 2016, U.S. patent application Ser. No. 15/247,788 filed Aug. 25, 2016, U.S. patent application Ser. No. 15/247,872 filed Aug. 25, 2016, U.S. patent application Ser. No. 15/247,880 filed Aug. 25, 2016, and U.S. patent application Ser. No. 15/247,873 filed Aug. 25, 2016. The entire disclosure of each of these patent applications is incorporated by reference herein.

Energy Storage System with Thermal and Electrical Energy Storage

Figure 5:
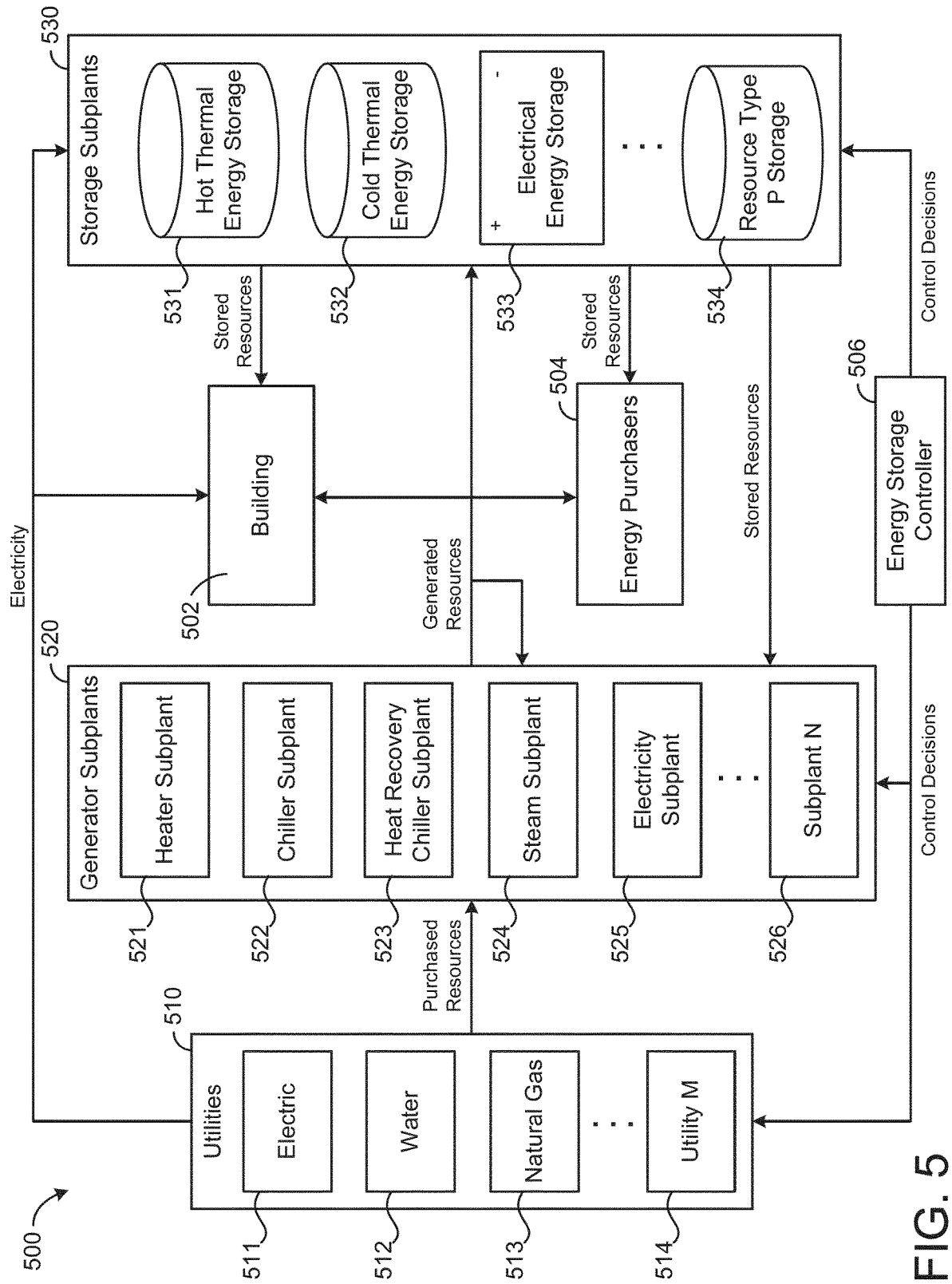
FIG. 5 is a block diagram of an energy storage system including thermal energy storage and electrical energy storage, according to an exemplary embodiment.

Referring now to FIG. 5, a block diagram of an energy storage system 500 is shown, according to an exemplary embodiment. Energy storage system 500 is shown to include a building 502. Building 502 may be the same or similar to buildings 116, as described with reference to FIG. 1. For example, building 502 may be equipped with a HVAC system and/or a building management system that operates to control conditions within building 502. In some embodiments, building 502 includes multiple buildings (i.e., a campus) served by energy storage system 500. Building 502 may demand various resources including, for example, hot thermal energy (e.g., hot water), cold thermal energy (e.g., cold water), and/or electrical energy. The resources may be demanded by equipment or subsystems within building 502 or by external systems that provide services for building 502 (e.g., heating, cooling, air circulation, lighting, electricity, etc.). Energy storage system 500 operates to satisfy the resource demand associated with building 502.

Energy storage system 500 is shown to include a plurality of utilities 510. Utilities 510 may provide energy storage system 500 with resources such as electricity, water, natural gas, or any other resource that can be used by energy storage system 500 to satisfy the demand of building 502. For example, utilities 510 are shown to include an electric utility 511, a water utility 512, a natural gas utility 513, and utility M 514, where M is the total number of utilities 510. In some embodiments, utilities 510 are commodity suppliers from which resources and other types of commodities can be purchased. Resources purchased from utilities 510 can be used by generator subplants 520 to produce generated resources (e.g., hot water, cold water, electricity, steam, etc.), stored in storage subplants 530 for later use, or provided directly to building 502. For example, utilities 510 are shown providing electricity directly to building 502 and storage subplants 530.

Energy storage system 500 is shown to include a plurality of generator subplants 520. In some embodiments, generator subplants 520 are components of a central plant (e.g., central plant 118). Generator subplants 520 are shown to include a heater subplant 521, a chiller subplant 522, a heat recovery chiller subplant 523, a steam subplant 524, an electricity subplant 525, and subplant N, where N is the total number of generator subplants 520. Generator subplants 520 may be configured to convert one or more input resources into one or more output resources by operation of the equipment within generator subplants 520. For example, heater subplant 521 may be configured to generate hot thermal energy (e.g., hot water) by heating water using electricity or natural gas. Chiller subplant 522 may be configured to generate cold thermal energy (e.g., cold water) by chilling water using electricity. Heat recovery chiller subplant 523 may be configured to generate hot thermal energy and cold thermal energy by removing heat from one water supply and adding the heat to another water supply. Steam subplant 524 may be configured to generate steam by boiling water using electricity or natural gas. Electricity subplant 525 may be configured to generate electricity using mechanical generators (e.g., a steam turbine, a gas-powered generator, etc.) or other types of electricity-generating equipment (e.g., photovoltaic equipment, hydroelectric equipment, etc.).

The input resources used by generator subplants 520 may be provided by utilities 510, retrieved from storage subplants 530, and/or generated by other generator subplants 520. For example, steam subplant 524 may produce steam as an output resource. Electricity subplant 525 may include a steam turbine that uses the steam generated by steam subplant 524 as an input resource to generate electricity. The output resources produced by generator subplants 520 may be stored in storage subplants 530, provided to building 502, sold to energy purchasers 504, and/or used by other generator subplants 520. For example, the electricity generated by electricity subplant 525 may be stored in electrical energy storage 533, used by chiller subplant 522 to generate cold thermal energy, provided to building 502, and/or sold to energy purchasers 504.

Energy storage system 500 is shown to include storage subplants 530. In some embodiments, storage subplants 530 are components of a central plant (e.g., central plant 118). Storage subplants 530 may be configured to store energy and other types of resources for later use. Each of storage subplants 530 may be configured to store a different type of resource. For example, storage subplants 530 are shown to include hot thermal energy storage 531 (e.g., one or more hot water storage tanks), cold thermal energy storage 532 (e.g., one or more cold thermal energy storage tanks), electrical energy storage 533 (e.g., one or more batteries), and resource type P storage 534, where P is the total number of storage subplants 530. The resources stored in subplants 530 may be purchased directly from utilities 510 or generated by generator subplants 520.

In some embodiments, storage subplants 530 are used by energy storage system 500 to take advantage of price-based demand response (PBDR) programs. PBDR programs encourage consumers to reduce consumption when generation, transmission, and distribution costs are high. PBDR programs are typically implemented (e.g., by utilities 510) in the form of energy prices that vary as a function of time. For example, utilities 510 may increase the price per unit of electricity during peak usage hours to encourage customers to reduce electricity consumption during peak times. Some utilities also charge consumers a separate demand charge based on the maximum rate of electricity consumption at any time during a predetermined demand charge period.

Advantageously, storing energy and other types of resources in subplants 530 allows for the resources to be purchased at times when the resources are relatively less expensive (e.g., during non-peak electricity hours) and stored for use at times when the resources are relatively more expensive (e.g., during peak electricity hours). Storing resources in subplants 530 also allows the resource demand of building 502 to be shifted in time. For example, resources can be purchased from utilities 510 at times when the demand for heating or cooling is low and immediately converted into hot or cold thermal energy by generator subplants 520. The thermal energy can be stored in storage subplants 530 and retrieved at times when the demand for heating or cooling is high. This allows energy storage system 500 to smooth the resource demand of building 502 and reduces the maximum required capacity of generator subplants 520. Smoothing the demand also allows energy storage system 500 to reduce the peak electricity consumption, which results in a lower demand charge.

In some embodiments, storage subplants 530 are used by energy storage system 500 to take advantage of incentive-based demand response (IBDR) programs. IBDR programs provide incentives to customers who have the capability to store energy, generate energy, or curtail energy usage upon request. Incentives are typically provided in the form of monetary revenue paid by utilities 510 or by an independent service operator (ISO). IBDR programs supplement traditional utility-owned generation, transmission, and distribution assets with additional options for modifying demand load curves. For example, stored energy can be sold to energy purchasers 504 (e.g., an energy grid) to supplement the energy generated by utilities 510. In some instances, incentives for participating in an IBDR program vary based on how quickly a system can respond to a request to change power output/consumption. Faster responses may be compensated at a higher level. Advantageously, electrical energy storage 533 allows system 500 to quickly respond to a request for electric power by rapidly discharging stored electrical energy to energy purchasers 504.

Still referring to FIG. 5, energy storage system 500 is shown to include an energy storage controller 506. Energy storage controller 506 may be configured to control the distribution, production, storage, and usage of resources in energy storage system 500. In some embodiments, energy storage controller 506 performs an optimization process determine an optimal set of control decisions for each time step within an optimization period. The control decisions may include, for example, an optimal amount of each resource to purchase from utilities 510, an optimal amount of each resource to produce or convert using generator subplants 520, an optimal amount of each resource to store or remove from storage subplants 530, an optimal amount of each resource to sell to energy purchasers 504, and/or an optimal amount of each resource to provide to building 502. In some embodiments, the control decisions include an optimal amount of each input resource and output resource for each of generator subplants 520.

Controller 506 may be configured to maximize the economic value of operating energy storage system 500 over the duration of the optimization period. The economic value may be defined by a value function that expresses economic value as a function of the control decisions made by controller 506. The value function may account for the cost of resources purchased from utilities 510, revenue generated by selling resources to energy purchasers 504, and the cost of operating energy storage system 500. In some embodiments, the cost of operating energy storage system 500 includes a cost for losses in battery capacity as a result of the charging and discharging electrical energy storage 533. The cost of operating energy storage system 500 may also include a cost of excessive equipment start/stops during the optimization period.

Each of subplants 520-530 may include equipment that can be controlled by energy storage controller 506 to optimize the performance of energy storage system 500. Subplant equipment may include, for example, heating devices, chillers, heat recovery heat exchangers, cooling towers, energy storage devices, pumps, valves, and/or other devices of subplants 520-530. Individual devices of generator subplants 520 can be turned on or off to adjust the resource production of each generator subplant. In some embodiments, individual devices of generator subplants 520 can be operated at variable capacities (e.g., operating a chiller at 10% capacity or 60% capacity) according to an operating setpoint received from energy storage controller 506.

In some embodiments, one or more of subplants 520-530 includes a subplant level controller configured to control the equipment of the corresponding subplant. For example, energy storage controller 506 may determine an on/off configuration and global operating setpoints for the subplant equipment. In response to the on/off configuration and received global operating setpoints, the subplant controllers may turn individual devices of their respective equipment on or off, and implement specific operating setpoints (e.g., damper position, vane position, fan speed, pump speed, etc.) to reach or maintain the global operating setpoints.

In some embodiments, controller 506 maximizes the life cycle economic value of energy storage system 500 while participating in PBDR programs, IBDR programs, or simultaneously in both PBDR and IBDR programs. For the IBDR programs, controller 506 may use statistical estimates of past clearing prices, mileage ratios, and event probabilities to determine the revenue generation potential of selling stored energy to energy purchasers 504. For the PBDR programs, controller 506 may use predictions of ambient conditions, facility thermal loads, and thermodynamic models of installed equipment to estimate the resource consumption of subplants 520. Controller 506 may use predictions of the resource consumption to monetize the costs of running the equipment.

Controller 506 may automatically determine (e.g., without human intervention) a combination of PBDR and/or IBDR programs in which to participate over the optimization period in order to maximize economic value. For example, controller 506 may consider the revenue generation potential of IBDR programs, the cost reduction potential of PBDR programs, and the equipment maintenance/replacement costs that would result from participating in various combinations of the IBDR programs and PBDR programs. Controller 506 may weigh the benefits of participation against the costs of participation to determine an optimal combination of programs in which to participate. Advantageously, this allows controller 506 to determine an optimal set of control decisions that maximize the overall value of operating energy storage system 500.

In some instances, controller 506 may determine that it would be beneficial to participate in an IBDR program when the revenue generation potential is high and/or the costs of participating are low. For example, controller 506 may receive notice of a synchronous reserve event from an IBDR program which requires energy storage system 500 to shed a predetermined amount of power. Controller 506 may determine that it is optimal to participate in the IBDR program if cold thermal energy storage 532 has enough capacity to provide cooling for building 502 while the load on chiller subplant 522 is reduced in order to shed the predetermined amount of power.

In other instances, controller 506 may determine that it would not be beneficial to participate in an IBDR program when the resources required to participate are better allocated elsewhere. For example, if building 502 is close to setting a new peak demand that would greatly increase the PBDR costs, controller 506 may determine that only a small portion of the electrical energy stored in electrical energy storage 533 will be sold to energy purchasers 504 in order to participate in a frequency response market. Controller 506 may determine that the remainder of the electrical energy will be used to power chiller subplant 522 to prevent a new peak demand from being set.

In some embodiments, energy storage system 500 and controller include some or all of the components and/or features described in U.S. patent application Ser. No. 15/247,875 filed Aug. 25, 2016, U.S. patent application Ser. No. 15/247,879 filed Aug. 25, 2016, and U.S. patent application Ser. No. 15/247,881 filed Aug. 25, 2016. The entire disclosure of each of these patent applications is incorporated by reference herein.

Energy Storage Controller

Figure 6:
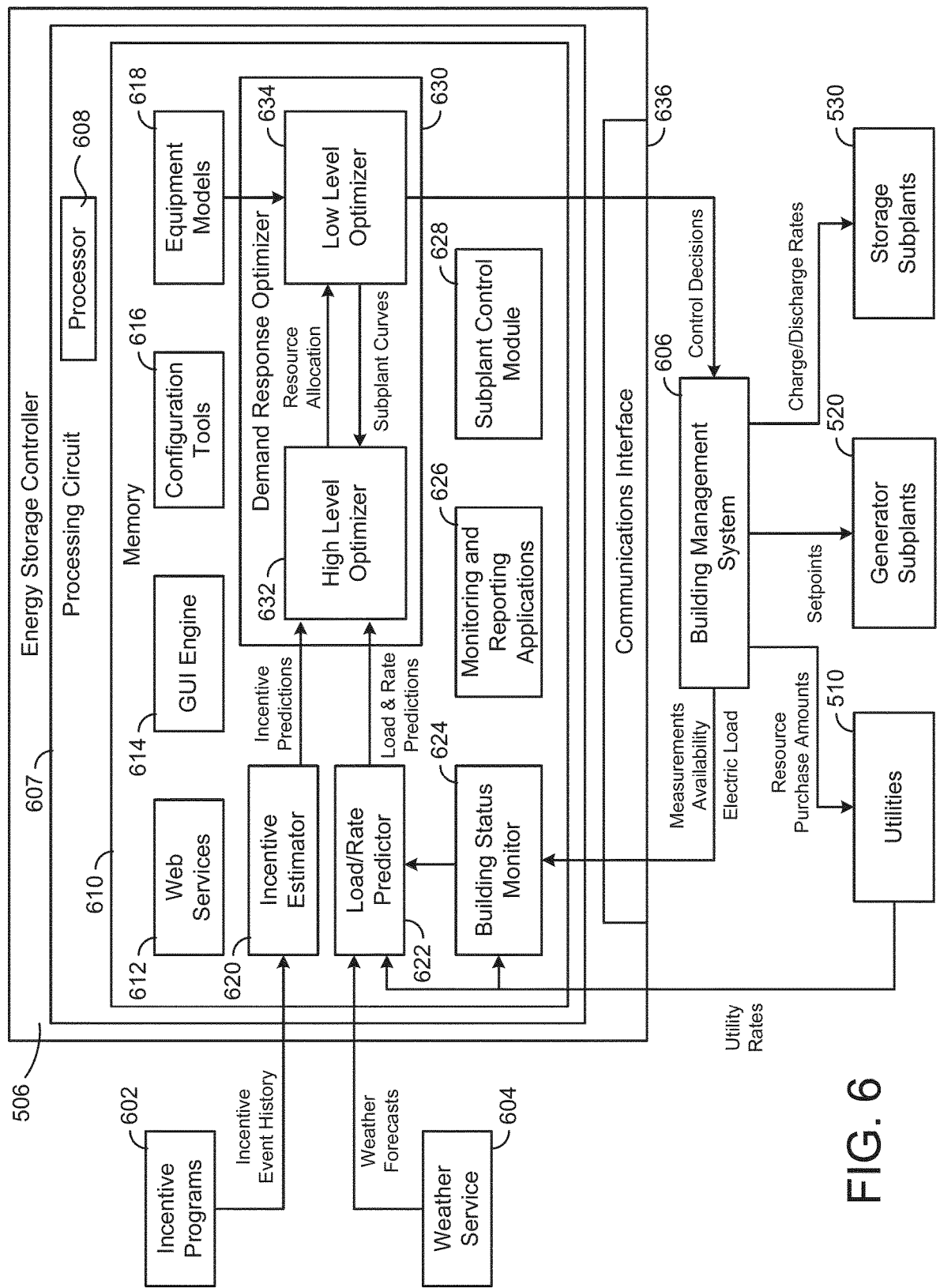
FIG. 6 is block diagram of an energy storage controller which may be used to operate the energy storage system of FIG. 5, according to an exemplary embodiment.

Referring now to FIG. 6, a block diagram illustrating energy storage controller 506 in greater detail is shown, according to an exemplary embodiment. Energy storage controller 506 is shown providing control decisions to a building management system (BMS) 606. In some embodiments, BMS 606 is the same or similar the BMS described with reference to FIG. 1. The control decisions provided to BMS 606 may include resource purchase amounts for utilities 510, setpoints for generator subplants 520, and/or charge/discharge rates for storage subplants 530.

BMS 606 may be configured to monitor conditions within a controlled building or building zone. For example, BMS 606 may receive input from various sensors (e.g., temperature sensors, humidity sensors, airflow sensors, voltage sensors, etc.) distributed throughout the building and may report building conditions to energy storage controller 506. Building conditions may include, for example, a temperature of the building or a zone of the building, a power consumption (e.g., electric load) of the building, a state of one or more actuators configured to affect a controlled state within the building, or other types of information relating to the controlled building. BMS 606 may operate subplants 520-

530 to affect the monitored conditions within the building and to serve the thermal energy loads of the building.

BMS 606 may receive control signals from energy storage controller 506 specifying on/off states, charge/discharge rates, and/or setpoints for the subplant equipment. BMS 606 may control the equipment (e.g., via actuators, power relays, etc.) in accordance with the control signals provided by energy storage controller 506. For example, BMS 606 may operate the equipment using closed loop control to achieve the setpoints specified by energy storage controller 506. In various embodiments, BMS 606 may be combined with energy storage controller 506 or may be part of a separate building management system. According to an exemplary embodiment, BMS 606 is a METASYS® brand building management system, as sold by Johnson Controls, Inc.

Energy storage controller 506 may monitor the status of the controlled building using information received from BMS 606. Energy storage controller 506 may be configured to predict the thermal energy loads (e.g., heating loads, cooling loads, etc.) of the building for plurality of time steps in an optimization period (e.g., using weather forecasts from a weather service 604). Energy storage controller 506 may also predict the revenue generation potential of IBDR programs using an incentive event history (e.g., past clearing prices, mileage ratios, event probabilities, etc.) from incentive programs 602. Energy storage controller 506 may generate control decisions that optimize the economic value of operating energy storage system 500 over the duration of the optimization period subject to constraints on the optimization process (e.g., energy balance constraints, load satisfaction constraints, etc.). The optimization process performed by energy storage controller 506 is described in greater detail below.

According to an exemplary embodiment, energy storage controller 506 is integrated within a single computer (e.g., one server, one housing, etc.). In various other exemplary embodiments, energy storage controller 506 can be distributed across multiple servers or computers (e.g., that can exist in distributed locations). In another exemplary embodiment, energy storage controller 506 may integrated with a smart building manager that manages multiple building systems and/or combined with BMS 606.

Energy storage controller 506 is shown to include a communications interface 636 and a processing circuit 607. Communications interface 636 may include wired or wireless interfaces (e.g., jacks, antennas, transmitters, receivers, transceivers, wire terminals, etc.) for conducting data communications with various systems, devices, or networks. For example, communications interface 636 may include an Ethernet card and port for sending and receiving data via an Ethernet-based communications network and/or a WiFi transceiver for communicating via a wireless communications network. Communications interface 636 may be configured to communicate via local area networks or wide area networks (e.g., the Internet, a building WAN, etc.) and may use a variety of communications protocols (e.g., BACnet, IP, LON, etc.).

Communications interface 636 may be a network interface configured to facilitate electronic data communications between energy storage controller 506 and various external systems or devices (e.g., BMS 606, subplants 520-530, utilities 510, etc.). For example, energy storage controller 506 may receive information from BMS 606 indicating one or more measured states of the controlled building (e.g., temperature, humidity, electric loads, etc.) and one or more states of subplants 520-530 (e.g., equipment status, power consumption, equipment availability, etc.). Communications interface 636 may receive inputs from BMS 606 and/or subplants 520-530 and may provide operating parameters (e.g., on/off decisions, setpoints, etc.) to subplants 520-530 via BMS 606. The operating parameters may cause subplants 520-530 to activate, deactivate, or adjust a setpoint for various devices thereof.

Still referring to FIG. 6, processing circuit 607 is shown to include a processor 608 and memory 610. Processor 608 may be a general purpose or specific purpose processor, an application specific integrated circuit (ASIC), one or more field programmable gate arrays (FPGAs), a group of processing components, or other suitable processing components. Processor 608 may be configured to execute computer code or instructions stored in memory 610 or received from other computer readable media (e.g., CDROM, network storage, a remote server, etc.).

Memory 610 may include one or more devices (e.g., memory units, memory devices, storage devices, etc.) for storing data and/or computer code for completing and/or facilitating the various processes described in the present disclosure. Memory 610 may include random access memory (RAM), read-only memory (ROM), hard drive storage, temporary storage, non-volatile memory, flash memory, optical memory, or any other suitable memory for storing software objects and/or computer instructions. Memory 610 may include database components, object code components, script components, or any other type of information structure for supporting the various activities and information structures described in the present disclosure. Memory 610 may be communicably connected to processor 608 via processing circuit 607 and may include computer code for executing (e.g., by processor 608) one or more processes described herein.

Memory 610 is shown to include a building status monitor 624. Energy storage controller 506 may receive data regarding the overall building or building space to be heated or cooled by system 500 via building status monitor 624. In an exemplary embodiment, building status monitor 624 may include a graphical user interface component configured to provide graphical user interfaces to a user for selecting building requirements (e.g., overall temperature parameters, selecting schedules for the building, selecting different temperature levels for different building zones, etc.).

Energy storage controller 506 may determine on/off configurations and operating setpoints to satisfy the building requirements received from building status monitor 624. In some embodiments, building status monitor 624 receives, collects, stores, and/or transmits cooling load requirements, building temperature setpoints, occupancy data, weather data, energy data, schedule data, and other building parameters. In some embodiments, building status monitor 624 stores data regarding energy costs, such as pricing information available from utilities 510 (energy charge, demand charge, etc.).

Still referring to FIG. 6, memory 610 is shown to include a load/rate predictor 622. Load/rate predictor 622 may be configured to predict the thermal energy loads ($\hat{l}_k$) of the building or campus for each time step k (e.g., k=1 . . . n) of an optimization period. Load/rate predictor 622 is shown receiving weather forecasts from a weather service 604. In some embodiments, load/rate predictor 622 predicts the thermal energy loads $\hat{l}_k$ as a function of the weather forecasts. In some embodiments, load/rate predictor 622 uses feedback from BMS 606 to predict loads $\hat{l}_k$. Feedback from BMS 606 may include various types of sensory inputs (e.g., temperature, flow, humidity, enthalpy, etc.) or other data relating to the controlled building (e.g., inputs from a HVAC system, a lighting control system, a security system, a water system, etc.).

In some embodiments, load/rate predictor 622 receives a measured electric load and/or previous measured load data from BMS 606 (e.g., via building status monitor 624). Load/rate predictor 622 may predict loads $\hat{l}_k$ as a function of a given weather forecast ($\hat{\phi}_w$), a day type (day), the time of day (t), and previous measured load data ($Y_{k-1}$). Such a relationship is expressed in the following equation:

$$\hat{l}_k = f(\hat{\phi}_w, \text{day}, t | Y_{k-1})$$

In some embodiments, load/rate predictor 622 uses a deterministic plus stochastic model trained from historical load data to predict loads $\hat{l}_k$. Load/rate predictor 622 may use any of a variety of prediction methods to predict loads $\hat{l}_k$ (e.g., linear regression for the deterministic portion and an AR model for the stochastic portion). Load/rate predictor 622 may predict one or more different types of loads for the building or campus. For example, load/rate predictor 622 may predict a hot water load $\hat{l}_{Hot,k}$ and a cold water load $\hat{l}_{Cold,k}$ for each time step k within the prediction window. In some embodiments, load/rate predictor 622 makes load/rate predictions using the techniques described in U.S. patent application Ser. No. 14/717,593.

Load/rate predictor 622 is shown receiving utility rates from utilities 510. Utility rates may indicate a cost or price per unit of a resource (e.g., electricity, natural gas, water, etc.) provided by utilities 510 at each time step k in the prediction window. In some embodiments, the utility rates are time-variable rates. For example, the price of electricity may be higher at certain times of day or days of the week (e.g., during high demand periods) and lower at other times of day or days of the week (e.g., during low demand periods). The utility rates may define various time periods and a cost per unit of a resource during each time period. Utility rates may be actual rates received from utilities 510 or predicted utility rates estimated by load/rate predictor 622.

In some embodiments, the utility rates include demand charges for one or more resources provided by utilities 510. A demand charge may define a separate cost imposed by utilities 510 based on the maximum usage of a particular resource (e.g., maximum energy consumption) during a demand charge period. The utility rates may define various demand charge periods and one or more demand charges associated with each demand charge period. In some instances, demand charge periods may overlap partially or completely with each other and/or with the prediction window. Advantageously, demand response optimizer 630 may be configured to account for demand charges in the high level optimization process performed by high level optimizer 632. Utilities 510 may be defined by time-variable (e.g., hourly) prices, a maximum service level (e.g., a maximum rate of consumption allowed by the physical infrastructure or by contract) and, in the case of electricity, a demand charge or a charge for the peak rate of consumption within a certain period. Load/rate predictor 622 may store the predicted loads $\hat{l}_k$ and the utility rates in memory 610 and/or provide the predicted loads $\hat{l}_k$ and the utility rates to demand response optimizer 630.

Still referring to FIG. 6, memory 610 is shown to include an incentive estimator 620. Incentive estimator 620 may be configured to estimate the revenue generation potential of participating in various incentive-based demand response (IBDR) programs. In some embodiments, incentive estimator 620 receives an incentive event history from incentive programs 602. The incentive event history may include a history of past IBDR events from incentive programs 602. An IBDR event may include an invitation from incentive programs 602 to participate in an IBDR program in exchange for a monetary incentive. The incentive event history may indicate the times at which the past IBDR events occurred and attributes describing the IBDR events (e.g., clearing prices, mileage ratios, participation requirements, etc.). Incentive estimator 620 may use the incentive event history to estimate IBDR event probabilities during the optimization period.

Incentive estimator 620 is shown providing incentive predictions to demand response optimizer 630. The incentive predictions may include the estimated IBDR probabilities, estimated participation requirements, an estimated amount of revenue from participating in the estimated IBDR events, and/or any other attributes of the predicted IBDR events. Demand response optimizer 630 may use the incentive predictions along with the predicted loads $\hat{l}_k$ and utility rates from load/rate predictor 622 to determine an optimal set of control decisions for each time step within the optimization period.

Still referring to FIG. 6, memory 610 is shown to include a demand response optimizer 630. Demand response optimizer 630 may perform a cascaded optimization process to optimize the performance of energy storage system 500. For example, demand response optimizer 630 is shown to include a high level optimizer 632 and a low level optimizer 634. High level optimizer 632 may control an outer (e.g., subplant level) loop of the cascaded optimization. High level optimizer 632 may determine an optimal set of control decisions for each time step in the prediction window in order to optimize (e.g., maximize) the value of operating energy storage system 500. Control decisions made by high level optimizer 632 may include, for example, load setpoints for each of generator subplants 520, charge/discharge rates for each of storage subplants 530, resource purchase amounts for each type of resource purchased from utilities 510, and/or an amount of each resource sold to energy purchasers 504. In other words, the control decisions may define resource allocation at each time step. The control decisions made by high level optimizer 632 are based on the statistical estimates of incentive event probabilities and revenue generation potential for various IBDR events as well as the load and rate predictions.

Low level optimizer 634 may control an inner (e.g., equipment level) loop of the cascaded optimization. Low level optimizer 634 may determine how to best run each subplant at the load setpoint determined by high level optimizer 632. For example, low level optimizer 634 may determine on/off states and/or operating setpoints for various devices of the subplant equipment in order to optimize (e.g., minimize) the energy consumption of each subplant while meeting the resource allocation setpoint for the subplant. In some embodiments, low level optimizer 634 receives actual incentive events from incentive programs 602. Low level optimizer 634 may determine whether to participate in the incentive events based on the resource allocation set by high level optimizer 632. For example, if insufficient resources have been allocated to a particular IBDR program by high level optimizer 632 or if the allocated resources have already been used, low level optimizer 634 may determine that energy storage system 500 will not participate in the IBDR program and may ignore the IBDR event. However, if the required resources have been allocated to the IBDR program and are available in storage subplants 530, low level optimizer 634 may determine that system 500 will participate in the IBDR program in response to the IBDR event. The cascaded optimization process performed by demand response optimizer 630 is described in greater detail in U.S. patent application Ser. No. 15/247,885.

Still referring to FIG. 6, memory 610 is shown to include a subplant control module 628. Subplant control module 628 may store historical data regarding past operating statuses, past operating setpoints, and instructions for calculating and/or implementing control parameters for subplants 520-530. Subplant control module 628 may also receive, store, and/or transmit data regarding the conditions of individual devices of the subplant equipment, such as operating efficiency, equipment degradation, a date since last service, a lifespan parameter, a condition grade, or other device-specific data. Subplant control module 628 may receive data from subplants 520-530 and/or BMS 606 via communications interface 636. Subplant control module 628 may also receive and store on/off statuses and operating setpoints from low level optimizer 634.

Data and processing results from demand response optimizer 630, subplant control module 628, or other modules of energy storage controller 506 may be accessed by (or pushed to) monitoring and reporting applications 626. Monitoring and reporting applications 626 may be configured to generate real time "system health" dashboards that can be viewed and navigated by a user (e.g., a system engineer). For example, monitoring and reporting applications 626 may include a web-based monitoring application with several graphical user interface (GUI) elements (e.g., widgets, dashboard controls, windows, etc.) for displaying key performance indicators (KPI) or other information to users of a GUI. In addition, the GUI elements may summarize relative energy use and intensity across energy storage systems in different buildings (real or modeled), different campuses, or the like. Other GUI elements or reports may be generated and shown based on available data that allow users to assess performance across one or more energy storage systems from one screen. The user interface or report (or underlying data engine) may be configured to aggregate and categorize operating conditions by building, building type, equipment type, and the like. The GUI elements may include charts or histograms that allow the user to visually analyze the operating parameters and power consumption for the devices of the energy storage system.

Still referring to FIG. 6, energy storage controller 506 may include one or more GUI servers, web services 612, or GUI engines 614 to support monitoring and reporting applications 626. In various embodiments, applications 626, web services 612, and GUI engine 614 may be provided as separate components outside of energy storage controller 506 (e.g., as part of a smart building manager). Energy storage controller 506 may be configured to maintain detailed historical databases (e.g., relational databases, XML databases, etc.) of relevant data and includes computer code modules that continuously, frequently, or infrequently query, aggregate, transform, search, or otherwise process the data maintained in the detailed databases. Energy storage controller 506 may be configured to provide the results of any such processing to other databases, tables, XML files, or other data structures for further querying, calculation, or access by, for example, external monitoring and reporting applications.

Energy storage controller 506 is shown to include configuration tools 616. Configuration tools 616 can allow a user to define (e.g., via graphical user interfaces, via prompt-driven "wizards," etc.) how energy storage controller 506 should react to changing conditions in the energy storage subsystems. In an exemplary embodiment, configuration tools 616 allow a user to build and store condition-response scenarios that can cross multiple energy storage system devices, multiple building systems, and multiple enterprise control applications (e.g., work order management system applications, entity resource planning applications, etc.). For example, configuration tools 616 can provide the user with the ability to combine data (e.g., from subsystems, from event histories) using a variety of conditional logic. In varying exemplary embodiments, the conditional logic can range from simple logical operators between conditions (e.g., AND, OR, XOR, etc.) to pseudo-code constructs or complex programming language functions (allowing for more complex interactions, conditional statements, loops, etc.). Configuration tools 616 can present user interfaces for building such conditional logic. The user interfaces may allow users to define policies and responses graphically. In some embodiments, the user interfaces may allow a user to select a pre-stored or pre-constructed policy and adapt it or enable it for use with their system.

Planning Tool

Figure 7:
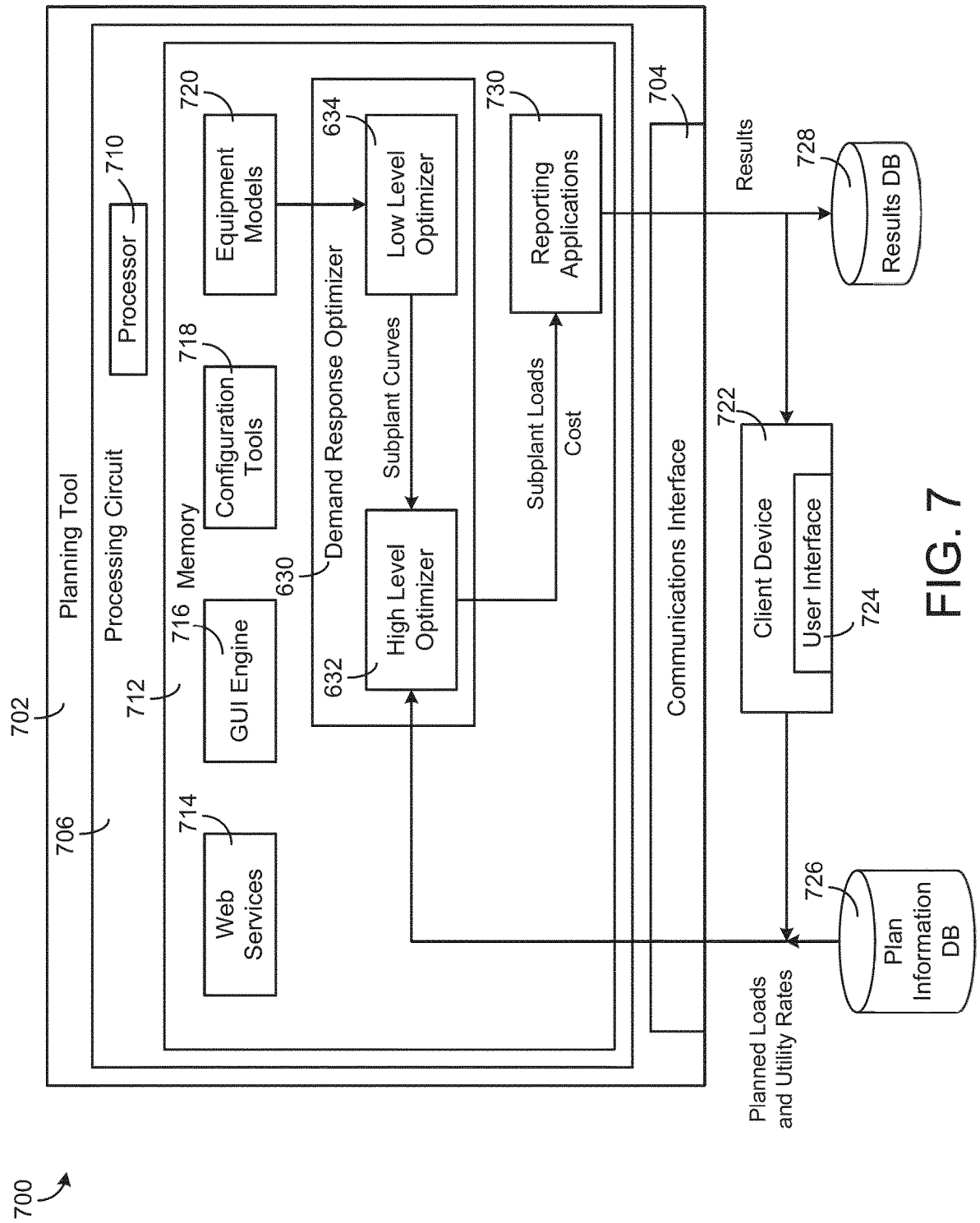
FIG. 7 is a block diagram of a planning tool which can be used to determine the benefits of investing in a battery asset and calculate various financial metrics associated with the investment, according to an exemplary embodiment.

Referring now to FIG. 7, a block diagram of a planning system 700 is shown, according to an exemplary embodiment. Planning system 700 may be configured to use demand response optimizer 630 as part of a planning tool 702 to simulate the operation of a central plant over a predetermined time period (e.g., a day, a month, a week, a year, etc.) for planning, budgeting, and/or design considerations. When implemented in planning tool 702, demand response optimizer 630 may operate in a similar manner as described with reference to FIG. 6. For example, demand response optimizer 630 may use building loads and utility rates to determine an optimal resource allocation to minimize cost over a simulation period. However, planning tool 702 may not be responsible for real-time control of a building management system or central plant.

Planning tool 702 can be configured to determine the benefits of investing in a battery asset and the financial metrics associated with the investment. Such financial metrics can include, for example, the internal rate of return (IRR), net present value (NPV), and/or simple payback period (SPP). Planning tool 702 can also assist a user in determining the size of the battery which yields optimal financial metrics such as maximum NPV or a minimum SPP. In some embodiments, planning tool 702 allows a user to specify a battery size and automatically determines the benefits of the battery asset from participating in selected IBDR programs while performing PBDR, as described with reference to FIG. 5. In some embodiments, planning tool 702 is configured to determine the battery size that minimizes SPP given the IBDR programs selected and the requirement of performing PBDR. In some embodiments, planning tool 702 is configured to determine the battery size that maximizes NPV given the IBDR programs selected and the requirement of performing PBDR.

In planning tool 702, high level optimizer 632 may receive planned loads and utility rates for the entire simulation period. The planned loads and utility rates may be defined by input received from a user via a client device 722 (e.g., user-defined, user selected, etc.) and/or retrieved from a plan information database 726. High level optimizer 632 uses the planned loads and utility rates in conjunction with subplant curves from low level optimizer 634 to determine an optimal resource allocation (i.e., an optimal dispatch schedule) for a portion of the simulation period.

The portion of the simulation period over which high level optimizer 632 optimizes the resource allocation may be defined by a prediction window ending at a time horizon. With each iteration of the optimization, the prediction window is shifted forward and the portion of the dispatch schedule no longer in the prediction window is accepted (e.g., stored or output as results of the simulation). Load and rate predictions may be predefined for the entire simulation and may not be subject to adjustments in each iteration. However, shifting the prediction window forward in time may introduce additional plan information (e.g., planned loads and/or utility rates) for the newly-added time slice at the end of the prediction window. The new plan information may not have a significant effect on the optimal dispatch schedule since only a small portion of the prediction window changes with each iteration.

In some embodiments, high level optimizer 632 requests all of the subplant curves used in the simulation from low level optimizer 634 at the beginning of the simulation. Since the planned loads and environmental conditions are known for the entire simulation period, high level optimizer 632 may retrieve all of the relevant subplant curves at the beginning of the simulation. In some embodiments, low level optimizer 634 generates functions that map subplant production to equipment level production and resource use when the subplant curves are provided to high level optimizer 632. These subplant to equipment functions may be used to calculate the individual equipment production and resource use (e.g., in a post-processing module) based on the results of the simulation.

Still referring to FIG. 7, planning tool 702 is shown to include a communications interface 704 and a processing circuit 706. Communications interface 704 may include wired or wireless interfaces (e.g., jacks, antennas, transmitters, receivers, transceivers, wire terminals, etc.) for conducting data communications with various systems, devices, or networks. For example, communications interface 704 may include an Ethernet card and port for sending and receiving data via an Ethernet-based communications network and/or a WiFi transceiver for communicating via a wireless communications network. Communications interface 704 may be configured to communicate via local area networks or wide area networks (e.g., the Internet, a building WAN, etc.) and may use a variety of communications protocols (e.g., BACnet, IP, LON, etc.).

Communications interface 704 may be a network interface configured to facilitate electronic data communications between planning tool 702 and various external systems or devices (e.g., client device 722, results database 728, plan information database 726, etc.). For example, planning tool 702 may receive planned loads and utility rates from client device 722 and/or plan information database 726 via communications interface 704. Planning tool 702 may use communications interface 704 to output results of the simulation to client device 722 and/or to store the results in results database 728.

Still referring to FIG. 7, processing circuit 706 is shown to include a processor 710 and memory 712. Processor 710 may be a general purpose or specific purpose processor, an application specific integrated circuit (ASIC), one or more field programmable gate arrays (FPGAs), a group of processing components, or other suitable processing components. Processor 710 may be configured to execute computer code or instructions stored in memory 712 or received from other computer readable media (e.g., CDROM, network storage, a remote server, etc.).

Memory 712 may include one or more devices (e.g., memory units, memory devices, storage devices, etc.) for storing data and/or computer code for completing and/or facilitating the various processes described in the present disclosure. Memory 712 may include random access memory (RAM), read-only memory (ROM), hard drive storage, temporary storage, non-volatile memory, flash memory, optical memory, or any other suitable memory for storing software objects and/or computer instructions. Memory 712 may include database components, object code components, script components, or any other type of information structure for supporting the various activities and information structures described in the present disclosure. Memory 712 may be communicably connected to processor 710 via processing circuit 706 and may include computer code for executing (e.g., by processor 710) one or more processes described herein.

Still referring to FIG. 7, memory 712 is shown to include a GUI engine 716, web services 714, and configuration tools 718. In an exemplary embodiment, GUI engine 716 includes a graphical user interface component configured to provide graphical user interfaces to a user for selecting or defining plan information for the simulation (e.g., planned loads, utility rates, environmental conditions, etc.). Web services 714 may allow a user to interact with planning tool 702 via a web portal and/or from a remote system or device (e.g., an enterprise control application).

Configuration tools 718 can allow a user to define (e.g., via graphical user interfaces, via prompt-driven "wizards," etc.) various parameters of the simulation such as the number and type of subplants, the devices within each subplant, the subplant curves, device-specific efficiency curves, the duration of the simulation, the duration of the prediction window, the duration of each time step, and/or various other types of plan information related to the simulation. Configuration tools 718 can present user interfaces for building the simulation. The user interfaces may allow users to define simulation parameters graphically. In some embodiments, the user interfaces allow a user to select a pre-stored or pre-constructed simulated plant and/or plan information (e.g., from plan information database 726) and adapt it or enable it for use in the simulation.

Still referring to FIG. 7, memory 712 is shown to include demand response optimizer 630. Demand response optimizer 630 may use the planned loads and utility rates to determine an optimal resource allocation over a prediction window. The operation of demand response optimizer 630 may be the same or similar as previously described with reference to FIGS. 6-8. With each iteration of the optimization process, demand response optimizer 630 may shift the prediction window forward and apply the optimal resource allocation for the portion of the simulation period no longer in the prediction window. Demand response optimizer 630 may use the new plan information at the end of the prediction window to perform the next iteration of the optimization process. Demand response optimizer 630 may output the applied resource allocation to reporting applications 730 for presentation to a client device 722 (e.g., via user interface 724) or storage in results database 728.

Still referring to FIG. 7, memory 712 is shown to include reporting applications 730. Reporting applications 730 may receive the optimized resource allocations from demand response optimizer 630 and, in some embodiments, costs associated with the optimized resource allocations. Reporting applications 730 may include a web-based reporting application with several graphical user interface (GUI) elements (e.g., widgets, dashboard controls, windows, etc.) for displaying key performance indicators (KPI) or other information to users of a GUI. In addition, the GUI elements may summarize relative energy use and intensity across various plants, subplants, or the like. Other GUI elements or reports may be generated and shown based on available data that allow users to assess the results of the simulation. The user interface or report (or underlying data engine) may be configured to aggregate and categorize resource allocation and the costs associated therewith and provide the results to a user via a GUI. The GUI elements may include charts or histograms that allow the user to visually analyze the results of the simulation. An exemplary output that may be generated by reporting applications 730 is shown in FIG. 8.

Figure 8:
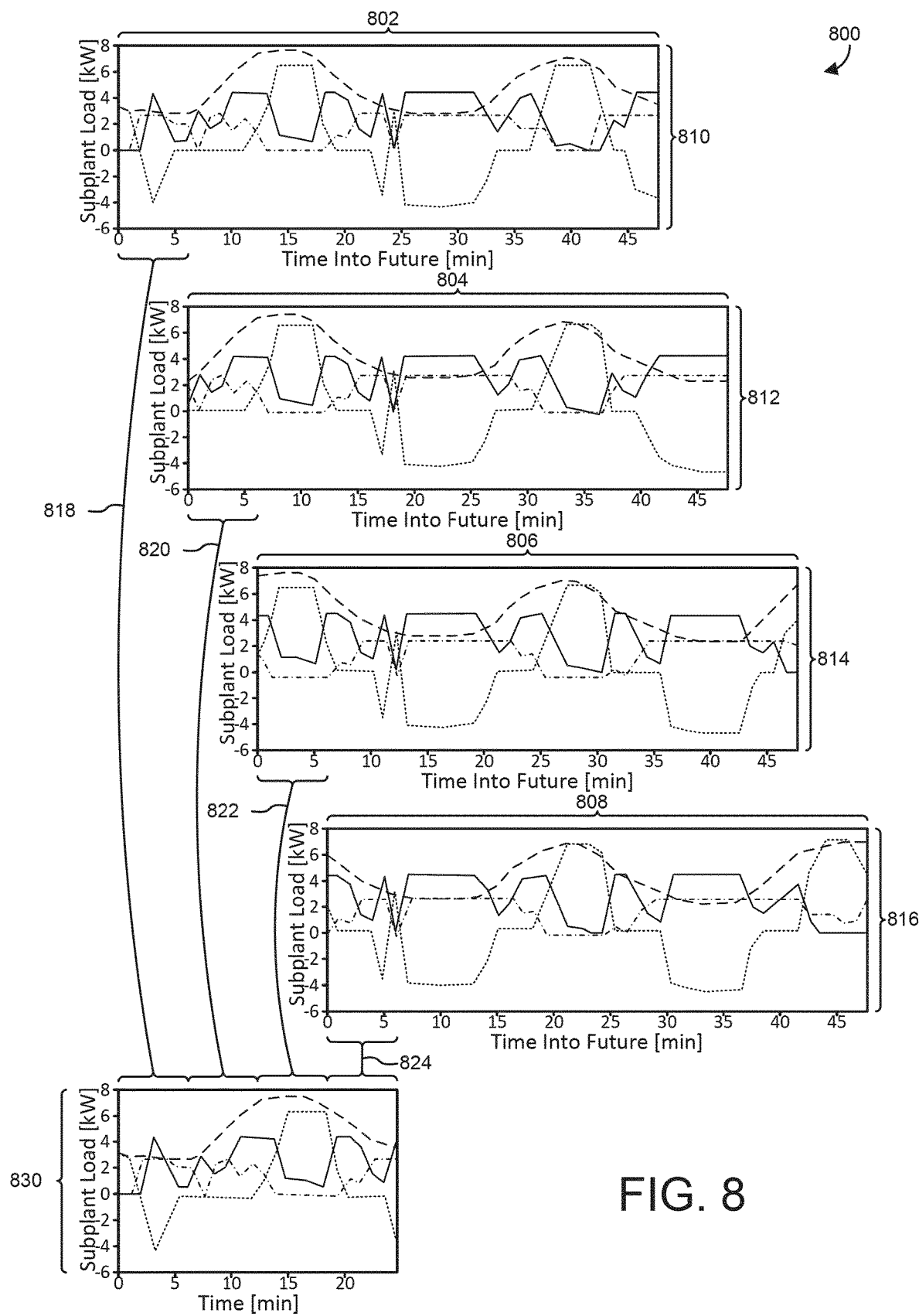
FIG. 8 is a drawing illustrating the operation of the planning tool of FIG. 7, according to an exemplary embodiment.

Referring now to FIG. 8, several graphs 800 illustrating the operation of planning tool 702 are shown, according to an exemplary embodiment. With each iteration of the optimization process, planning tool 702 selects an optimization period (i.e., a portion of the simulation period) over which the optimization is performed. For example, planning tool 702 may select optimization period 802 for use in the first iteration. Once the optimal resource allocation 810 has been determined, planning tool 702 may select a portion 818 of resource allocation 810 to send to plant dispatch 830. Portion 818 may be the first b time steps of resource allocation 810. Planning tool 702 may shift the optimization period 802 forward in time, resulting in optimization period 804. The amount by which the prediction window is shifted may correspond to the duration of time steps b.

Planning tool 702 may repeat the optimization process for optimization period 804 to determine the optimal resource allocation 812. Planning tool 702 may select a portion 820 of resource allocation 812 to send to plant dispatch 830. Portion 820 may be the first b time steps of resource allocation 812. Planning tool 702 may then shift the prediction window forward in time, resulting in optimization period 806. This process may be repeated for each subsequent optimization period (e.g., optimization periods 806, 808, etc.) to generate updated resource allocations (e.g., resource allocations 814, 816, etc.) and to select portions of each resource allocation (e.g., portions 822, 824) to send to plant dispatch 830. Plant dispatch 830 includes the first b time steps 818-824 from each of optimization periods 802-808. Once the optimal resource allocation is compiled for the entire simulation period, the results may be sent to reporting applications 730, results database 728, and/or client device 722, as described with reference to FIG. 7.

High Level Optimizer with Stochastic Resource Allocation Optimization

Figure 9:
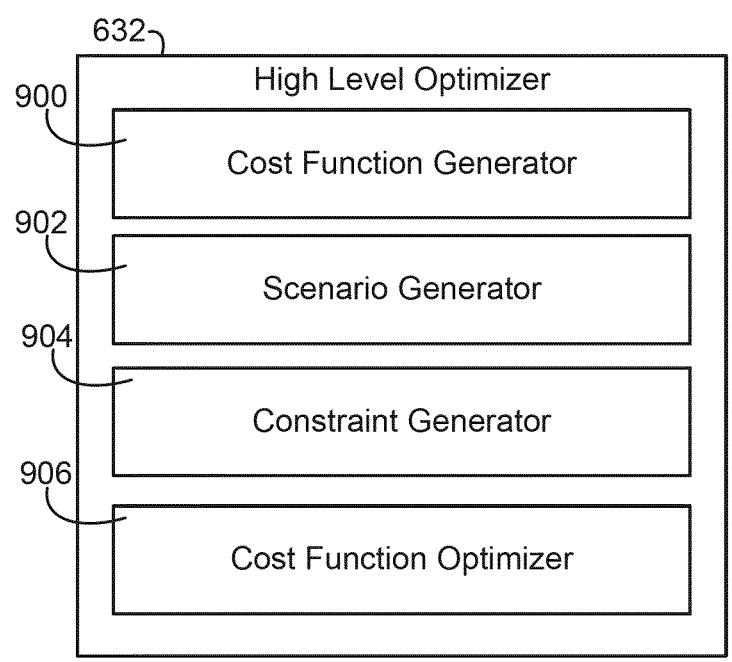
FIG. 9 is a detailed block diagram of a high level optimizer of FIGS. 6 and 7, according to an exemplary embodiment

Referring now to FIG. 9, a detailed view of the high level optimizer 632 is shown, according to an exemplary embodiment. The high level optimizer 632 of FIG. 9 is configured to determine an optimal allocation of energy loads across equipment for a building or campus over a prediction horizon. That is, the high level optimizer 632 determines controls for the generator subplants 520 and storage subplants 530 of FIG. 5 to optimally allocate energy loads to reduce utility costs. As shown in FIG. 5, the equipment (i.e., the generator subplants 520 and the storage supplants 530) consumes input resources (purchased resources) from one or more utility suppliers to produce output resources (generated resources) provided to the building or campus 502 or stores input and/or output resources. When the equipment includes one or more resource storage devices, the high level optimizer 632 is configured to control the equipment such that resources can be made or purchased for use or storage when the cost of purchasing or making the resources is relatively low and removed from storage for use when the cost of purchasing or making the resources is relatively high.

The high level optimizer 632 includes a cost function generator 900, a scenario generator 902, a constraint generator 904, and a cost function optimizer 906. The cost function generator 900 generates a cost function that captures the costs (i.e., monetary charges) of energy consumption of a building or campus. The cost function considers the price(s) of input resources purchased from utility companies and incentives offered by utility companies for participation in supplier-provided programs such as frequency response or economic load demand response. The cost of purchasing the input resources includes one or more demand charges. The cost function is dependent on the prices of input resources and the value of incentives offered by utility companies and load demands on the equipment from the building or campus, both of which vary over time.

The scenario generator 902 is configured to generate potential scenarios, each scenario including predicted load (i.e., demand of resources) required by the building or campus and predicted prices for the input resources for each of a plurality of time steps. In some embodiments, the scenario generator 902 predicts resource consumption of the building or campus at each time step up to a prediction horizon and identifies an uncertainty range of the predicted resource consumption. The scenario generator 902 then generates a first potential scenario by selecting a first set of resource consumption values within the uncertainty range and generates one or more additional potential scenarios by selecting one or more additional sets of energy consumption values within the uncertainty range. The scenario generator 902 also predicts prices of input resources for each of a plurality of time steps up to the prediction horizon and uses a similar stochastic method to associate each set of resource consumption values with a corresponding set of resource price predictions. The scenario generator 902 thereby generates numerous potential scenarios that include load trajectories over time as well as prices of input resources over that same time.

The constraint generator 904 is configured to generate constraints based on physical, regulatory, business, or other limits on the behavior of the equipment and utility companies that may be applied to the cost function. One constraint may be a resource balance constraint that requires balance between a total amount of each resource supplied and a total amount of each resource consumed. In some embodiments, the resource balance constraint also considers storage of resources, such that the resource balance constraint requires balance between a total amount of each resource supplied or moved out of storage and a total amount of each resource consumed or moved into storage. Another constraint may require that an allocation of resource loads for each scenario requires that the allocation for a first time step is the same for each scenario. Other constraints may relate to limits on the rates of charging and discharging of batteries or other storage equipment, the rate of resource consumption/production of the equipment, limits on the possibility of selling resources back to utility companies, and other possibilities. The constraint generator 904 may receive data from various equipment and/or a database of system parameters/data to generate the constraints. In some embodiments, the constraints may be based on each potential scenario, such that each potential scenario has corresponding constraints. In some embodiments, the constraints are based on the system and associated requirements.

The cost function optimizer 906 then solves an optimization problem to determine the optimal allocation of energy loads across the equipment. The cost function optimizer 906 creates an overall cost function by calculating a weighted sum of individual cost functions for each potential scenario subject to one or more constraints (e.g., the resource balance constraint) for each scenario. The individual cost functions for each potential scenario are weighted in the sum based on the probability of that scenario occurring (i.e., the probability of the predicted loads and/or predicted prices occurring). The cost function optimizer 906 then optimizes the overall cost function by determining an optimal allocation of resource loads that minimizes the overall cost function.

In some embodiments, the cost function optimizer 906 optimizes the cost function to determine optimal energy allocation for each of the plurality of time steps in an optimization period, where the optimization period corresponds to a portion of a planning period. The cost function optimizer 906 may then shift the optimization period forward in time by a block size of a predetermined number of time steps. The cost function optimizer 906 may iteratively repeat the optimizing and shifting steps until the cost function has been optimized for each time step that occurs during the planning period. The cost function optimizer 906 may then predict the cost of operating the facility over the planning period based on the optimal values of the energy allocations for each time step that occurs during the planning period. In some embodiments, the cost function optimizer 906 predicts the cost of operating the facility over the planning period by running one or more scenarios and calculating a weighted average of the scenarios.

The high level optimizer 632 thereby generates an optimal allocation of resource loads. The high level optimizer 632 may then use the optimal allocation of resource loads to generate controls for equipment to control the equipment to achieve the optimal allocation of resource loads. The high level optimizer 632 thereby minimizes the utility costs of operating the building or campus.

Resource Allocation in Battery Systems with Frequency Regulation

Figure 10:
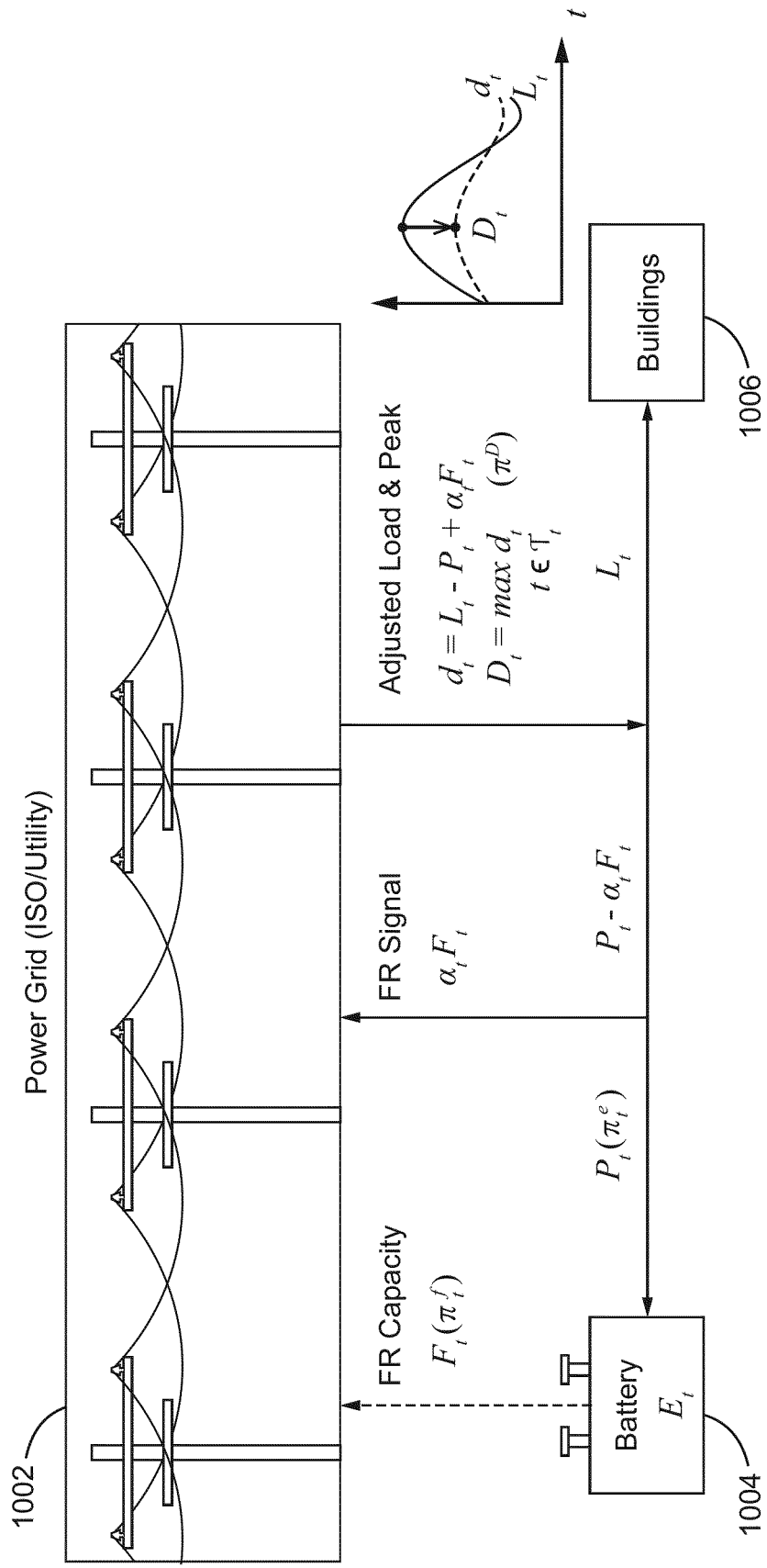
FIG. 10 is a schematic diagram of a battery system illustrating interactions with an independent system operator (ISO)/utility, according to an exemplary embodiment.

Referring now to FIG. 10, a schematic diagram illustrating the interactions between a power grid 1002 operated by an independent system operator (ISO), a battery 1004, and buildings 1006 (i.e., resource-consuming equipment and devices that serve the buildings 1006) is shown, according to an exemplary embodiment. FIG. 10 illustrates a common situation in which the high level optimizer 632 is well-suited to provide beneficial resource allocation optimization for a system 1008 that includes the battery 1004 and the buildings 1006.

As shown in FIG. 10, the battery 1004 is a flexible storage asset that can be used to provide frequency regulation for ISOs and to provide demand-side management capabilities for energy-intensive buildings 1006 to aid utility companies. This flexibility is increasingly valuable when intermittent renewable power is injected into the power grid 1002. In particular, ISOs have reported an increased demand for frequency regulation services to mitigate fast renewable supply fluctuations and stranded power. Frequency regulation allows for regulation of the grid frequency to maintain a standard frequency (e.g., 60 Hz), where deviation from the standard frequency takes place when there is a discrepancy between supply and demand. Battery 1004 can be used to mitigate these issues and can be strategically placed on the power grid 1002 to increase grid-wide performance.

In the example of FIG. 10, the battery 1004 is used for simultaneous FR and demand charge mitigation. That is, the battery 1004 has the dual goal of collecting revenue from FR markets while modulating the load of the building 1004 to mitigate demand charges. The value of the battery 1004 may be improved significantly by providing both frequency regulation and demand charge mitigation capabilities.

Figure 12:
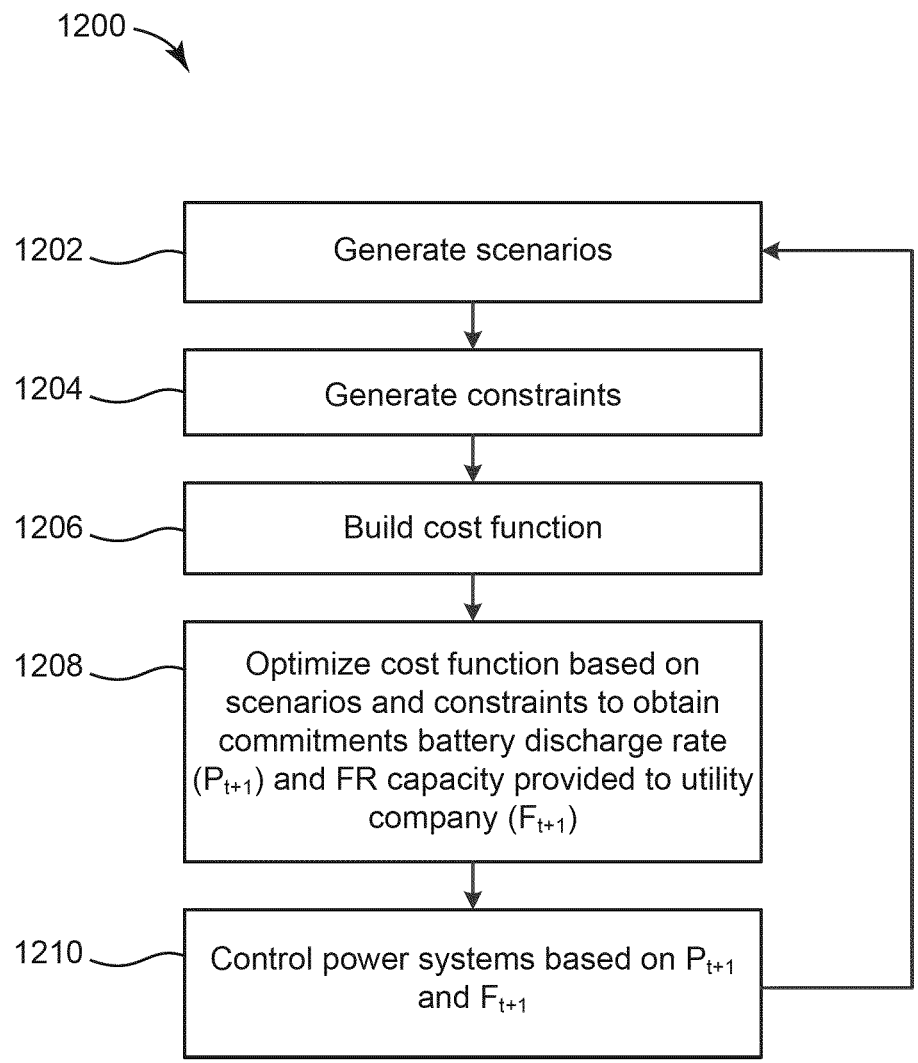
FIG. 12 is a flowchart of a process for stochastic model predictive control, according to an exemplary embodiment

Conventional control approaches for battery 1004 use optimization models that assume perfect knowledge of all the market and load parameters, leading to limited effectiveness in real-time operational settings where diverse uncertainties can hinder battery performance and revenue. However, as described in detail herein, stochastic optimization models can be used (e.g., by the high level optimizer 602) to maximize the economic benefits of the battery 1004 while capturing uncertainty in market prices and in the regulation signals. This optimization process is shown in FIG. 12 and described in detail below.

FIG. 10 depicts the flows of information and power that define the system to be optimized by the high level optimizer 632. The goal of the high level optimizer 602 is to determine the optimal participation strategies for the battery in FR markets operated by the ISO while simultaneously mitigating demand charges from a utility company for a collection of buildings 1006 that are attached to the battery. The cost and revenue components that are considered in the optimization formulation include energy transactions, frequency regulation capacity, and demand charges.

The battery 1004 purchases energy from the power grid 1002 to recharge itself and discharges energy to provide energy to the buildings 1006. Typically, the battery 1004 is not allowed to sell back energy to the ISO (i.e., to the power grid 1002). The buildings 1006 use energy from the battery 1004 and the power grid 1002.

The interactions between the power grid 1002, the battery 1004, and buildings 1006 of FIG. 10 can be described by a system model using the following system variables:

$P_t$: Net charge/discharge rate [kW] battery of battery 1004. If $P_t>0$, the battery 1004 is being discharged and if $P_t<0$ the battery 1004 is being charged.

$F_t$: FR capacity provided to ISO [kW] (i.e., to the power grid 1002).

$E_t$: Battery state of charge (SOC) [kWh] of the battery 1004.

$d_t$: Load requested from utility [kW] by the system 1008.

$D_t = \max_{k \in \mathcal{N}_t} d_k$: Peak load over horizon $\mathcal{N}$ [kW] by the system 1008.

The system model, and the cost functions described herein, also rely on the following parameters and data:

$L_t \in \mathbb{R}$ : Load of the buildings 1006 [kW] (i.e., the power consumption required by the buildings 1006).

$\hat{L}_t \in \mathbb{R}$ : Forecast for load of the buildings 1006 [kW].

$\pi_t^e \in \mathbb{R}$ : Electricity price [$/kWh].

$\hat{\pi}_t^e \in \mathbb{R}$ : Forecast of electricity price [$/kWh].

$\pi_t^f \in \mathbb{R}$ : FR capacity price [$/kW].

$\hat{\pi}_t^f \in \mathbb{R}$ : Forecast for FR capacity price [$/kW].

$\pi_d \in \mathbb{R}$ : Demand charge [$/kW].

$\alpha_t \in [-1,1]$: Fraction of FR capacity of the battery 1004 requested by ISO [−]. If $\alpha_t>0$, the power grid 1002 sends power to the battery 1004 while if $a_t<0$ the power grid 1002 withdraws power.

$\hat{\alpha}_t \in [-1,1]$: Forecast for fraction of FR capacity requested by ISO [−].

$E \in \mathbb{R}$ : Battery 1004 capacity [kWh].

$\overline{P} \in \mathbb{R}$ : Maximum discharging rate [kW] of battery 1004.

$\underline{P} \in \mathbb{R}$ : Maximum charging rate [kW] of battery 1004.

$\rho \in \mathbb{R}$ : Minimum fraction of battery 1004 capacity reserved for FR [kWh/kW].

$\overline{\Delta P} \in \mathbb{R}$ : Maximum ramping limit [kW/h] of battery 1004.

$\hat{D}_t$: Peak load observed up to time $t=\mathcal{M}$ [kW].

In the notation used herein, all quantities with subindex t are held constant over the time interval [(t−1)·h, t·h], where h is the duration of a time step, and the model is applied over the prediction horizon $\mathcal{N}_t := \{t+1, t+2, \ldots, t+N\}$ to maximize net revenue. Here, N is the length of the prediction horizon and index $t \in \mathbb{Z}_+$ corresponds to the time instant t·h, where h=1 hour. When convenient herein, a simplified notation $\pi_t = (\pi_t^e, \pi_t^f)$ and $\pi_{\mathcal{N}_t}$ is used to denote the price trajectory over the horizon $\mathcal{N}$. A similar notation is used to denote trajectories for other quantities such as the price forecasts $\hat{\pi}_{\mathcal{N}_t}$, loads $L_{\mathcal{N}_t}$, and load forecasts $\hat{L}_{\mathcal{N}_t}$. Based on this notation it is noted that the uncertain quantities ($\pi_{t+1}^e$, $\pi_{t+1}^f$, $L_{t+1}$, $\alpha_{t+1}$) can only be forecasted an hour in advance (i.e., at time t).

With the benefit of this notation, the interactions between the power grid 1002, the battery 1004, and buildings 1006 of FIG. 10 can be modelled and explained concisely. As illustrated in FIG. 10, an FR capacity $F_t$ for the battery is provided to the power grid 1002. The manager/owner of battery 1004 gets paid at price rate $\pi_t^f$ for that capacity. The power grid 1002 can then request a fraction $\alpha_t$ of the capacity $F_t$ for use in frequency regulation. An FR signal of $\alpha_t F_t$ is provided from the battery to the power grid 1002. The battery 1004 discharges or charges at rate $P_t$ at an electricity price $\pi_t^e$.

The buildings 1006 request a load $L_t$. This load is satisfied in part by power from the battery equal to $P_t - \alpha_t F_t$ (i.e., the rate of discharge of battery 1004 minus the amount provided back to the power grid 1002). The remainder of the load $L_t$, if any, is requested as demand $d_t$ on the power grid 1002. Thus, the demand is defined by $d_t = L_t - P_t + \alpha_t F_t$. A peak demand $D_t = \max_{k \in \mathcal{N}_t} d_k$ over a time period is associated with a demand charge $\pi_d$. In some embodiments, the cost and revenue components associated with demand charges are monthly, such that the buildings 1006 can be charged by the utility company for the peak demand (at a fixed demand charge price) incurred over a month.

Thus, the total net revenue of the system 1008 over a time period $\mathcal{N}$ can be represented by $$\Phi_t = \sum_{k \in \mathcal{N}_t} \hat{\pi}_k^e P_k + \sum_{k \in \mathcal{N}_t} \hat{\pi}_k^f F_k - \frac{\pi_d}{\sigma_t} \max_{k \in \mathcal{N}_t} d_k.$$

The total cost of the system 1008 is $-\Phi_t$. The first term is the revenue/cost associated to purchasing/selling power from/to the ISO (to the power grid 1002), the second term is revenue obtained from the provision of FR capacity by the battery 1004, and the third term is the cost associated to the demand charge. The parameter $\sigma_t$ is a discounting factor for the monthly demand charge $\pi_d$, which can be used to adjust the demand charge when a prediction horizon of less than a month is used, as the demand charge $\pi_d$ is typically a monthly charge.

Figure 11:
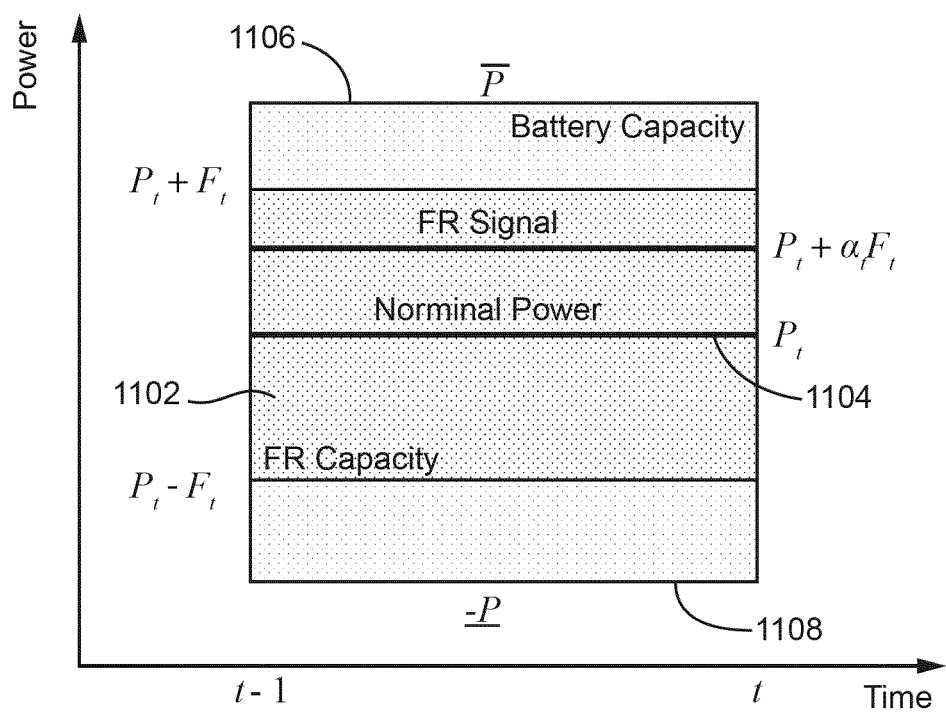
FIG. 11 is a graph of frequency regulation (FR) capacity and an ISO dispatch signal, according to an exemplary embodiment.

Referring now to FIG. 11, a graph 1100 illustrating the capacity of the battery 1004 with frequency regulation capacity is shown, according to an exemplary embodiment. As shown in the graph 1100, the FR capacity $F_t$ is represented by a symmetric band 1102 around the middle point $P_t$ (the net charge/discharge rate) 1104. In other words, the battery 1004 commits to a discharge level $P_t$ and an FR band of total length $2 \cdot F_t$. The actual power requested by the ISO for regulation is $\alpha_t F_t$. A value of $\alpha_t = 1$ indicates that the ISO requests all the FR capacity by charging the battery while $\alpha_t = -1$ indicates that the ISO requests all the capacity by discharging the battery.

The ISO compensates the battery 1004 for providing the operational band 1102 (compensated based on regulation prices) around a charge/discharge power level (charged based on energy prices). The ISO can request the battery 1004 to dispatch a fraction of the committed regulation capacity represented by band 1102 based on the requirements of the power grid 1002. In some embodiments, the cost and revenue components associated with frequency regulation capacity are hourly.

According to the rules of the energy and FR markets set by the ISO, the decision of allocating FR commitments for a trading hour can be changed 90 minutes before the start of that trading hour at the latest. Thus, the system 1008 may have the opportunity to reschedule commitments for the subsequent trading hours after the first hour for which the system has committed. Because of this flexibility, an optimization problem can be solved—as described in detail below—every hour over a receding horizon to maximize net revenue based on price and load conditions observed in real-time. As described below with reference to FIG. 12, a battery charge/discharge policy for battery 1004 is obtained by solving an optimization problem after every hour, starting 90 minutes before the start of the trading hour (i.e., the loads and prices need to be forecasted 90 minutes in advance). For simplicity in the presentation, it can be assumed that forecasts are obtained one hour in advance and thus systems conditions are uncertain over the next immediate hour and for subsequent times.

Still referring to FIGS. 10 and 11, a variety of constraints on the system 1008 are illustrated. First, as illustrated by upper bound 1106 and lower bound 1108 on the graph 1000 of FIG. 11, the net charge/discharged battery power plus the FR capacity provided may be constrained within the maximum discharging and charging rates $\overline{P}$ and $\underline{P}$ of the battery 1104:

$$P_k + F_k \leq \overline{P}, k \in \mathcal{N}_t$$

$$P_k - F_k \geq -\underline{P}, k \in \mathcal{N}_t$$

It should be noted that these limits are a function of the committed FR capacity. In other words, the larger the commitment, the less capacity available to charge/discharge the battery 1104.

The storage dynamics of the state of charge $E_k$ of the battery 1004 (i.e., the amount of energy stored by the battery 1004 at time k) are given by the difference equation:

$$E_k = E_{k-1} - P_k, k \in \mathcal{N}_t$$

Furthermore, because a certain fraction of the storage capacity of the battery 1004 must be available at the start and end of the hour k to provide the committed FR capacity over interval (t−1, t), the system 1008 is bound by the constraints:

$$\rho F_k \leq E_{k-1} \leq \overline{E} - \rho F_k, k \in \mathcal{N}_t$$

$$\rho F_k \leq E_k \leq \overline{E} - \rho F_k, k \in \mathcal{N}_t$$

Because of physical limitations on the ramp discharge rate of the battery 1004, the battery ramp discharge rate is constrained as:

$$-\overline{\Delta P} \leq P_k - P_{k-1} \leq \overline{\Delta P}, k \in \mathcal{N}_t$$

where the allowable ramp $\overline{\Delta P}$ can be tuned to prevent premature damage to the battery 1004.

In some embodiments, the power grid 1002 does not allow the system 1008 to sell back electricity, creating the constraint:

$$P_k + F_k \leq \hat{L}_k, k \in \mathcal{N}_t$$

This constraint can also be written as $\hat{L}_k - P_k - F_k \geq 0$. Consequently, when the ISO fully uses the FR capacity ($\alpha_k = -1$), the constraint implies that $d_k \geq 0$ because $d_k = \hat{L}_k - P_k - F_k$. Thus, this constraint represents that in such a situation the battery 1004 just operates as a buffer and does not return excess power to the power grid 1002.

Because the peak load of the system 1008 up to a time $\hat{D}_t$ can be no less than the peak load over a whole time period $\mathcal{N}_t$, the system 1008 is further described by the following peak demand carryover constraint:

$$\max_{k \in N_t} d_k \geq \hat{D}_t$$

Lastly, the basic capacity bounds on the battery 1004 can be represented as follows:

$$0 \leq E_k \leq \overline{E}, k \in \mathcal{N}_t$$

$$-\overline{P} \leq P_k \leq \overline{P}, k \in \mathcal{N}_t$$

$$0 \leq E_k \leq \overline{E}, k \in \mathcal{N}_t$$

The interactions between the power grid 1002 and the system 1008 as illustrated in FIGS. 10-11 can thereby be described using a cost function and various constraints.

In some embodiments, the high level optimizer 632 generates controls for the system 1008 using a deterministic model predictive control approach. In the deterministic model predictive control approach, the optimization problem solved at time t by the high level optimizer 632 can be denoted as $\mathcal{P}_t(\hat{L}_{\mathcal{N}_t}, \hat{\alpha}_{\mathcal{N}_t}, E_t, \hat{D}_t)$ where the arguments are the input data needed to solve the problem. When convenient, the dependence on the prices and loads can be dropped and the compact form $\mathcal{P}_t(E_t, \hat{D}_t)$ can be used. The deterministic model predictive control approach run over the monthly planning period $\mathcal{M}$ by the high level optimizer 632 can be summarized as follows:

START at t=0 with $E_0$ and $\hat{D}_0 = 1$ given. REPEAT for t ∈ $\mathcal{M}$:

Solve $\mathcal{P}_t(E_t, \hat{D}_t)$ by using the forecast prices $\hat{\pi}_{\mathcal{N}_t}$, loads $\hat{L}_{\mathcal{N}_t}$, and FR signals $\hat{\alpha}_{\mathcal{N}_t}$ to obtain commitments $P_{t+1}$ and $F_{t+1}$. Implement these decisions over (t, t+1) and update the new battery SOC to $E_{t+1} = E_t - P_{t+1}$.

Using the actual realized load $L_{t+1}$ and FR signal $\alpha_{t+1}$ compute the actual net demand $d_{t+1} = L_{t+1} - P_{t+1} + \alpha_{t+1} F_{t+1}$. Update the carryover peak as $\hat{D}_{t+1} = \max\{\hat{D}_t, d_{t+1}\}$. Set t ← t+1. If t=M STOP, otherwise RETURN to second step.

From the trajectories $P_\mathcal{M}$, $F_\mathcal{M}$, $d_\mathcal{M}$ collected over the month and the actual realizations of the prices $\pi_\mathcal{M}$, the high level optimizer 632 computes the revenue accumulated over the month as:

$$\Phi^{det} = \sum_{k \in \mathcal{M}} \pi_k^e P_k + \sum_{k \in \mathcal{M}} \pi_k^f F_k - \pi_d \max_{k \in \mathcal{M}} d_k$$

When the forecast trajectories $\hat{\pi}_{\mathcal{N}_t}$, $\hat{L}_{\mathcal{N}_t}$, and $\hat{\alpha}_{\mathcal{N}_t}$ match the actual counterparts $\pi_{\mathcal{N}_t}$, $L_{\mathcal{N}_t}$, and $\alpha_{\mathcal{N}_t}$, ideal optimal performance is obtained by the high level optimizer 632. This scheme can be called perfect information MPC.

However, uncertainty in the trajectories $\hat{\pi}_{\mathcal{N}_t}$, $\hat{L}_{\mathcal{N}_t}$, and $\hat{\alpha}_{\mathcal{N}_t}$ is quite likely, which may lead to significant inefficiencies in a system 1008 and high level optimizer 632 that relies on a deterministic MPC approach. Thus, as illustrated in FIG. 12 and described in detail below, the high level optimizer 632 may apply a stochastic MPC framework that factors in uncertainties on loads and prices explicitly by formulating a two-stage stochastic program that is solved over a receding horizon.

Referring now to FIG. 12, a flowchart of a process 1200 for stochastic MPC is shown, according to an exemplary embodiment.

At step 1202, the high level optimizer 632 predicts numerous scenarios, with each scenario including a trajectory of possible loads, prices, and regulation signals. The high level optimizer 632 represents uncertainty in the loads, prices, and regulation signals by modeling them as random variables with realizations (scenarios) denoted by $\xi \in \Xi$ (where $\Xi$ is the scenario set). In particular, at time t, a realization of the trajectory of the uncertain load is denoted as $L_{\mathcal{N}_t}(\xi)$ and the same notation is used for prices and FR signals.

To generate the scenarios, the high level optimizer 632 defines the net power $P_{t+1}$ and FR commitments $F_{t+1}$ over the next immediate trading hour as first-stage decisions (here-and-now) that need to be made prior to observing uncertainty (i.e., when the market is settled). The power and regulation capacity trajectories $P_k(\xi)$ and $F_k(\xi)$ for all $k \in \mathcal{N}_t \setminus \{t+1\}$ are modeled as second-stage or recourse decisions that can be corrected once uncertainty reveals. As used by the high level optimizer 632, the residual and peak demands are also recourse variables that can be expressed as $D\mathcal{N}(\xi)$ and $D_t(\xi) = \max \chi_{k \in \mathcal{N}_t} d_k(\xi)$. Further, the state of charge of the battery at time t+1, $E_{t+1}$, only depends on the previous storage level $E_t$ and on the first-stage variable $P_{t+1}$. Consequently, $E_{t+1}$ is also a first-stage variable. The rest of the trajectory $E_k(\xi)$ for $k \in \mathcal{N}_t \setminus \{t+1\}$ are modeled as second-stage variables because $P_k(\xi)$ are second-stage variables for $k \in \mathcal{N}_t \setminus \{t+1\}$.

Figure 13:
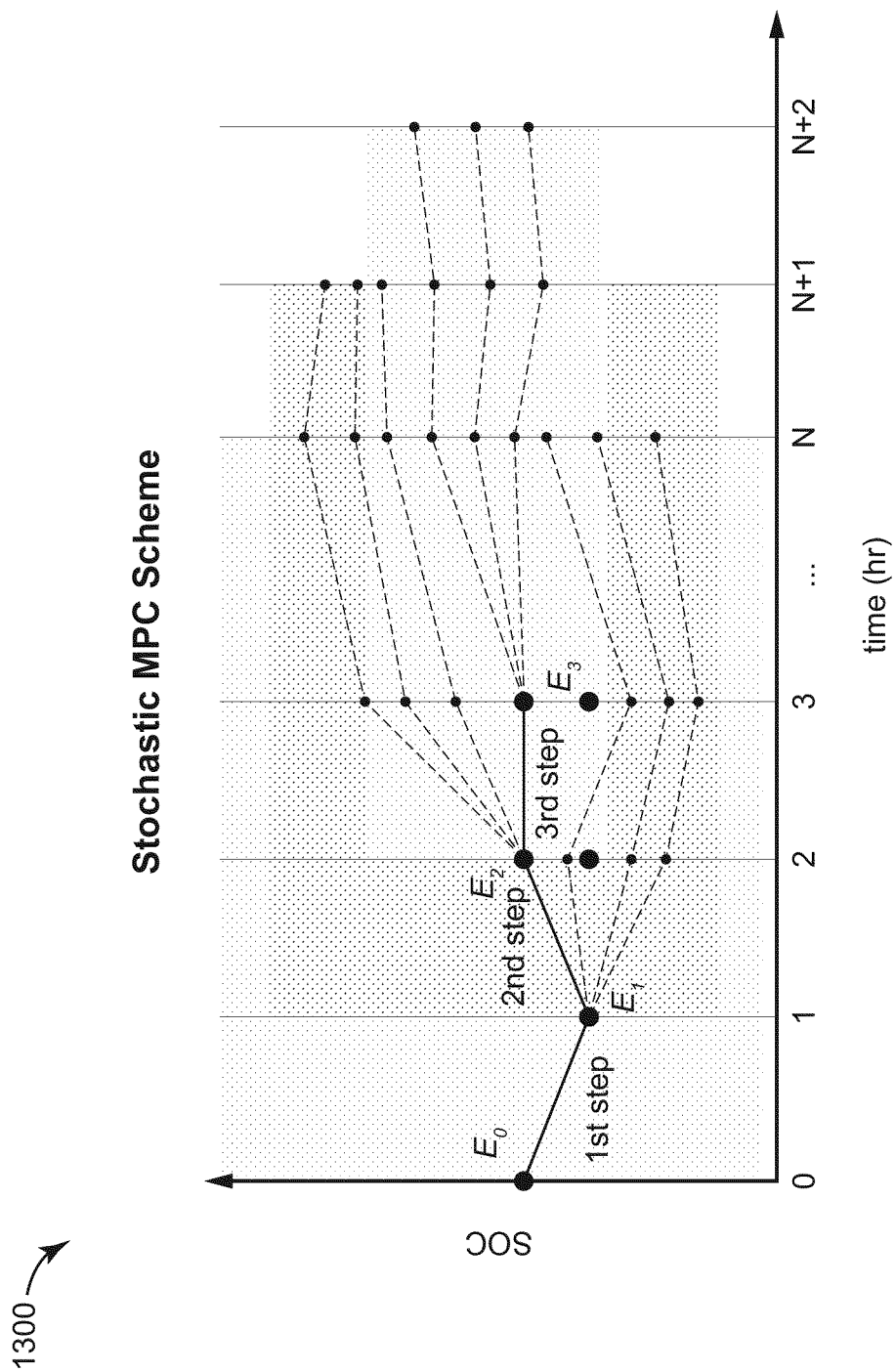
FIG. 13 is a graph of a stochastic model predictive control (MPC) scheme, according to an exemplary embodiment.

An illustration of the scenario generation scheme of step 1202 is shown in FIG. 13. As shown on the graph 1300 of FIG. 13, at each time step an N-hour horizon two-stage stochastic program is solved by the high level optimizer 632 to obtain a single value for the FR commitments and of the state of charge of the battery 1004 at the immediate next hour (shown in bold lines and dots) and multiple scenarios for the state trajectory for the remaining hours (shown in dashed lines and dots). Thus, from each time step multiple scenarios are generated up to a receding horizon.

The high level optimizer 632 may generate the scenarios using various techniques. In some embodiments, the high level optimizer 632 generates scenarios for uncertain variables by capturing short-term and long-term time correlations. Unfortunately, historical data for an entire year only contains 52 samples for weekly load profiles but such profiles have an associated multivariate random variable of dimension 24×7=168. Consequently, estimating a sample covariance matrix from the historical profiles is not possible (the covariance matrix does not have full rank and thus cannot be used for sampling). Thus, historical data is often insufficient to generate scenarios.

Thus, the high level optimizer 632 may use the Ledoit-Wolf covariance estimator for large dimensional vectors. The Ledoit-Wolf covariance estimator is both well-conditioned and converges to the sample covariance matrix asymptotically. In practice, it has been observed that a handful of observations are sufficient to obtain a good covariance approximation. The estimator and its convergence properties are described in detail in the journal article "A well-conditioned estimator for large-dimensional covariance matrices," Journal of Multivariate Analysis, vol. 88, no. 2, pp. 365-411, 2004, incorporated by reference in its entirety herein.

To use the Ledit-Wolf covariance estimator at step 1202, the high level optimizer 632 considers the norm of a p×p matrix to be the a scaled version of the Frobenius norm $\|A\|^2 = \text{Tr}(AA^T)/p$ and the associated inner product to be $\langle A_1 A_2^T \rangle = \text{Tr}(A_1 A_2^T)/p$. The advantage of dividing the trace by the dimension p is that the norm of the identity matrix is one. The high level optimizer 632 then considers n independent and identically distributed (i.i.d.) observations of a p-dimensional multivariate random variable X with mean 0 and covariance $\Sigma_n$, where p>>n. (in our case n=52 and p=168). Let $X_n$ denote a p×n matrix of the n realizations of the x vector. The goal is to find the linear combination $\Sigma^*_n = \rho_1 I_n + \rho_2 S_n$ of the identity matrix $I_n$ and the sample covariance matrix $S_n = X_n X_n^T/n$. Here, $\rho_1, \rho_2 \geq 0$ and the expected quadratic loss is defined as $\mathbb{E}[\|\Sigma^*_n - \Sigma_n\|]$ where $\Sigma_n$ is the true (unobservable) covariance matrix. The following scalar quantities are also defined, which play a central role in the analysis: $\mu_n = \langle \Sigma_n, I_n \rangle$, $\alpha_n^2 = \|\Sigma_n - \mu_n I_n\|^2$, $\beta_n^2 = \mathbb{E}[\|S_n - \Sigma_n\|^2]$, and $\delta_n^2 = \mathbb{E}[\|S_n - \mu_n I_n\|^2]$. It is not necessary to assume that the random variables follow a specific distribution, but it may be assumed that they have finite moments, so that $\beta_n^2$ and $\beta_n^2$ are finite. Using these definitions, it can be shown that $\mathbb{E}[S_n] = \Sigma_n$ and that $\alpha_n^2 + \beta_n^2 = \delta_n^2$ hold.

The optimal combination $\Sigma^*_n = \rho_1 I_n + \rho_2 S_n$ can be obtained by solving the quadratic program:

$$\min_{\rho_1, \rho_1} \mathbb{E}\left[\left\|\sum\nolimits_n^* - \sum\nolimits_n\right\|^2\right]$$

subject to $\Sigma^*_n = \rho_1 I_n + \rho_2 S_n$
The solution of this quadratic program is:

$$\rho_1 = \frac{\beta_n^2}{\delta_n^2}\mu_n, \; \rho_2 = \frac{\alpha_n^2}{\delta_n^2}$$

and, consequently, $$\sum\nolimits_n^* = \frac{\beta_n^2}{\delta_n^2}\mu_n I_n + \frac{\alpha_n^2}{\delta_n^2}S_n$$

The matrix $\Sigma^*_n$, however, is not a bona fide estimator because it requires hindsight knowledge of the scalar functions of the true (but unobservable) covariance matrix $\Sigma_n$: $\mu_n$, $\alpha_n^2$, $\beta_n^2$, $\delta_n^2$. The high level optimizer 632 addresses this problem by obtaining an alternative consistent estimator for $\Sigma_n$. It should be noted that computing $\Sigma^*_n$ does not require knowledge of the whole matrix $\Sigma_n$ directly, but only of the scalar functions $\mu_n$, $\alpha_n^2$, $\beta_n^2$, and $\delta_n^2$. Thus, the high level optimizer 632 can define consistent estimators of $\mu_n$, $\alpha_n^2$, $\beta_n^2$, and $\delta_n^2$ that converge to the true ones for large n.

The high level optimizer 632 may then use the following definitions:

$$m_n = \langle S_n, I_n \rangle$$

$$d_n^2 = \|S_n - m_n I_n\|^2$$

$$\bar{b}_n^2 = \frac{1}{n^2}\sum_{k=1}^{n}\|x_k x_k^T - S_n\|^2$$

$$b_n^2 = \min(\bar{b}_n^2, d_n^2)$$

$$a_n^2 = d_n^2 - b_n^2$$

It is possible to prove that $\mathbb{E}[m_n] = \mu_n$, and that $m_n - \mu_n$, $m_n^2 - \mu_n^2$, $d_n^2 - \delta_n^2$, $\bar{b}_n^2 - \beta_n^2$ and $b_n^2 - \beta_n^2$, $a_n - \alpha_n^2$ all converge to 0 as n increases.

Next, the high level optimizer 632 replaces the unobservable scalars in the formula defining $\Sigma^*_n$ with consistent estimators. This yields the bona fide estimator $S^*_n$ of the covariance matrix:

$$S_n^* = \frac{b_n^2}{d_n^2}m_n I_n + \frac{a_n^2}{d_n^2}S_n$$

The high level optimizer 632 can then use the covariance estimator $S^*_n$ to generate samples for uncertain variables, i.e., to generate scenarios at step 1202. Step 1202 thereby produces a collection of scenarios $\xi \in \Xi$.

At step 1204, the high level optimizer 632 generates the constraints for each scenario. The constraints are generated by applying each scenario $\xi \in \Xi$ to the constraints illustrated in FIGS. 10-11 and described above. The high level optimizer 632 thereby generates the following constraints:

The limits on the net battery discharge are:

$$P_k(\xi) + F_k(\xi) \leq \overline{P}, k \in \mathcal{N}_n, \xi \in \Xi$$

$$P_k(\xi) + F_k(\xi) \leq \overline{P}, k \in \mathcal{N}_n, \xi \in \Xi$$

The dynamics on the storage level are given by:

$$E_k(\xi) = E_{k-1}(\xi) - P_k(\xi), k \in \mathcal{N}_n, \xi \in \Xi$$

The buffer energy storage for making FR capacity commitments are given by:

$$pF_k(\xi) \leq E_{k-1}(\xi) \leq \overline{E} - pF_k(\xi), k \in \mathcal{N}_n, \xi \in \Xi$$

$$pF_k(\xi) \leq E_k(\xi) \leq \overline{E} - pF_k(\xi), k \in \mathcal{N}_n, \xi \in \Xi$$

The ramping limits on the net power of the battery are given by:

$$-\overline{\Delta P} \leq P_k(\xi) - P_{k-1}(\xi) \leq \overline{\Delta P}, k \in \mathcal{N}_n, \xi \in \Xi$$

The residual demand is given by:

$$d_k(\xi) = L_k(\xi) - P_k(\xi) + \alpha_k F_k(\xi), k \in \mathcal{N}_n, \xi \in \Xi$$

The no-sellback restriction to the ISO is given by:

$$P_k(\xi) + F_k(\xi) \leq L_k(\xi), k \in \mathcal{N}_n, \xi \in \Xi$$

The bounds on the variables are given by:

$$0 \leq E_k(\xi) \leq \overline{E}, k \in \mathcal{N}_n, \xi \in \Xi$$

$$-\overline{P} \leq P_k(\xi) \leq \overline{P}, k \in \mathcal{N}_n, \xi \in \Xi$$

$$0 \leq F_k(\xi) \leq \overline{P}, k \in \mathcal{N}_n, \xi \in \Xi$$

The peak demand must satisfy:

$$\max_{k \in N_t} d_k(\xi) \geq \hat{D}_t, \xi \in \Xi$$

Finally, the high level optimizer 632 generates constraints that enforce the fact that $P_{t+1}$ and $F_{t+1}$ are first-stage variables:

$$P_{t+1}(\xi) = \mathbb{E}[P_{t+1}(\xi)], \xi \in \Xi$$

$$F_{t+1}(\xi) = \mathbb{E}[P_{t+1}(\xi)], \xi \in \Xi$$

This set of constraints is generated for each scenario $\xi \in \Xi$ by the high level optimizer 632.

At step 1206, the high level optimizer 632 builds an overall objective function. The overall objective function is generated by combining individual objective functions for each scenario that are based on the total revenue function shown above with reference to FIGS. 10-11. Thus, the high level optimizer 632 generates an overall objective function $\Phi_t$ to be maximized at every time t:

$$\Phi_t = \mathbb{E}\left[\sum_{k \in N_t} \pi_k^e(\xi) P_k(\xi) + \sum_{k \in N_t} \pi_k^f(\xi) F_k(\xi) - \frac{\pi^d}{\sigma_t} \max_{k \in N_t} d_k(\xi)\right]$$

At step 1208, the high level optimizer 632 optimizes the overall cost function to obtain commitments for future charge/discharge of battery 1004 ($P_{t+1}$) and FR regulation capacity $F_{t+1}$ provided to the power grid 1002. That is, the high level optimizer 632 uses the overall objective function built at step 1206 and the constraints generated at step 1204 to determine the values of $P_{t+1}$ and $F_{t+1}$ that maximize the revenue of the system 1008 over the receding horizon.

In other words, the problem at time t uses a forecast and realizations for the uncertain variables that we denote as $L_{N_t}(\xi)$, $\alpha_{N_t}(\xi)$, $\pi^f_{N_t}(\xi)$, and $\pi^e_{N_t}(\xi)$. Accordingly, the problem that is solved by the high level optimizer 632 at time t can be denoted as $\mathcal{P}_t(L_{N_t}(\xi), \alpha_{N_t}(\xi), \pi^f_{N_t}(\xi), \pi^e_{N_t}(\xi), E_t, \hat{D}_t)$, but for convenience, the notation can be simplified to $\mathcal{P}(E_t, \hat{D}_t)$. From the solution to this problem the commitments $P_{t+1}$ and $F_{t+1}$ are obtained. The actual residual demand depends on the actual load realized and given by $d_{t+1} = L_{t+1} - P_{t+1} - \alpha_{t+1} F_{t+1}$ where $L_{t+1}$ and $\alpha_{t+1}$ are the actual (real) values of the load and dispatch signal. The high level optimizer 632 thereby determines how to control the battery 1004 to maximize revenue of the system 1008.

At step 1210, the high level optimizer 632 controls the system 1008 for time step t+1 to discharge or charge the battery 1004 at $P_{t+1}$ and provide a FR capacity of $F_{t+1}$ to the power grid 1002. For example, the high level optimizer 632 may generate a control signal that updates the battery state of charge for time step t+1 to $E_{t+1} = E_t - P_{t+1}$. The high level optimizer 632 may also transmit the FR capacity $F_{t+1}$ to the ISO.

From step 1210, the process 1200 returns to step 1202 to run as a loop that repeats at each time step to generate the next set of commitments $P_{t+1}$, $F_{t+1}$. The system 1008 is thereby controlled along a trajectory that minimizes the cost of operating the system 1008.

Thus, when viewed as a loop, the stochastic MPC scheme of process 1200 run over a month period $\mathcal{M}$ can be summarized as follows:

START at t=0 with $E_0$ and $\hat{D}_0 = 0$ given. REPEAT for $t \in \mathcal{M}$ Solve $\mathcal{P}_t(E_t, \hat{D}_t)$ by using the forecast scenarios $\pi_{N_t}(\xi)$, loads $L_{N_t}(\xi)$, and FR signals $\alpha_{N}(\xi)$ to obtain commitments $P_{t+1}$ and $F_{t+1}$. Implement these decisions over (t, t+1) and update the state of charge of battery 1004 $E_{t+1} = E_k - P_{t+1}$.

Using the actual realized load $L_{t+1}$ and FR signal $\alpha_{t+1}$ compute the actual net demand $d_{t+1} = L_{t+1} - P_{t+1} - \alpha_{t+1} F_{t+1}$. Update peak carryover demand as $\hat{D}_{t+i} = \max\{D_t, d_{t+1}\}$.

Set $t \leftarrow t+1$. If t=M STOP, otherwise RETURN to second step.

When process 1200 is executed by the high level optimizer 632, the system 1008 is controlled to follow trajectories $P_{\mathcal{M}}$, $F_{\mathcal{M}}$, $d_{\mathcal{M}}$ over a month period. Based on the trajectories $P_{\mathcal{M}}$, $F_{\mathcal{M}}$, $d_{\mathcal{M}}$ and the actual realizations of the prices $\pi \mathcal{N}$ the resulting accumulated revenue for the month is:

$$\Phi^{sto} = \sum_{k \in \mathcal{M}} \pi_k^e P_k + \sum_{k \in \mathcal{M}} \pi_k^f F_k - \pi^d \max_{k \in \mathcal{M}} d_k$$

Process 1200 and the high level optimizer 632 thereby facilitate the minimization of electricity costs (or, equivalently, the maximization of revenue) for the battery 1004 and the buildings 1108.

Experimental Results for Stochastic Model Predictive Control

Referring now to FIGS. 14A-23, experimental results comparing the performance of the stochastic MPC approach of process 1200 against the performance of a deterministic MPC approach and the performance of an MPC approach with perfect information are shown, according to some embodiments. The perfect information approach is unachievable in practice and provides ideal results against which the other approaches can be compared.

To generate the results shown in FIGS. 14A-23, utility-scale battery (e.g., battery 1004) was simulated with real day-ahead market price data from a real-world ISO. Historical load data from a typical university campus was used to generate sample scenarios. While this stochastic MPC approach can handle different sources of uncertainty, the study leading to the results shown in FIGS. 14A-23 focused on the impacts of load uncertainty. The stationary battery 1004 used in the simulations has a capacity 0.5 MWh with a rated power of 1 MW for both charge and discharge. A ramping limit of 0.5 MW/hr was used in the simulations. It was assumed that the ISO asks for the full dispatch of FR capacity committed at every hour, such that $\alpha_t = 1$ at all times.

In the study, cases with horizon lengths N=24 (1-day horizon), N=72 (3-day horizon), and N=168 (7-day horizon) were carried out by the high level optimizer 632 to study the effect of the horizon length on economic performance. The horizon lengths that were consider are short compared to the demand charge period (one month). Therefore, this study also considers two cases for the discounting factor $\sigma_t$ for the demand charge. In the first case a constant discounting factor of $\sigma_t = 1$ is considered, which means that no discounting of the long-term demand charge rate is used over the short horizon of length N. In the second case a discounting $\sigma_t=M/N$ is considered. Recall that $\pi_d$ is the demand charge price over a month and thus the discounting factor $\sigma_t=M/N$ scales down the price when the horizon is shorter than a month. For instance, if the horizon is one day, the demand charge can be scaled down by a factor of $\sigma_t=30\times24/24=30$ and if the horizon is one week, the demand charge can be scaled down by a factor of $\sigma_t=30\times24/7\times24=30/7$.

Figure 14A:
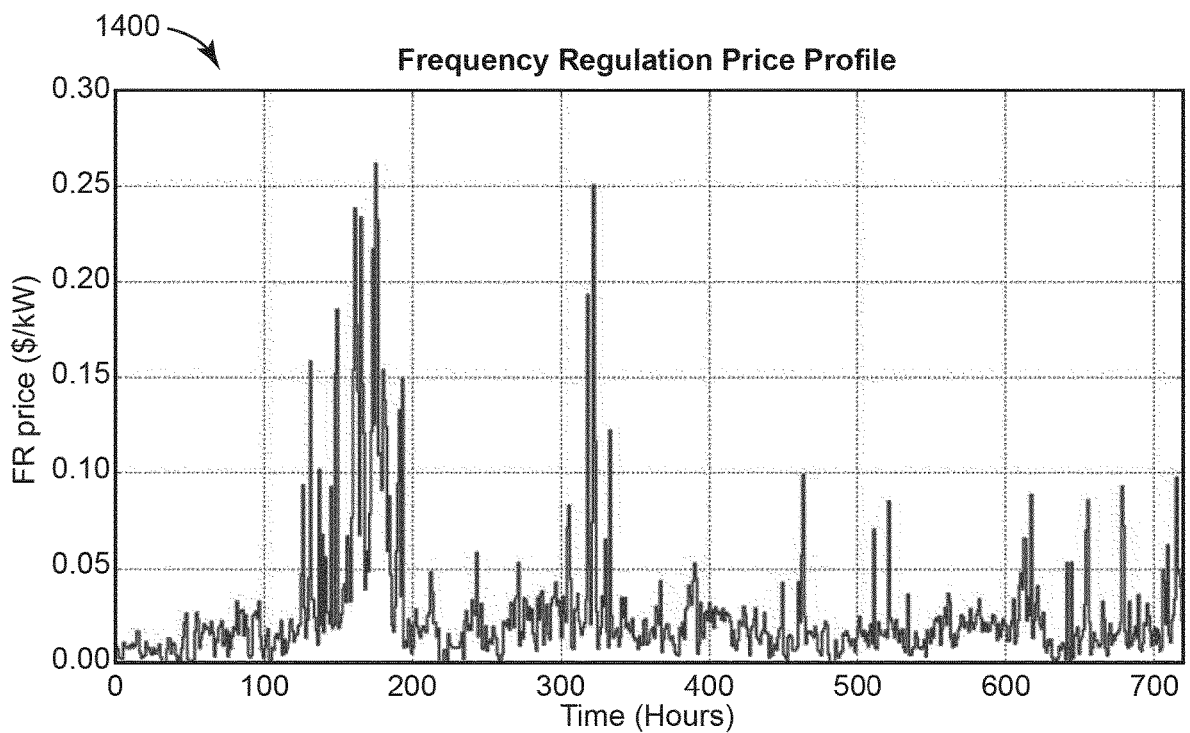
FIG. 14A is a graph of a frequency regulation price profile, according to an exemplary embodiment.
Figure 14B:
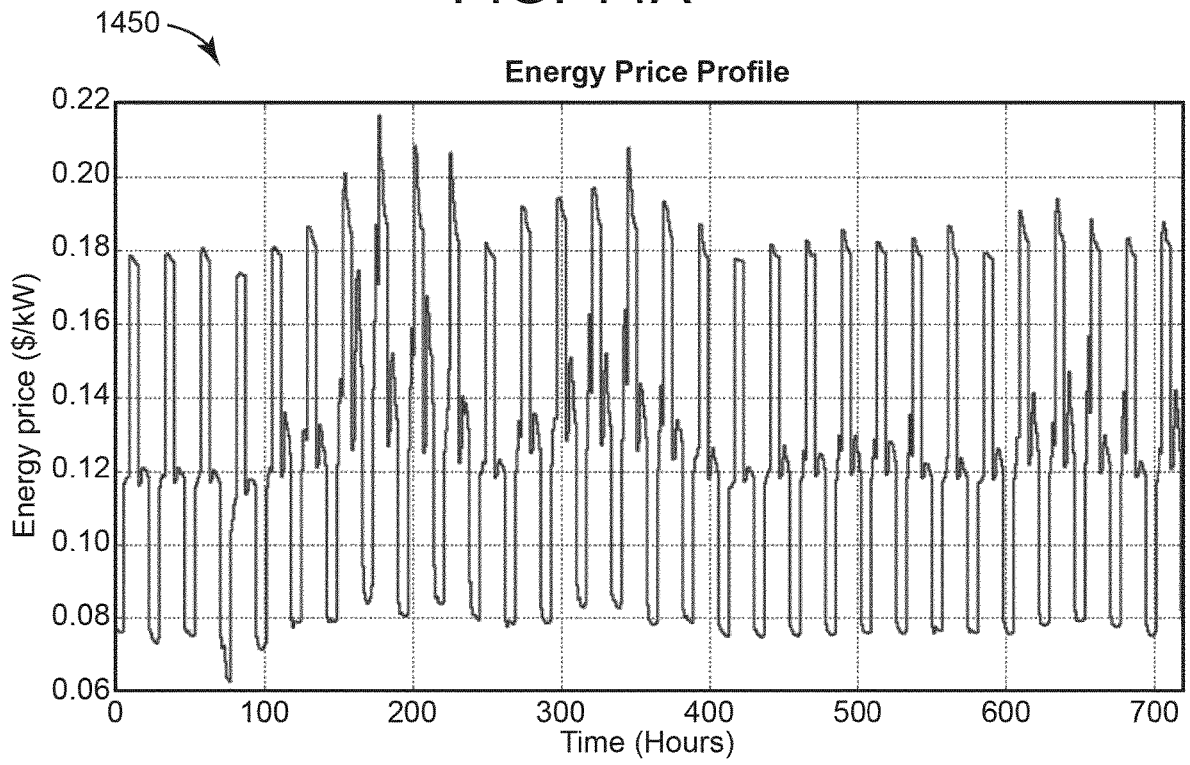
FIG. 14B is a graph of an energy price profile, according to an exemplary embodiment.

Receding-horizon simulations were performed using the high level optimizer 632 for a period of one month. Load scenarios for this period are generated by the high level optimizer 632 from one year of historical data using the Ledoit-Wolf covariance estimator. FIGS. 14A-B illustrate the price profiles are obtained from an ISO (here, PJM Interconnection). More particularly, FIG. 14A shows a graph 1400 of frequency regulation prices over a month time period while FIG. 15A shows a graph 1450 of energy prices over the month time period.

Figure 15A:
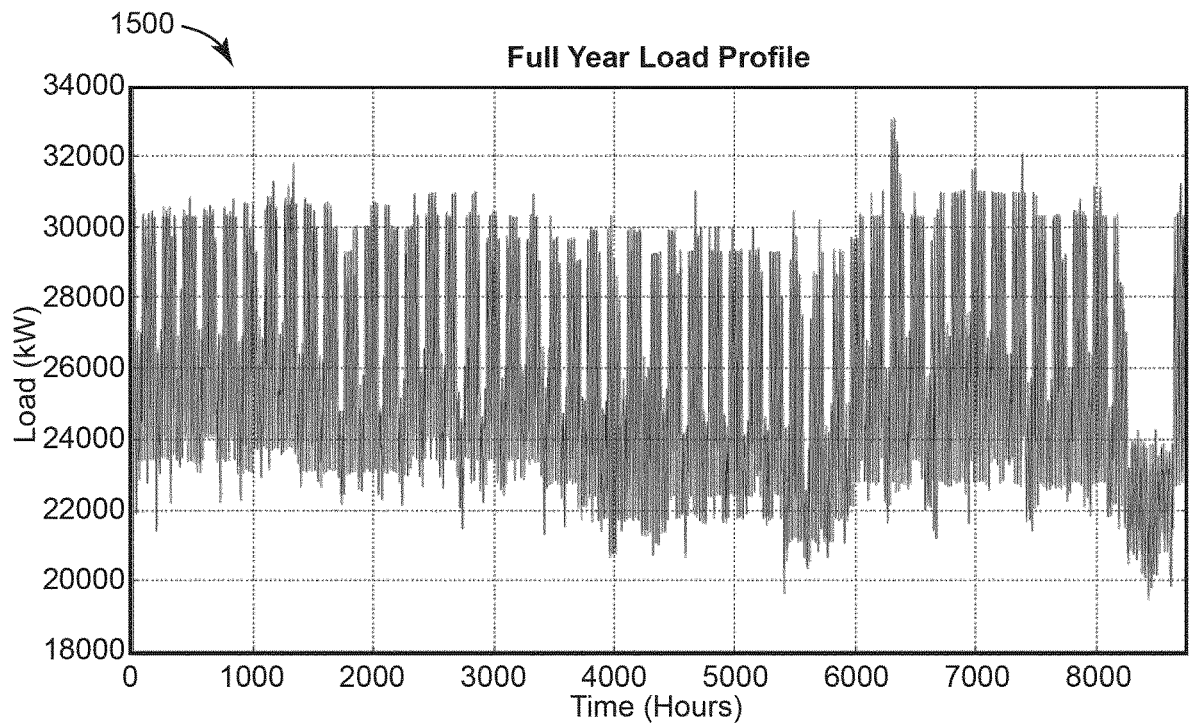
FIG. 15A is a graph of a full year load profile, according to an exemplary embodiment.
Figure 15B:
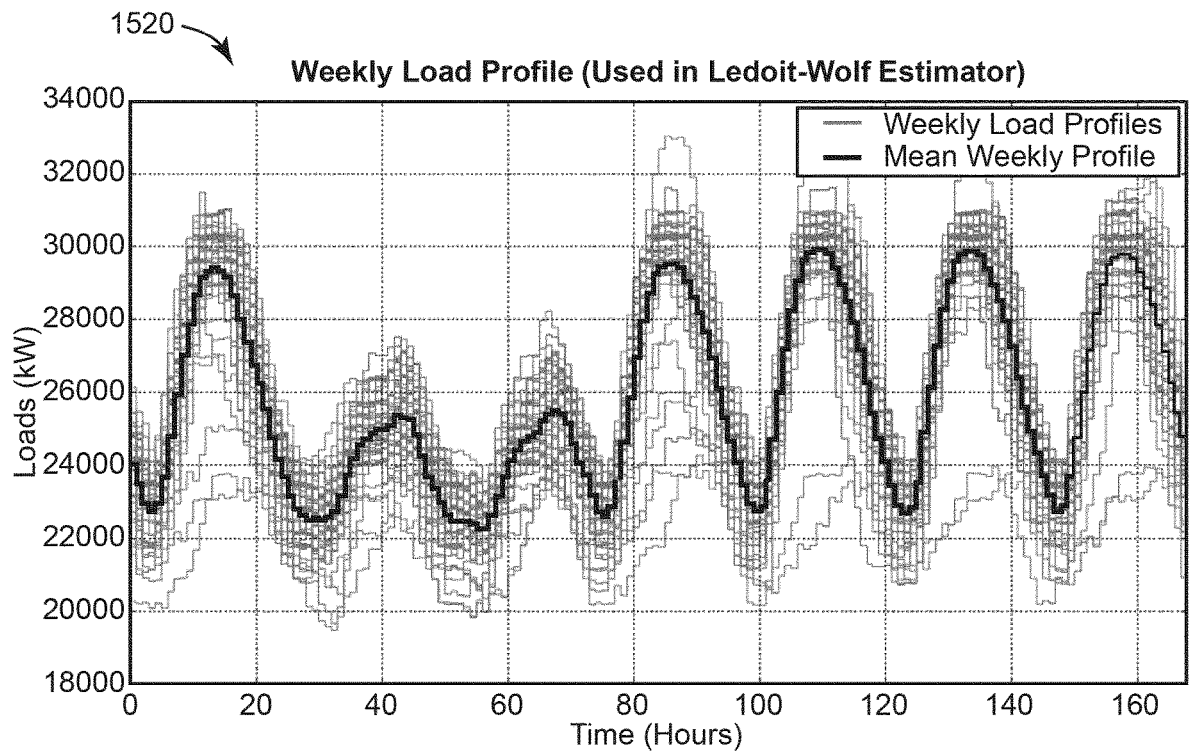
FIG. 15B is a graph of a weekly load profile used in a Ledoit-Wolf Estimator, according to an exemplary embodiment.
Figure 15C:
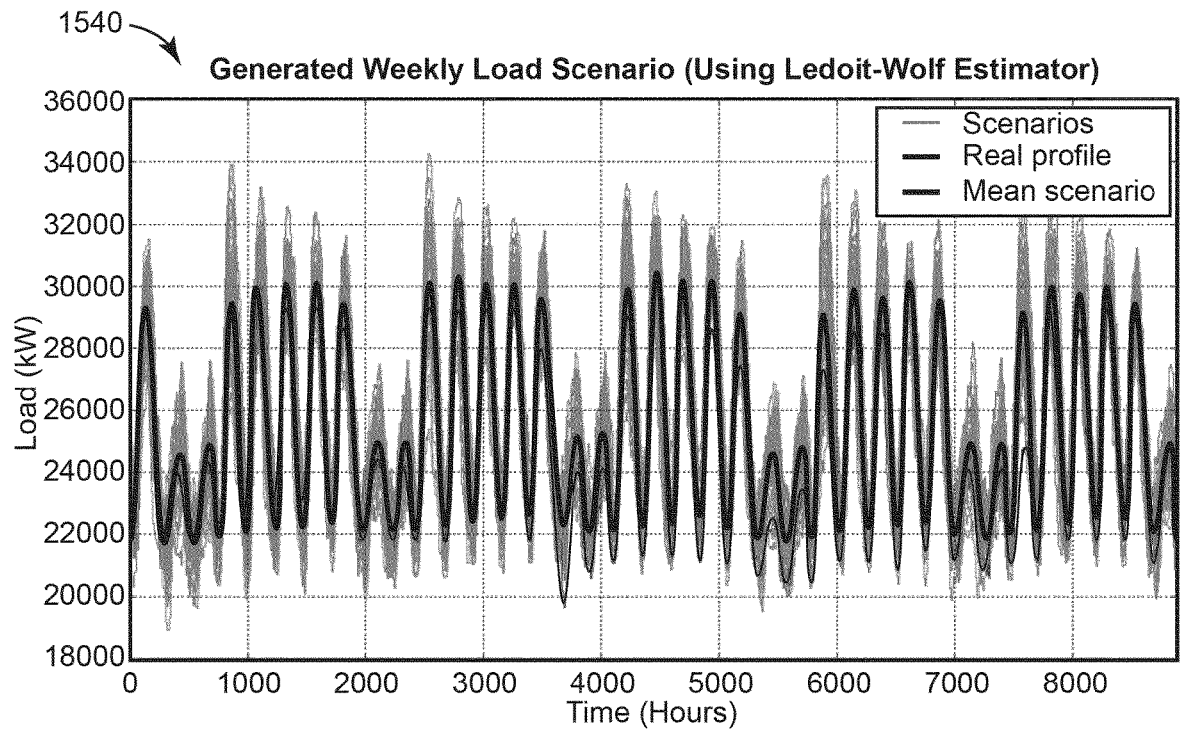
FIG. 15C is graph of a weekly load scenario generated using the Ledoit-Wolf Estimator, according to an exemplary embodiment.
Figure 15D:
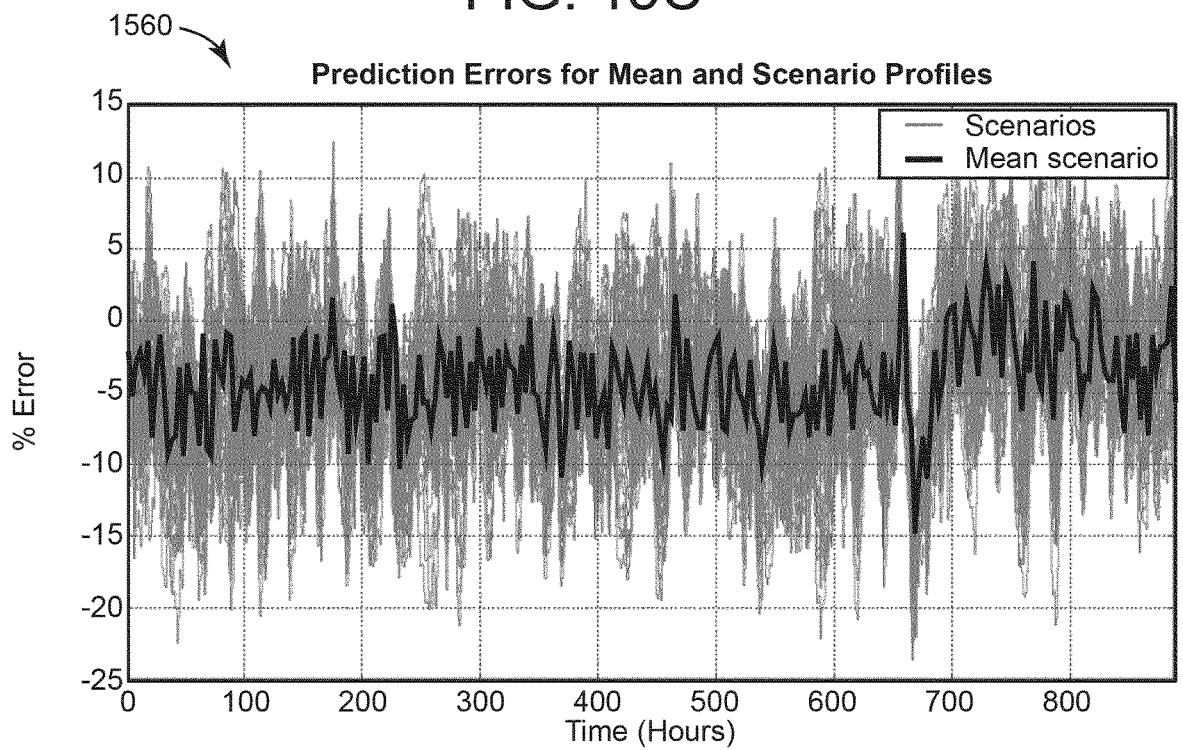
FIG. 15D is a graph of prediction errors for mean and scenario profiles, according to an exemplary embodiment.

FIGS. 15A-D illustrate the load profile of a typical large university campus 5. FIG. 15A shows a graph 1500 of the full year load profile of the campus. FIG. 15B shows a graph 1520 of the weekly campus load profiles that were used to construct the covariance estimator, while the weekly load scenarios generated with the Ledoit-Wolf estimator are shown in graph 1540 of FIG. 15C. The prediction errors for the scenarios and for the mean profile (the most likely profile) are shown in graph 1560 of FIG. 15D. As shown in graph 1560, the errors remain in the range of [−20%, 10%] (relative to the true load) and the error of the mean profile is in the range of [−15%-5%]. This indicates that the proposed scenario generation approach provides reasonable estimates. Moreover, FIGS. 15A-D show that the estimator preserves the correlation structure. For some load scenarios a significant deviation from the trend is seen, due to seasonal (on a year scale) tends. This could potentially be resolved by extending the load scenarios to monthly profiles but this will further increase historical data needs (i.e., for a one year horizon only 12 scenarios are available while the random variable has a dimension of 720).

The data illustrated in FIGS. 14A-15D was used in testing the various MPC approaches. For the simulation of deterministic MPC, the mean load profile was used throughout the planning period as a prediction to compute the planning policy and evaluate the policy in 1000 scenarios to evaluate the distribution of the cost when such policy is implemented but different load scenarios are realized. In the stochastic MPC scheme, a two-stage stochastic program containing fifty randomly scenarios was solved to compute the planning policy and evaluate the policy in the same 1000 scenarios used for the deterministic and perfect information schemes. To simulate the perfect information MPC scheme, the load scenarios are treated as the actual ones and optimized over each one individually (this is equivalent to dropping the non-anticipativity constraints). In the examples shown, optimization problems in the MPC simulations were implemented in the modeling language JUMP and solved using GUROBI 6.5.0.

Figure 16A:
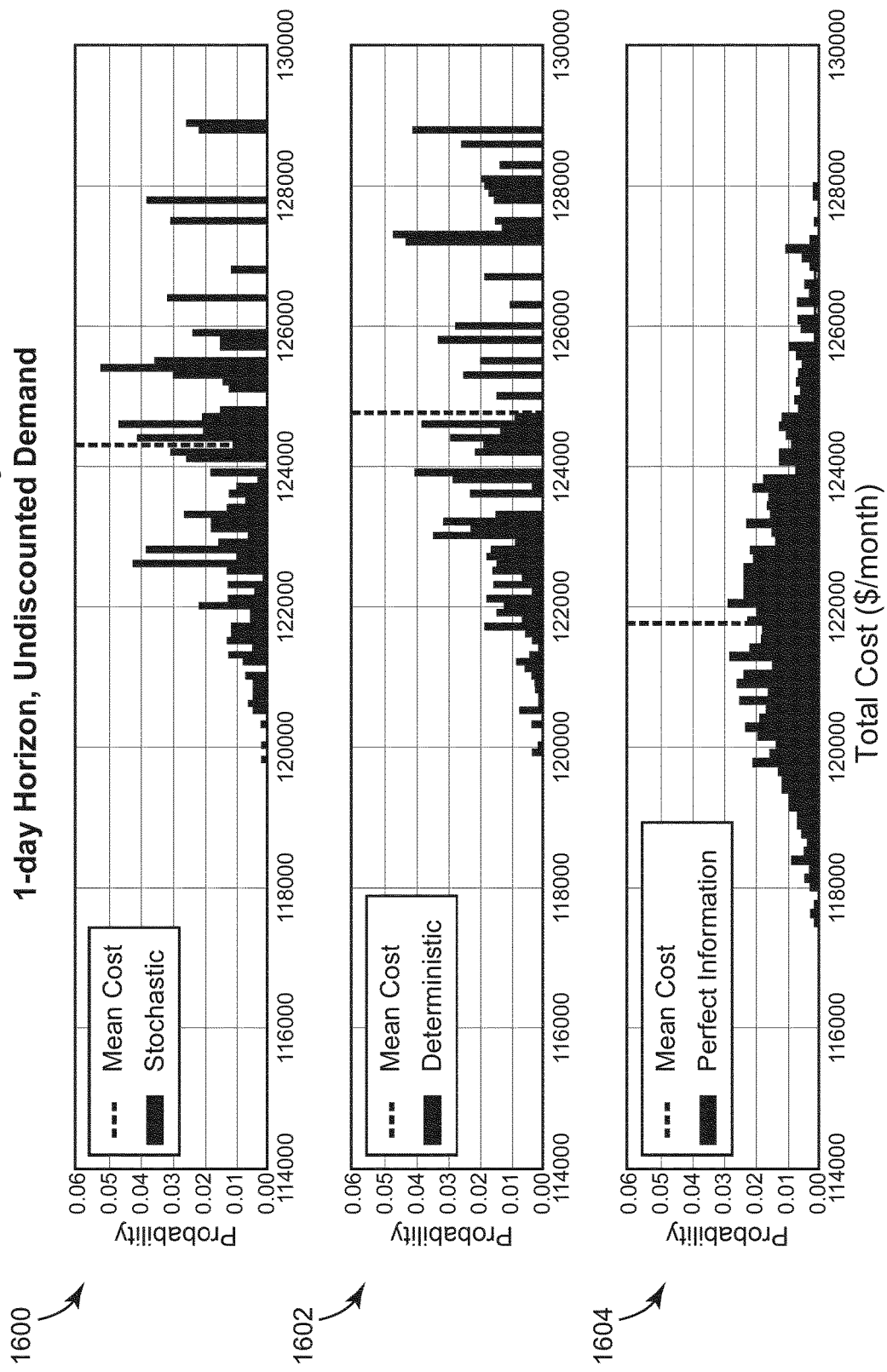
FIG. 16A is a graph of a distribution of total monthly costs using a 1-day horizon and undiscounted demand, according to an exemplary embodiment.
Figure 16B:
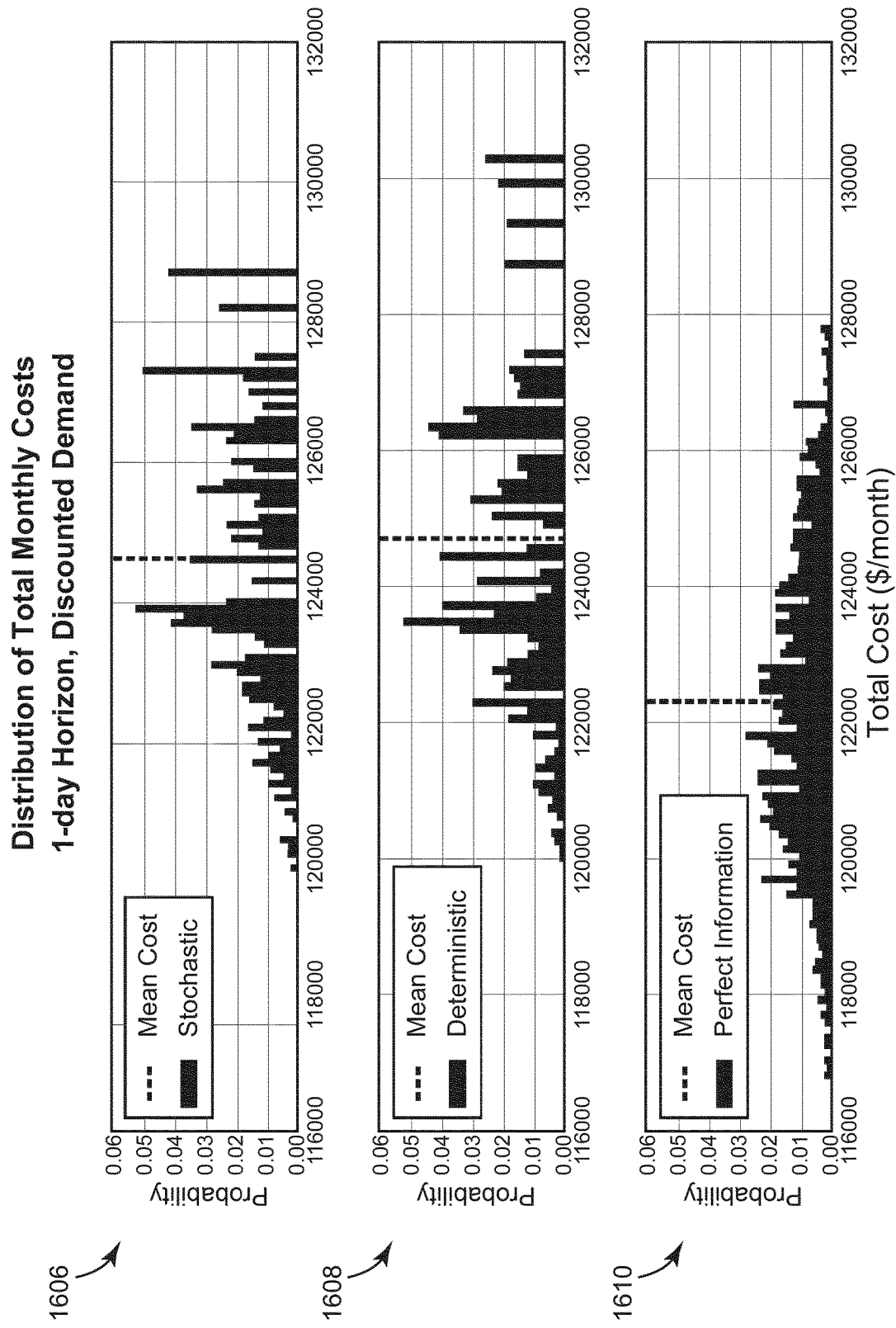
FIG. 16B is a graph of a distribution of total monthly costs using a 1-day horizon and discounted demand, according to an exemplary embodiment.
Figure 16C:
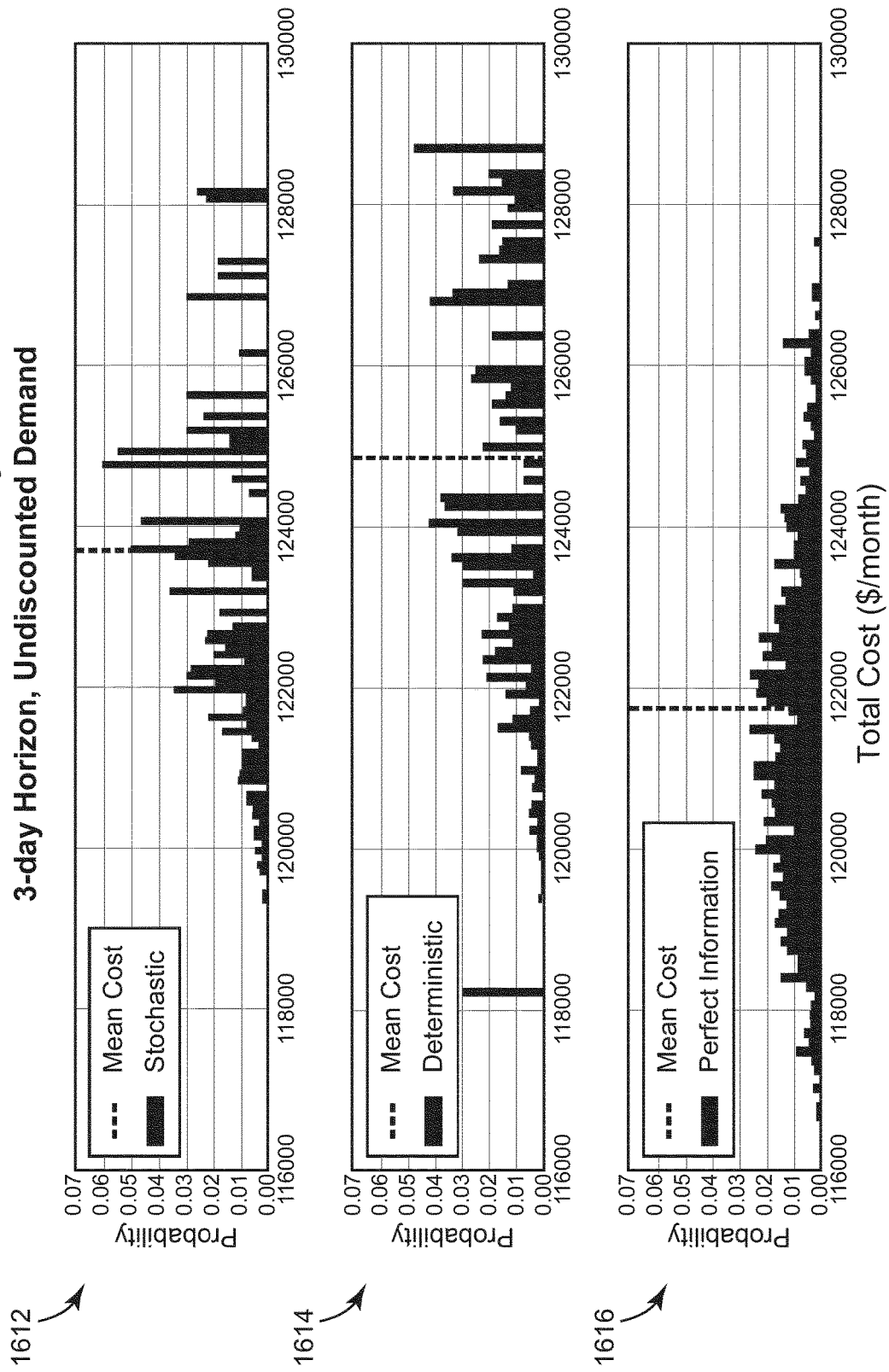
FIG. 16C is a graph of a distribution of total monthly costs using a 3-day horizon and undiscounted demand, according to an exemplary embodiment.
Figure 16D:
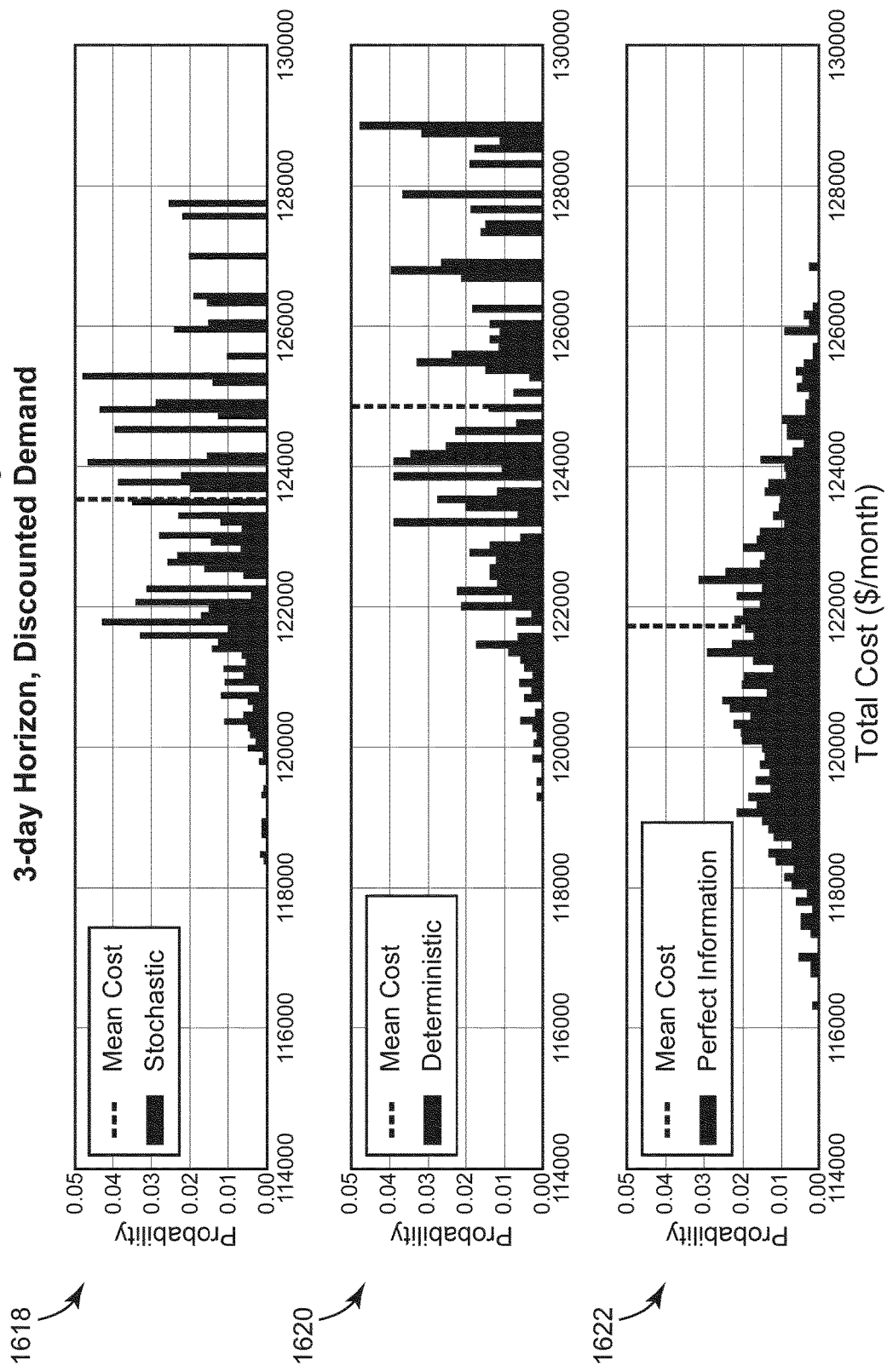
FIG. 16D is a graph of a distribution of total monthly costs using a 3-day horizon and discounted demand, according to an exemplary embodiment.
Figure 16E:
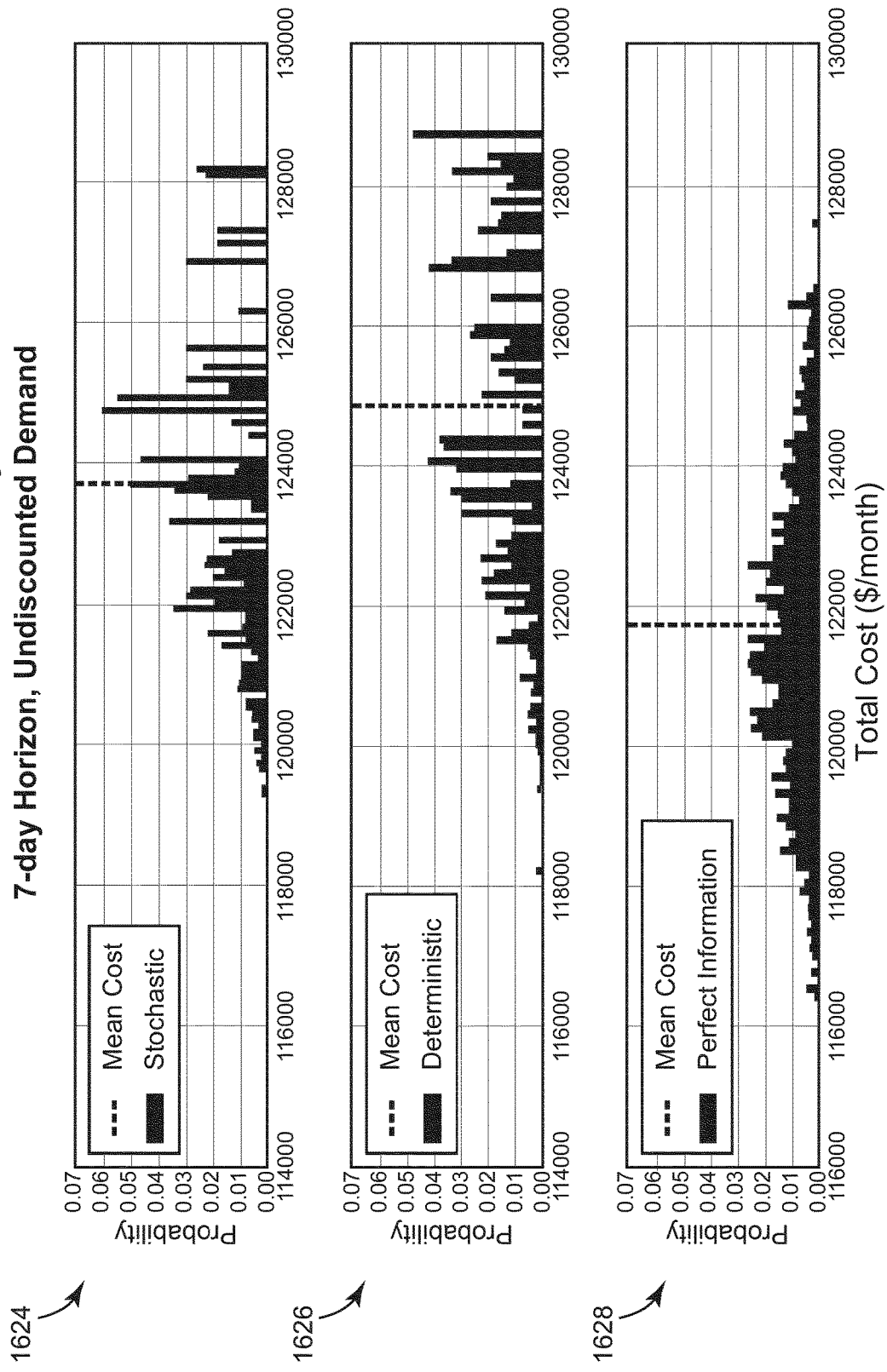
FIG. 16E is a graph of a distribution of total monthly costs using a 7-day horizon and undiscounted demand, according to an exemplary embodiment.
Figure 16F:
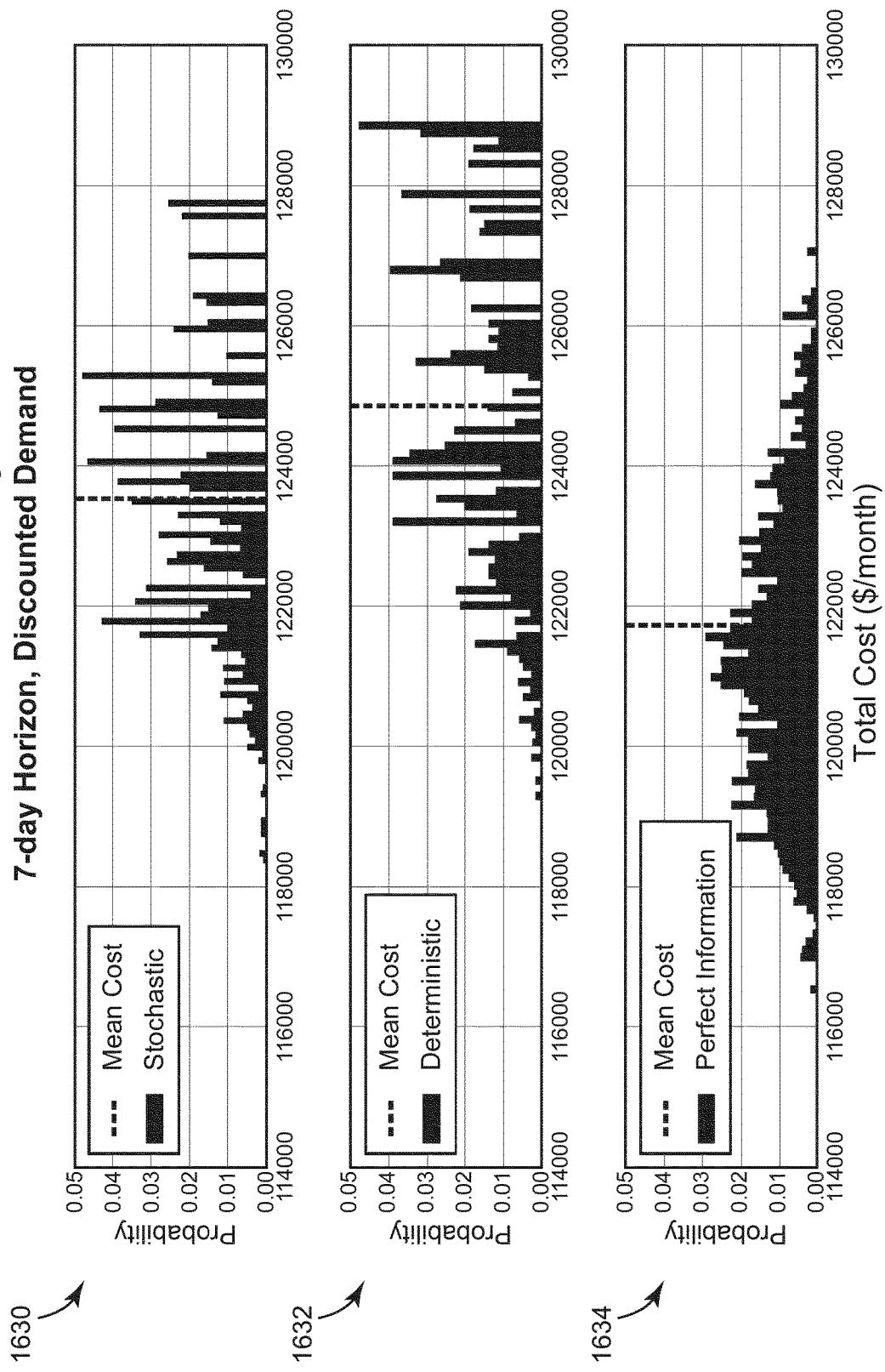
FIG. 16F is a graph of a distribution of total monthly costs using a 7-day horizon and discounted demand, according to an exemplary embodiment.

Referring now to FIGS. 16A-16F, the distribution of the total costs for the 1000 scenarios are shown. More particularly, FIG. 16A illustrates the distribution of total monthly costs for each of the scenarios with an undiscounted demand charge for a one day horizon by including a graph 1600 for the stochastic MPC approach, a graph 1602 for the deterministic MPC approach, and a graph 1604 for the perfect information MPC simulation. FIG. 16B illustrates the distribution of total monthly costs for each of the scenarios with a discounted demand charge for a one day horizon by including a graph 1606 for the stochastic MPC approach, a graph 1608 for the deterministic MPC approach, and a graph 1610 for the perfect information MPC simulation. FIG. 16C illustrates the distribution of total monthly costs for each of the scenarios with a undiscounted demand charge for a three day horizon by including a graph 1612 for the stochastic MPC approach, a graph 1614 for the deterministic MPC approach, and a graph 1616 for the perfect information MPC simulation. FIG. 16D illustrates the distribution of total monthly costs for each of the scenarios with a discounted demand charge for a three day horizon by including a graph 1618 for the stochastic MPC approach, a graph 1620 for the deterministic MPC approach, and a graph 1622 for the perfect information MPC simulation. FIG. 16E illustrates the distribution of total monthly costs for each of the scenarios with an undiscounted demand charge for a seven day horizon by including a graph 1624 for the stochastic MPC approach, a graph 1626 for the deterministic MPC approach, and a graph 1628 for the perfect information MPC simulation. FIG. 16F illustrates the distribution of total monthly costs for each of the scenarios with a discounted demand charge for a seven day horizon by including a graph 1630 for the stochastic MPC approach, a graph 1632 for the deterministic MPC approach, and a graph 1634 for the perfect information MPC simulation.

As shown in FIGS. 16A-16F, the tail costs in the deterministic policy (i.e. on graphs 1602, 1608, 1614, 1620, 1626, 1632) are significantly more pronounced, indicating that a larger number of scenarios experience high costs. The stochastic MPC scheme (i.e., as shown on graph 1600, 1606, 1612, 1618, 1624, and 1630) mitigates these extreme costs and also has a mean shifted towards a smaller cost. The cost distribution for perfect information MPC scheme (i.e., as shown on graph 1604, 1610, 1616, 1622, 1628, 1634) is clearly superior but it is noted that this approach is not implementable and is only presented as a hypothetical case.

From FIGS. 16A-16F, it can be observed that the distribution of the total costs for all MPC schemes shift towards the left as we increase the prediction horizon. In particular, strong differences in the distributions are observed for 1-day and 3-day horizons while the differences between the 3-day and 7-day policies are less pronounced. This indicates that the prediction horizon plays a key role, as is typically observed in MPC applications, but an extremely long horizon does not seem necessary. From FIGS. 16A-16F it can also be observed that, when the demand charge is discounted a factor of the horizon length, the cost distribution shifts towards lower values. This is particularly evident in the 1-day horizon cases. This shows that it is important to properly discount the peak demand in the optimization problems for shorter horizons. This is because an undiscounted demand charge will operate more conservatively, trying to mitigate the peak demand in every problem (e.g., every day).

Figure 17A:
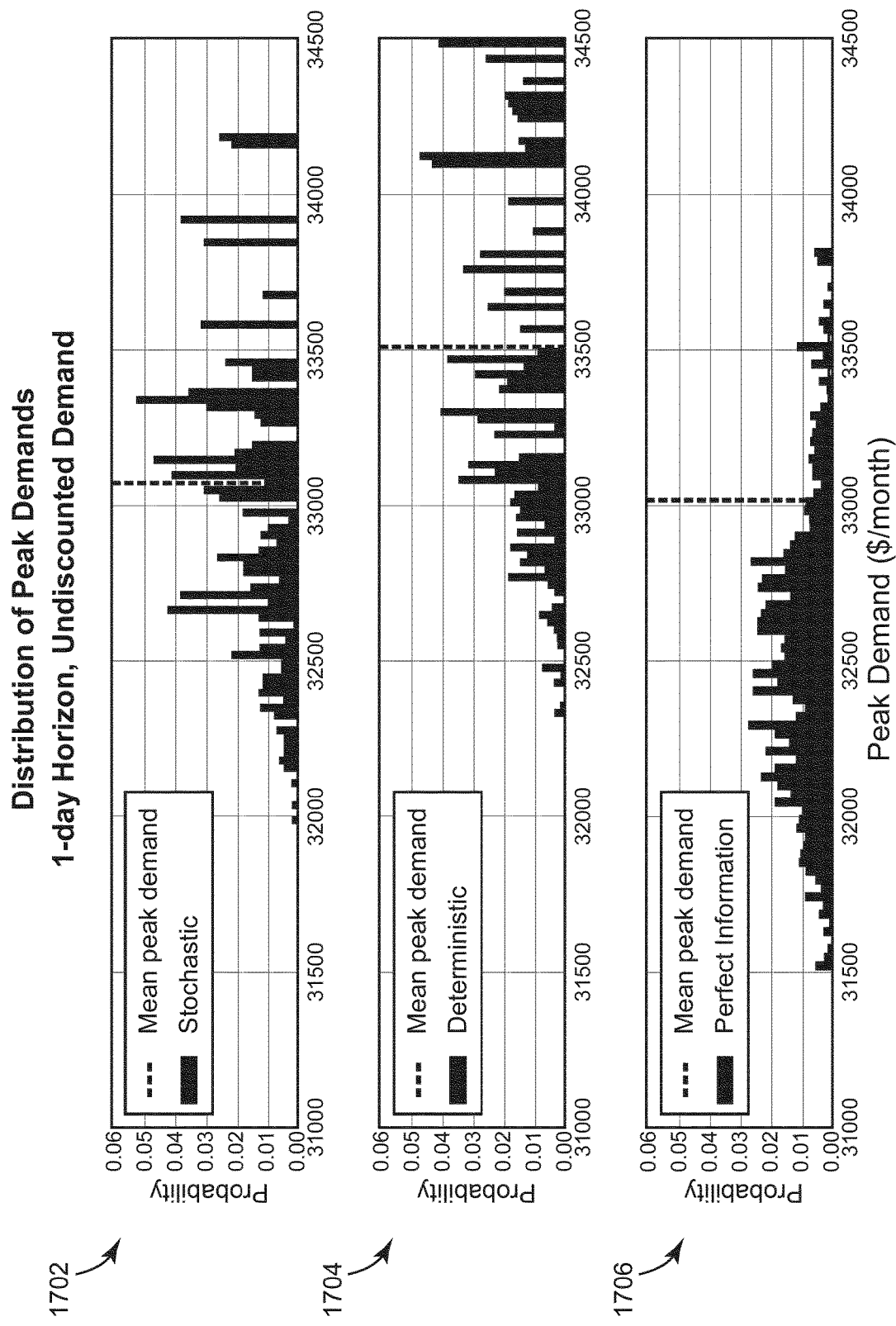
FIG. 17A is a graph of a distribution of peak demands using a 1-day horizon and undiscounted demand, according to an exemplary embodiment.
Figure 17B:
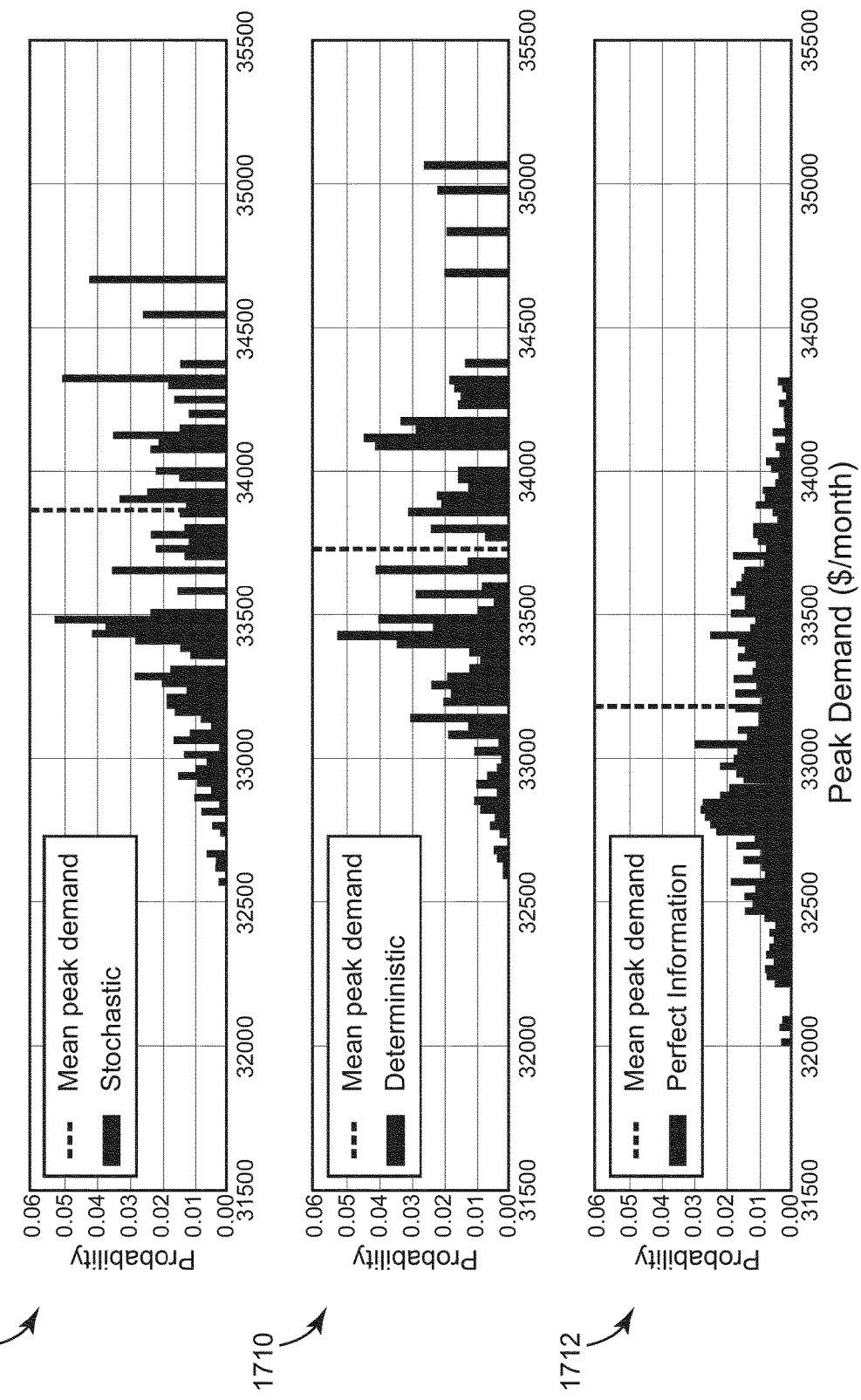
FIG. 17B is a graph of a distribution of peak demands using a 1-day horizon and discounted demand, according to an exemplary embodiment.
Figure 17C:
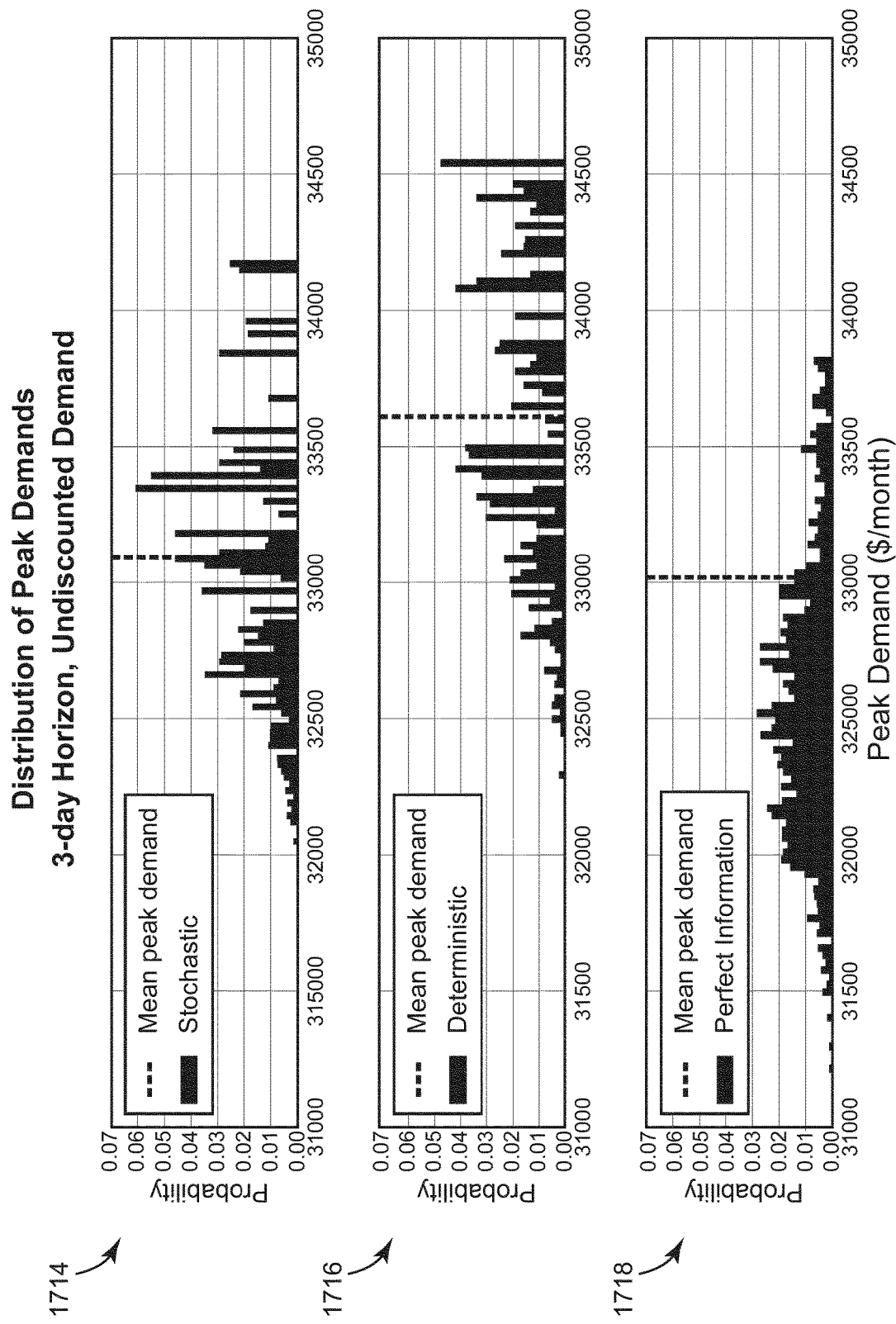
FIG. 17C is a graph of a distribution of peak demands using a 3-day horizon and undiscounted demand, according to an exemplary embodiment.
Figure 17D:
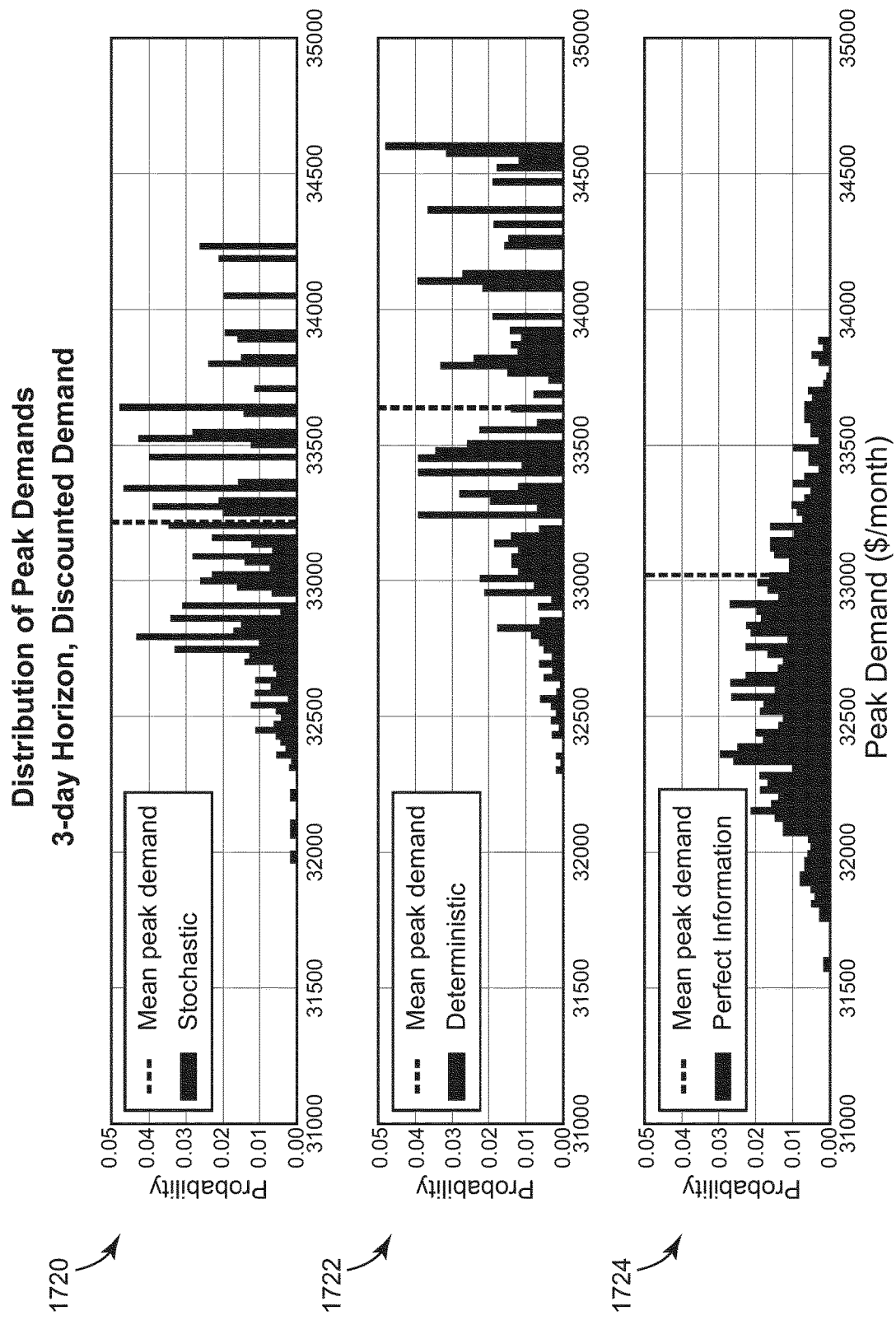
FIG. 17D is a graph of a distribution of peak demands using a 3-day horizon and discounted demand, according to an exemplary embodiment.
Figure 17E:
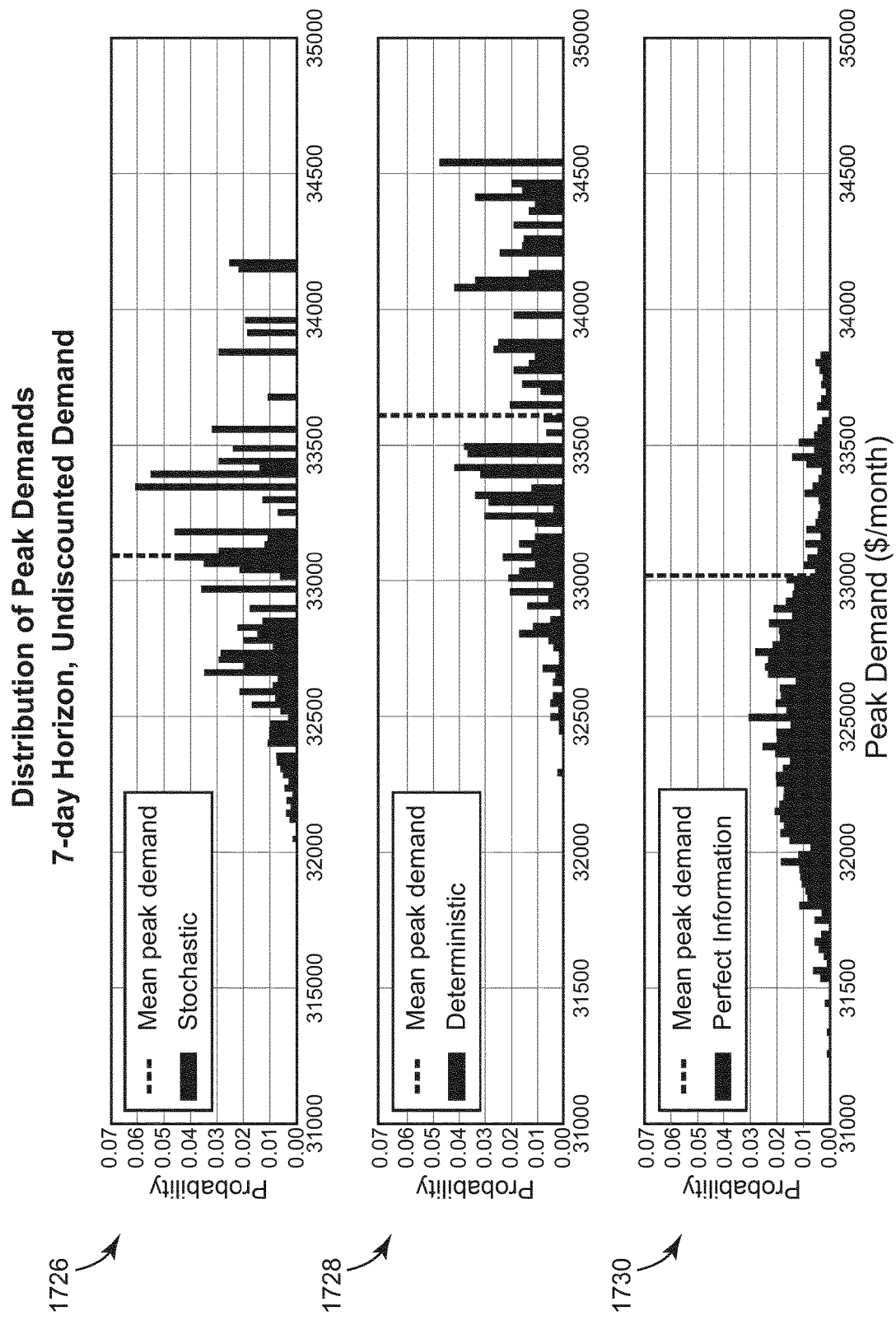
FIG. 17E is a graph of a distribution of peak demands using a 7-day horizon and undiscounted demand, according to an exemplary embodiment.
Figure 17F:
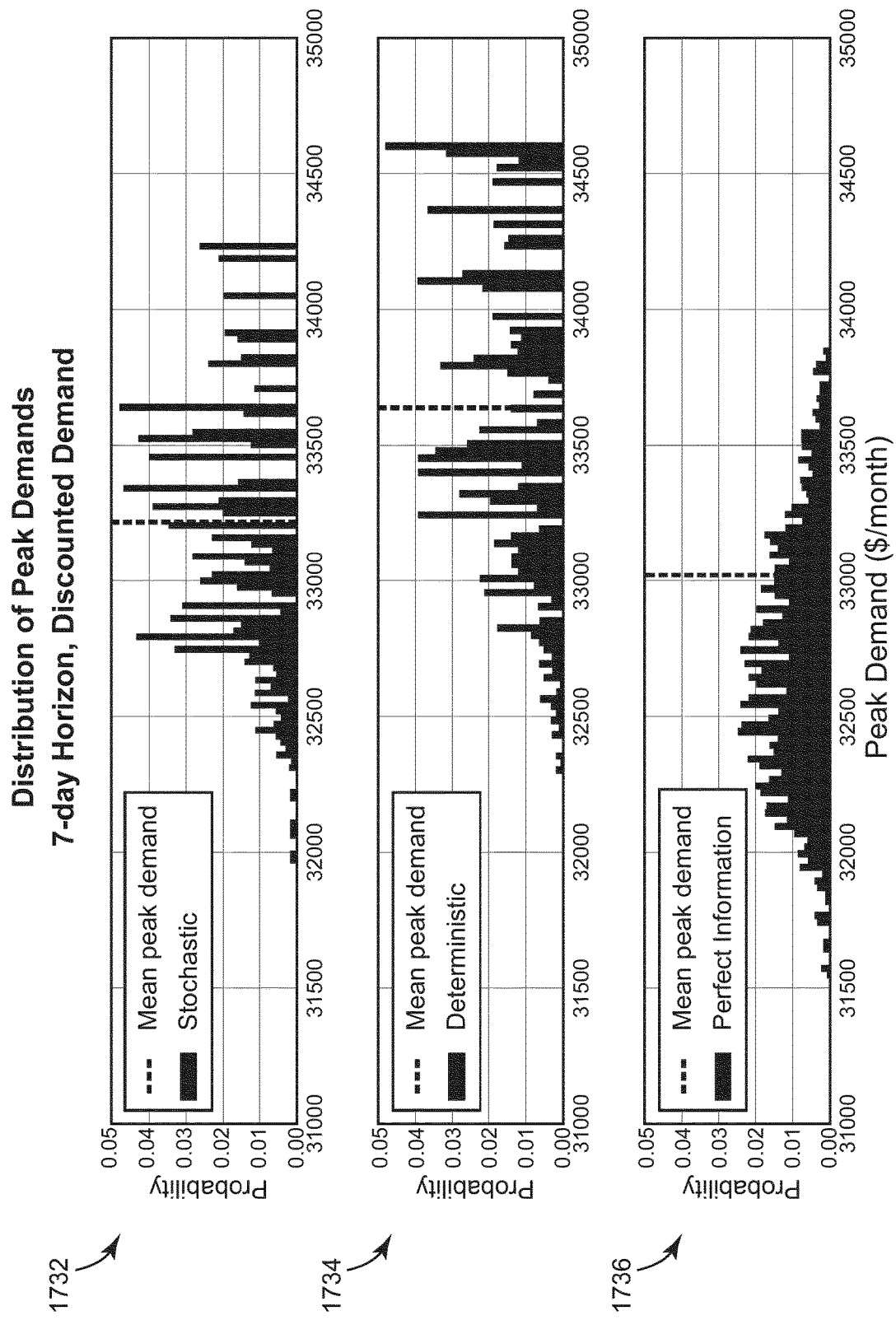
FIG. 17F is a graph of a distribution of peak demands using a 7-day horizon and discounted demand, according to an exemplary embodiment.
Figure 18:
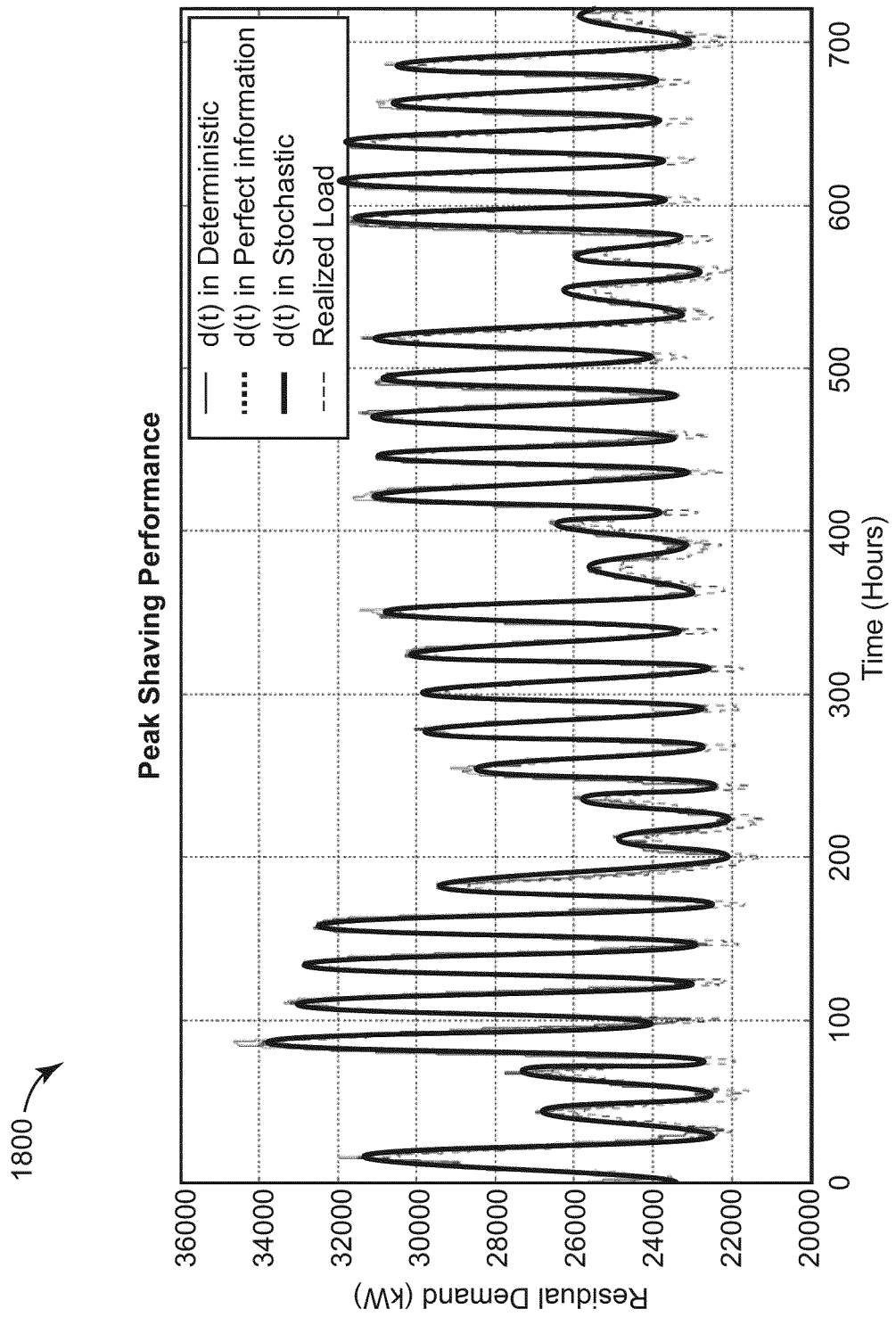
FIG. 18 is a graph illustrating a peak shaving performance of deterministic MPC, perfect information MPC, and stochastic MPC, according to an exemplary embodiment.

FIGS. 17A-F illustrate the distribution of the peak demands for the 1000 scenarios are shown. More particularly, FIG. 17A illustrates the distribution of peak demands for each of the scenarios with an undiscounted demand charge for a one day horizon by including a graph 1700 for the stochastic MPC approach, a graph 1702 for the deterministic MPC approach, and a graph 1704 for the perfect information MPC simulation. FIG. 17B illustrates the distribution of peak demands for each of the scenarios with a discounted demand charge for a one day horizon by including a graph 1706 for the stochastic MPC approach, a graph 1708 for the deterministic MPC approach, and a graph 1710 for the perfect information MPC simulation. FIG. 17C illustrates the distribution of peak demands for each of the scenarios with a undiscounted demand charge for a three day horizon by including a graph 1712 for the stochastic MPC approach, a graph 1714 for the deterministic MPC approach, and a graph 1716 for the perfect information MPC simulation. FIG. 17D illustrates the distribution of peak demands for each of the scenarios with a discounted demand charge for a three day horizon by including a graph 1718 for the stochastic MPC approach, a graph 1720 for the deterministic MPC approach, and a graph 1722 for the perfect information MPC simulation. FIG. 17E illustrates the distribution of peak demands for each of the scenarios with an undiscounted demand charge for a seven day horizon by including a graph 1724 for the stochastic MPC approach, a graph 1726 for the deterministic MPC approach, and a graph 1728 for the perfect information MPC simulation. FIG. 17F illustrates the distribution of peak demands for each of the scenarios with a discounted demand charge for a seven day horizon by including a graph 1730 for the stochastic MPC approach, a graph 1732 for the deterministic MPC approach, and a graph 1734 for the perfect information MPC simulation.

FIGS. 17A-17F show that the peak demand is distributed towards lower values for longer horizons. Again, this highlights the importance of choosing a sufficiently long horizon. In particular, the peak demands contribute by a large amount to the net revenue and therefore, it is important to minimize peaks in an optimal manner. The stochastic MPC scheme is better able to mitigate the peaks compared to deterministic MPC. This can also be seen for a random realization of the load profile, as shown in graph 1800 of FIG. 18. FIGS. 17A-17F also show that when the penalty for the peak demand is scaled down by a factor of the horizon length, the peak demands are distributed towards lower values than when the price charged for peak demand is unscaled. These observations show that incorrect discounting factors and insufficient horizon lengths can greatly undermine the value of the stochastic solution.

Figure 19A:
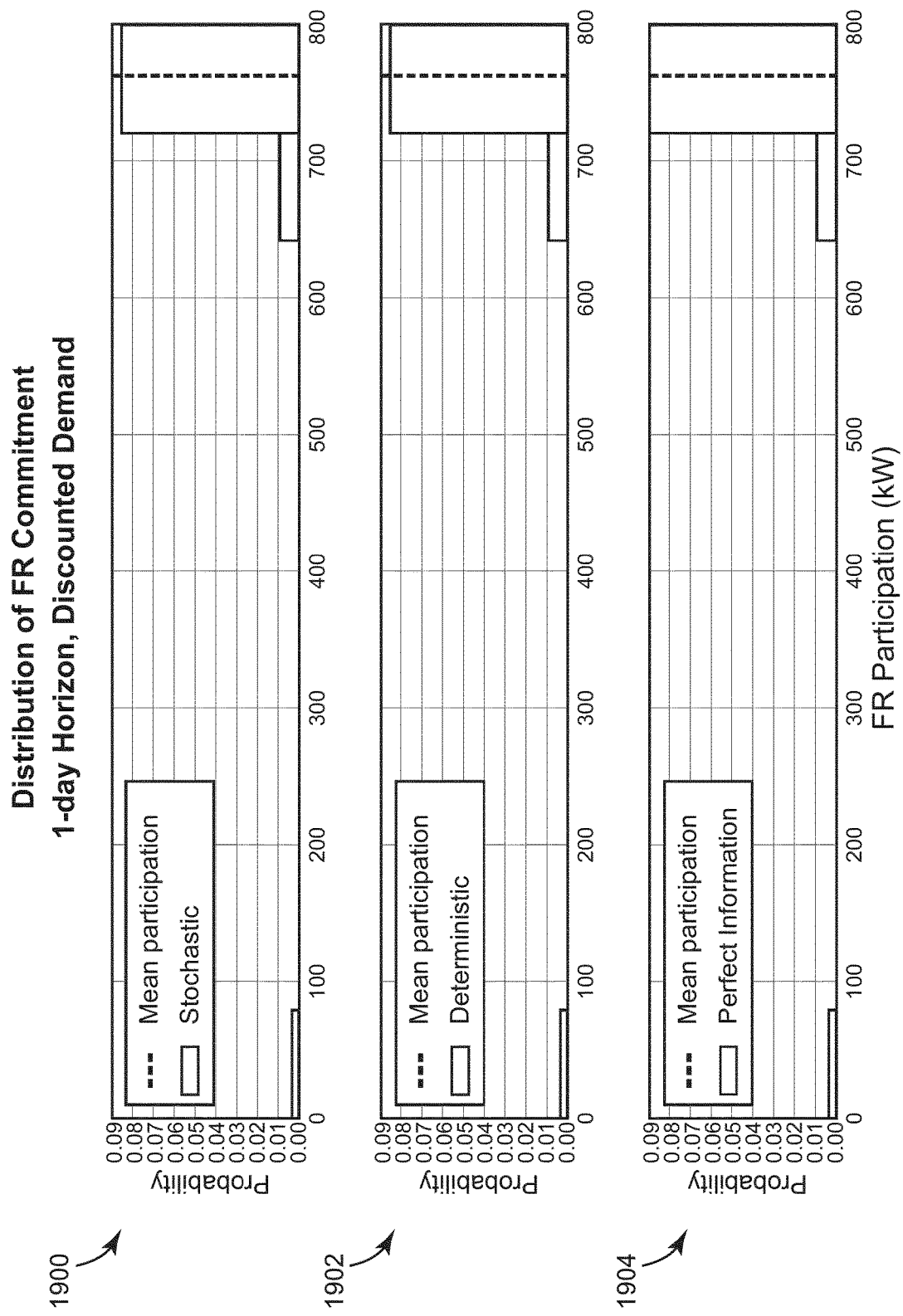
FIG. 19A is a graph of a distribution of FR commitment using a 1-day horizon and discounted demand, according to an exemplary embodiment.
Figure 19B:
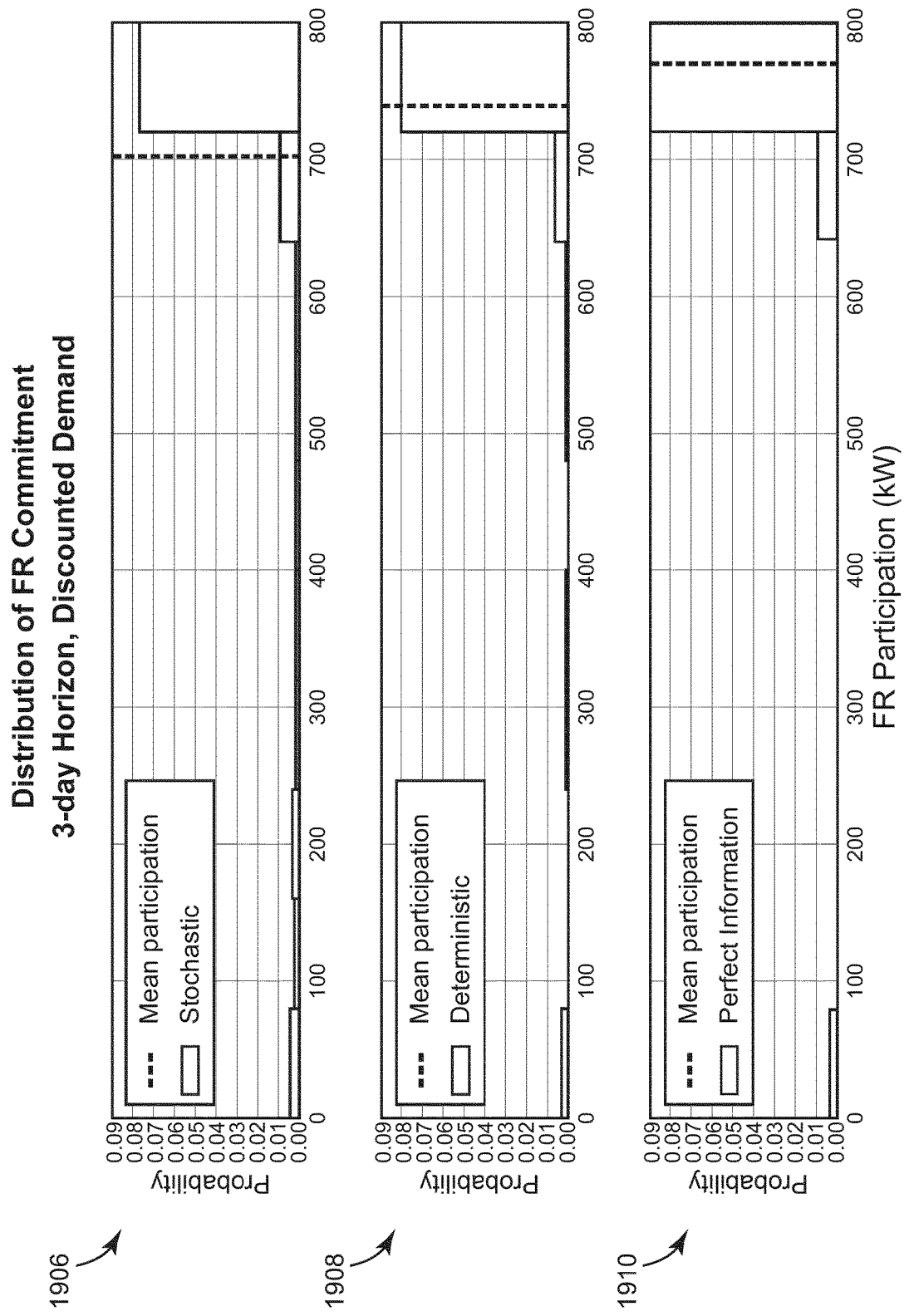
FIG. 19B is a graph of a distribution of FR commitment using a 3-day horizon and discounted demand, according to an exemplary embodiment.
Figure 19C:
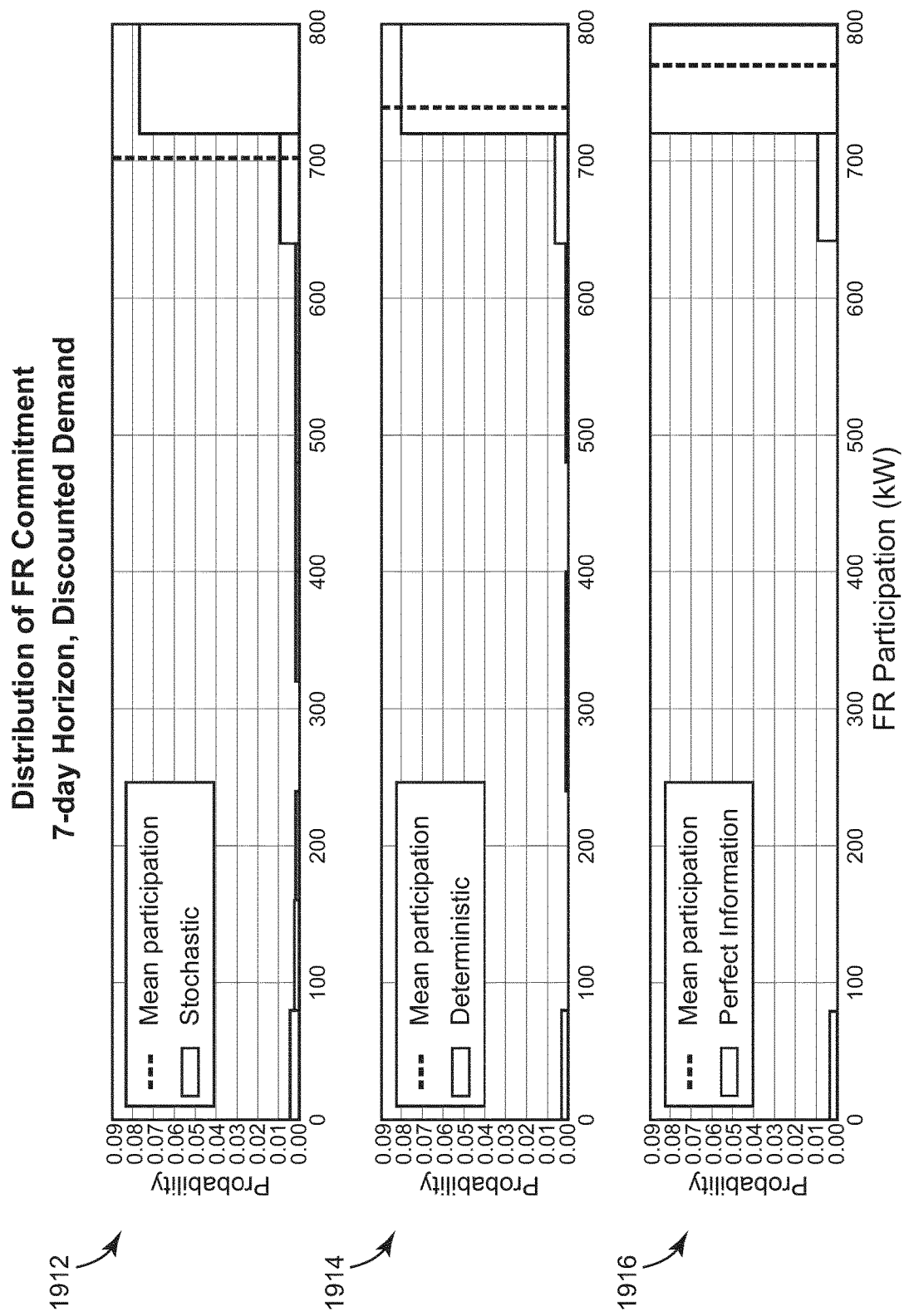
FIG. 19C is a graph of a distribution of FR commitment using a 7-day horizon and discounted demand, according to an exemplary embodiment.

Referring now to FIGS. 19A-19C, the frequency regulation allocation levels of the different schemes are illustrated. FIG. 19A illustrates the frequency regulation allocation levels for each of the scenarios with a one day horizon by including a graph 1900 for the stochastic MPC approach, a graph 1902 for the deterministic MPC approach, and a graph 1904 for the perfect information MPC simulation. FIG. 19B illustrates the frequency regulation allocation levels for each of the scenarios with a three day horizon by including a graph 1906 for the stochastic MPC approach, a graph 1908 for the deterministic MPC approach, and a graph 1912 for the perfect information MPC simulation. FIG. 19C illustrates the frequency regulation allocation levels for each of the scenarios with a three day horizon by including a graph 1912 for the stochastic MPC approach, a graph 1914 for the deterministic MPC approach, and a graph 1916 for the perfect information MPC simulation. As shown in graphs 1900-1916, the FR participation levels are consistent, with most of them clustering in the range of 700-800 kW. Graphs 1900-1916 also show that the deterministic policy is more aggressive in allocating FR capacities than the stochastic policy (i.e., it allocates its maximum capacity for FR more frequently). This comes at the expense of higher peak demand (as seen in FIGS. 17A-17F). This highlights that the stochastic policy can better manage stored energy to protect against high peak demands.

Figure 20:
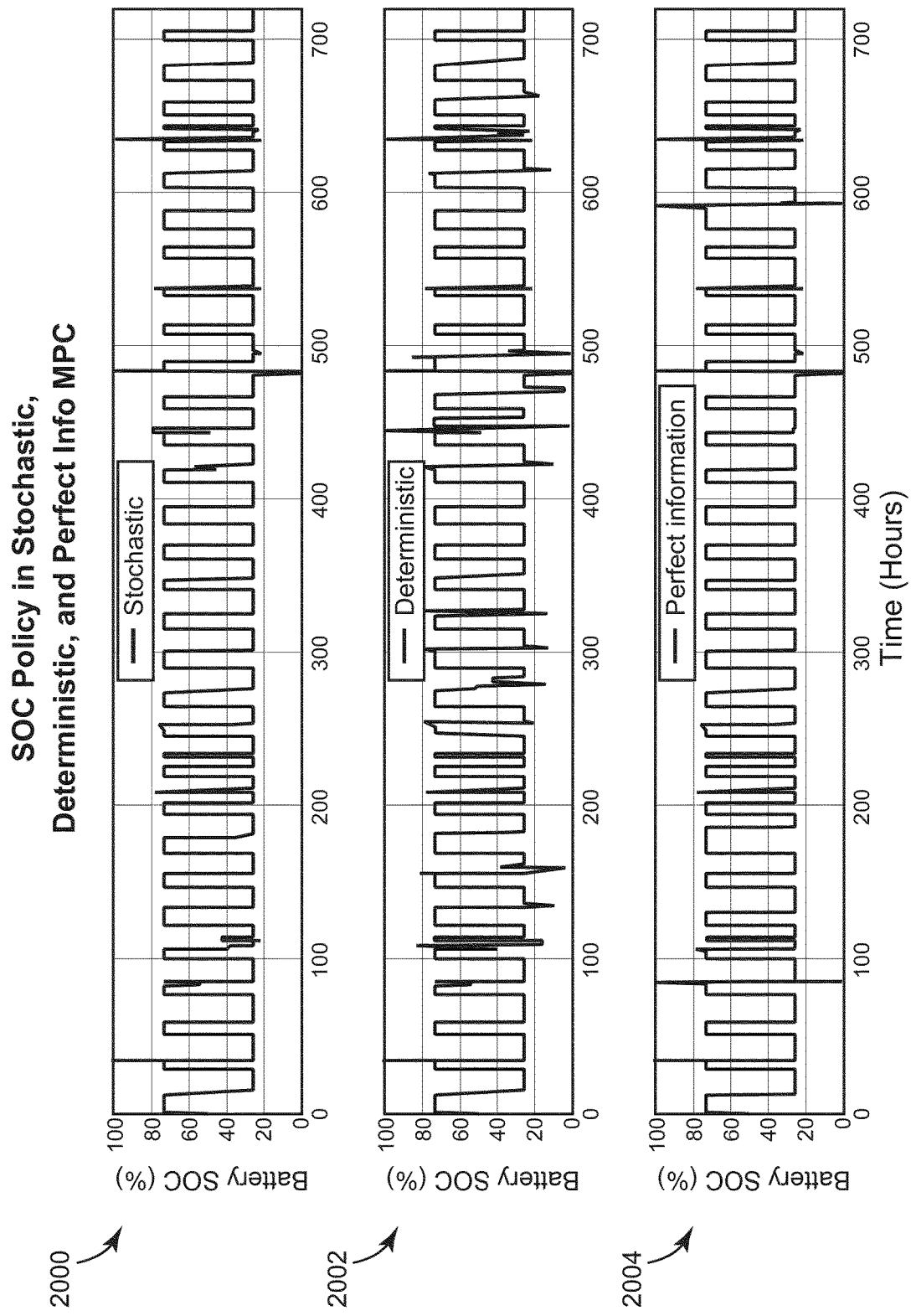
FIG. 20 is a graph of a state-of-charge (SOC) of a battery in stochastic, deterministic, and perfect information MPC, according to an exemplary embodiment.

FIG. 20 compares the dynamics of the battery 1004 state of charge for the case study with a 7-day horizon and discounted demand charge cost. FIG. 20 illustrates state of charge over time for stochastic MPC on graph 2000, for deterministic MPC on graph 2002, and for perfect information MPC on graph 2004. Graphs 2000-2004 show that that the deterministic policy (graph 2002) exhibits abrupt changes more frequently than the stochastic (graph 2000) and perfect information (graph 2004) schemes. This reflects the fact that the deterministic policy overcommits in FR and then tries to correct in scenarios where the observed load is different than the mean. The state of charge profiles of stochastic and perfect information MPC (i.e., graphs 2000 and 2004) are quite similar and smoother. This indicates that stochastic MPC performance is close to that of perfect information MPC.

FIG. 21 shows Table I, which disaggregates the total cost components for all the case studies. From Table I, a general trend of higher expected total costs with shorter horizon lengths can be observed for all the schemes.

Moreover, it can be observed that stochastic MPC outperforms deterministic MPC. FIG. 22 shows Table II. Table II compares the value of the stochastic solution (VSS) and the value of perfect information (VPI), which are standard metrics used to benchmark performance of stochastic and deterministic optimization formulations. VSS is the difference between the expected costs obtained by the deterministic and the stochastic MPC, while VPI is the difference between the expected costs obtained by the stochastic and the perfect information MPC. As the names suggest, VSS quantifies the value of factoring uncertainty into decision-making while VPI quantifies the benefit of having perfect forecasts. In these studies, it can be seen that VSS can reach levels of $1,000 per month while VPI is on the order of $1,700 per month. Both of these quantities are small compared to the total cost (which reaches levels of $120,000 per month). This is because the load of the university campus is significantly larger than the battery capacity (which is usually the case in demand-side management applications). As a result, the VSS and VPI metrics are not particularly revealing on the performance of the MPC schemes. Thus, it may be desirable to use a different application-specific metric.

FIG. 23 shows Table III. Table III summarizes the savings obtained by using a battery under diverse MPC schemes compared to the case in which no battery is installed. The MPC schemes may use a case with a 7-day horizon and a corresponding discounting factor. The expected savings obtained by installing the battery and operating it under perfect information is defined as the ideal value of the battery. These savings are relative to the case in which no battery is installed. In this case study, the ideal value of the battery is $15,348 per month (approximately $184,176 per year). This reveals that the battery indeed is highly valuable (e.g., from Table II it can be observed that FR revenue reaches levels of $14,000 per month). It can also be observed that stochastic MPC can recover 88% of this ideal value while deterministic MPC can only recover 79%. Thus, using a better MPC scheme (i.e., using the stochastic MPC approach of process 1200) adds value to the battery system and that the battery value metric is more informative then traditional metrics used for assessing performance of stochastic optimization techniques.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building energy system configured to serve energy loads of a building or campus, the system comprising:
    equipment configured to consume input resources from one or more utility suppliers to produce output resources provided to the building or campus; and
    an asset allocator configured to determine an optimal allocation of energy loads across the equipment over a prediction horizon by:
        generating several potential scenarios, each potential scenario comprising a predicted load required by the building or campus and predicted prices for the input resources for each of a plurality of time steps;
        generating an individual cost function for each potential scenario, each individual cost function comprising a cost of purchasing the input resources from the one or more utility suppliers;
        generating one or more constraints that constrain how the energy loads are allocated; and
        solving an optimization problem to determine the optimal allocation of the energy loads across the equipment, wherein solving the optimization problem comprises optimizing an overall cost function that comprises a weighted sum of individual cost functions for each potential scenario subject to the one or more constraints for each potential scenario;
    wherein the asset allocator is further configured to control the equipment to achieve the optimal allocation of energy loads.

2. The system of claim 1, wherein the optimization problem comprises an allocation of energy loads for each scenario subject to a constraint that the allocation of energy loads for a first element of the prediction horizon is the same for each potential scenario.

3. The system of claim 1, wherein generating the several potential scenarios comprises:
    predicting one or more inputs to the optimization problem at each time step of the prediction horizon;
    identifying an uncertainty range of the predicted inputs;
    generating a first potential scenario by selecting a first set of input values within the uncertainty range; and
    generating one or more additional potential scenarios by selecting one or more additional sets of input values within the uncertainty range;
    wherein the one or more inputs comprise one or more of an electrical energy consumption of the building or campus, a chilled water load of the building or campus, a hot water load of the building or campus, a price rate for one or more of the input resources, a market rate of an incentive program, or weather.

4. The system of claim 1, wherein the building energy system is a central energy plant and the equipment comprise at least one of chillers, boilers, hot water generators, battery systems, or co-generation.

5. The system of claim 1, wherein one or more of the individual cost functions include incentives for participation in supplier-provided programs.

6. The system of claim 5, wherein the supplier-provided programs comprise at least one of frequency response or economic load demand response.

7. The system of claim 1, wherein the cost of purchasing the input resources includes one or more demand charges.

8. The system of claim 1, wherein each weight in the weighted sum of individual cost functions depends on a probability of one potential scenario of the several potential scenarios and is applied to the individual cost function generated for the potential scenario.

9. The system of claim 1, wherein:
    the one or more constraints comprise a resource balance constraint that requires balance between a total amount of each resource supplied or moved out of storage and a total amount of each resource consumed or moved into storage; and
    the equipment comprises one or more resource storage devices such that the input resources or the output resources can be made or purchased when a cost of purchasing or making the input resources or the output resources is low and stored to be used when the cost of purchasing or making the input resources or the output resources is relatively higher.

10. A method for optimizing cost of a building energy system, the method comprising:

operating equipment to consume input resources from one or more utility suppliers and produce output resources provided to a building or campus;

generating several potential scenarios over a prediction horizon, each potential scenario comprising a predicted load required by the building or campus and predicted prices for the input resources for each of a plurality of time steps;

generating an individual cost function for each potential scenario, each individual cost function comprising a cost of purchasing the input resources from the one or more utility suppliers;

generating one or more constraints that constrain how energy loads are allocated; and solving an optimization problem to determine an optimal allocation of the energy loads across the equipment, wherein solving the optimization problem comprises optimizing an overall cost function that comprises a weighted sum of individual cost functions for each potential scenario subject to the one or more constraints for each potential scenario; and controlling the equipment to achieve the optimal allocation of the energy loads.

11. The method of claim 10, wherein the optimization problem comprises an allocation of energy loads for each scenario subject to a constraint that the allocation of energy loads for a first element of the prediction horizon is the same for each potential scenario.

12. The method of claim 10, wherein generating the several potential scenarios comprises:

predicting one or more inputs to the optimization problem at each time step of the prediction horizon;

identifying an uncertainty range of the predicted inputs;

generating a first potential scenario by selecting a first set of input values within the uncertainty range; and generating one or more additional potential scenarios by selecting one or more additional sets of input values within the uncertainty range;

wherein the one or more inputs comprise one or more of an electrical energy consumption of the building or campus, a chilled water load of the building or campus, a hot water load of the building or campus, a price rate for one or more of the input resources, a market rate of an incentive program, or weather.

13. The method of claim 10, wherein the building energy system is a central energy plant and the equipment comprise at least one of chillers, boilers, hot water generators, battery systems, or co-generation.

14. The method of claim 10, wherein one or more individual cost functions include incentives for participation in supplier-provided programs.

15. The method of claim 14, wherein the supplier-provided programs comprise at least one of frequency response or economic load demand response.

16. The method of claim 10, wherein the cost of purchasing the input resources includes one or more demand charges.

17. The method of claim 10, wherein each weight in the weighted sum of individual cost functions depends on a probability of one potential scenario of the several potential scenarios and is applied to the individual cost function generated for the potential scenario.

18. The method of claim 10, wherein:

the one or more constraints comprise a resource balance constraint that requires balance between a total amount of each resource supplied or moved out of storage and a total amount of each resource consumed or moved into storage; and the equipment comprises one or more resource storage devices such that the input resources or the output resources can be made or purchased when a cost of purchasing or making the input resources or the output resources is low and stored to be used when the cost of purchasing or making the input resources or the output resources is relatively higher.

19. A method for predicting an operating cost of a building or campus, the method comprising:

generating several potential scenarios over a prediction horizon, each potential scenario comprising a predicted load required by the building or campus and predicted prices for input resources for each of a plurality of time steps;

generating an individual cost function for each potential scenario, each individual cost function comprising a cost of purchasing the input resources from utility suppliers;

generating one or more constraints that constrain how energy loads are allocated;

optimizing an overall cost function that comprises a weighted sum of individual cost functions for each potential scenario subject to the one or more constraints for each potential scenario to determine an optimal energy allocation for each of the plurality of time steps in an optimization period, the optimization period comprising a portion of a planning period;

shifting the optimization period forward in time by a block size comprising a predetermined number of time steps;

iteratively repeating the optimizing and shifting steps until the overall cost function has been optimized for each time step that occurs during the planning period; and predicting the cost of operating the building or campus over the planning period based on the optimal energy allocation for each time step that occurs during the planning period.

20. The method of claim 19, wherein generating the several potential scenarios comprises:

predicting one or more inputs to an optimization problem at each time step of the prediction horizon;

identifying an uncertainty range of the predicted inputs;

generating a first potential scenario by selecting a first set of input values within the uncertainty range; and generating one or more additional potential scenarios by selecting one or more additional sets of input values within the uncertainty range;

wherein the one or more inputs comprise one or more of an electrical energy consumption of the building or campus, a chilled water load of the building or campus, a hot water load of the building or campus, a price rate for one or more of the input resources, a market rate of an incentive program, or weather.

* * * * *